(12) United States Patent
Miyanoo et al.

(10) Patent No.: US 7,121,260 B2
(45) Date of Patent: Oct. 17, 2006

(54) IGNITION TIMING CONTROL APPARATUS FOR ENGINE

(75) Inventors: Yuji Miyanoo, Seto (JP); Kiyoo Hirose, Nagoya (JP); Noboru Takagi, Toyota (JP); Keizo Hiraku, Nishikamo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/229,554

(22) Filed: Sep. 20, 2005

(65) Prior Publication Data

US 2006/0107924 A1 May 25, 2006

(30) Foreign Application Priority Data

Sep. 22, 2004 (JP) .............................. 2004-275927

(51) Int. Cl.
*F02P 5/15* (2006.01)
(52) U.S. Cl. ...................... 123/406.26; 123/406.41; 123/406.45
(58) Field of Classification Search ........... 123/406.22, 123/406.26, 406.41, 406.42, 406.43, 406.45, 123/406.11, 406.16, 406.21, 406.23, 425, 123/435, 594, 595, 339.11
See application file for complete search history.

(56) References Cited

U.S. PATENT DOCUMENTS

| | | | | |
|---|---|---|---|---|
| 4,690,116 A * | 9/1987 | Takahashi | ............... | 123/406.16 |
| 4,848,299 A * | 7/1989 | Satoh et al. | ............ | 123/406.21 |
| 5,884,605 A * | 3/1999 | Nagaishi et al. | ........ | 123/339.11 |
| 6,877,482 B1* | 4/2005 | Kinose | ................... | 123/406.29 |
| 6,971,360 B1* | 12/2005 | Katayama | ................. | 123/192.1 |

FOREIGN PATENT DOCUMENTS

| | | |
|---|---|---|
| JP | A 2001-221105 | 8/2001 |
| JP | A 2001-280228 | 10/2001 |
| JP | A 2002-257020 | 9/2002 |
| JP | A 2003-201945 | 7/2003 |
| JP | A 2003-269306 | 9/2003 |

* cited by examiner

*Primary Examiner*—Andrew M. Dolinar
*Assistant Examiner*—Johnny H. Hoang
(74) *Attorney, Agent, or Firm*—Kenyon & Kenyon LLP

(57) ABSTRACT

An ignition timing control apparatus for an engine includes a controller that sets an ignition timing considering a change of a temperature or a pressure in a combustion chamber at a time when an opening/closing characteristic of an intake valve is changed, the opening/closing characteristic including a valve opening timing and a valve closing timing at least one of which is changed by a variable valve mechanism for the engine.

60 Claims, 50 Drawing Sheets

IVC COMPRESSION END PRESSURE
CALCULATION MAP

| NE [rpm] \ IVC [degABDC] | ... | -40 | -20 | 0 | 20 | 40 | ... |
|---|---|---|---|---|---|---|---|
| ... | | | | | | | |
| 800 | | | | | | | |
| 1200 | | | | | | | |
| 1600 | | | compIVCbst | | | | |
| 2000 | | | compIVCdfl | | | | |
| 2400 | | | compIVCnow | | | | |
| 2800 | | | | | | | |
| ... | | | | | | | |

IVC COMPRESSION END PRESSURE
CALCULATION MAP

IVO COMPRESSION END TEMPERATURE CALCULATION MAP

| NE [rpm] \ IVO [degBTDC] | ... | -50 | -40 | -30 | -20 | -10 | 0 |
|---|---|---|---|---|---|---|---|
| ... | | | | | | | |
| 800 | | | | | | | |
| 1200 | | | | | | | |
| 1600 | | | tempIVObst | | | | |
| 2000 | | | tempIVOdfl | | | | |
| 2400 | | | tempIVOnow | | | | |
| 2800 | | | | | | | |
| ... | | | | | | | |

IVO COMPRESSION END TEMPERATURE CALCULATION MAP

IVC COMPRESSION END TEMPERATURE CALCULATION MAP

| | | IVC [degABDC] | | | | | |
|---|---|---|---|---|---|---|---|
| | | ... | −40 | −20 | 0 | 20 | 40 | ... |
| NE [rpm] | ... | | | | | | |
| | 800 | | | | | | |
| | 1200 | | | | | | |
| | 1600 | | | tempIVCbst | | | |
| | 2000 | | | tempIVCdfl | | | |
| | 2400 | | | tempIVCnow | | | |
| | 2800 | | | | | | |
| | ... | | | | | | |

IVC COMPRESSION END TEMPERATURE CALCULATION MAP

OPTIMAL CAM KNOCK LIMIT IGNITION TIMING CALCULATION MAP

| NE [rpm] \ KL [%] | ... | 10 | 20 | 30 | 40 | 50 | ... |
|---|---|---|---|---|---|---|---|
| ... | | | | | | | |
| 800 | | | | | | | |
| 1200 | | | | | | | |
| 1600 | | | | TKbst | | | |
| 2000 | | | | | | | |
| 2400 | | | | | | | |
| 2800 | | | | | | | |
| ... | | | | | | | |

OPTIMAL CAM KNOCK LIMIT IGNITION TIMING CALCULATION MAP

INITIAL CAM KNOCK LIMIT IGNITION TIMING CALCULATION MAP

| NE [rpm] \ KL [%] | ... | 10 | 20 | 30 | 40 | 50 | ... |
|---|---|---|---|---|---|---|---|
| ... | | | | | | | |
| 800 | | | | | | | |
| 1200 | | | | | | | |
| 1600 | | | | TKdfl | | | |
| 2000 | | | | | | | |
| 2400 | | | | | | | |
| 2800 | | | | | | | |
| ... | | | | | | | |

INITIAL CAM KNOCK LIMIT IGNITION TIMING CALCULATION MAP

IGNITION TIMING CONTROL APPARATUS FOR ENGINE

INCORPORATION BY REFERENCE

The disclosure of Japanese Patent Application No. 2004-275927 filed on Sep. 22, 2004, including the specification, drawings and abstract is incorporated herein by reference in its entirety.

BACKGROUND OF THE INVENTION

1. Field of the Invention

The invention relates to an ignition timing control apparatus for an engine provided with a variable valve mechanism which changes an opening/closing characteristic of an intake valve (at least one of an opening timing and a closing timing).

2. Description of the Related Art

In general, a variable valve mechanism includes at least one of a variable valve timing mechanism which changes a valve timing of an intake valve, and a maximum valve lift amount variable mechanism which changes the maximum valve lift amount of the intake valve. Japanese Patent Application Publication No. JP 2001-263015 A discloses a variable valve mechanism which includes both of the variable valve timing mechanism and the maximum valve lift amount variable mechanism.

In an engine including such a variable valve mechanism, a temperature and a pressure in a combustion chamber are changed according to a change in an opening/closing characteristic. Accordingly, in order to maintain a good combustion state, it is necessary to set an ignition timing considering a change in the temperature and the pressure in the combustion chamber.

However, an ignition timing control apparatus has not been proposed, which sets an ignition timing considering a relationship between the opening/closing characteristic of the intake valve, and the temperature and the pressure in the combustion chamber.

SUMMARY OF THE INVENTION

In view of the above, it is an object of the invention to provide an ignition timing control apparatus for an engine, which can set an appropriate ignition timing, irrespective of a change in an opening/closing characteristic of an intake valve.

A first aspect of the invention relates to an ignition timing control apparatus for an engine including a controller which sets an ignition timing considering a change in a temperature or a pressure in a combustion chamber at a time when an opening/closing characteristic of an intake valve is changed, the opening/closing characteristic including a valve opening timing and a valve closing timing at least one of which is changed by a variable valve mechanism for the engine.

In the aforementioned configuration, since the ignition timing is set considering the change in the temperature or the pressure in the combustion chamber at a time when the opening/closing characteristic of the intake valve is changed. Therefore, it is possible to set the appropriate ignition timing, irrespective of the change in the opening/closing characteristic of the intake valve.

A second aspect of the invention relates to an ignition timing control apparatus for an engine including a controller which calculates an MBT ignition timing at which output torque and a fuel consumption rate become optimal, and a knock limit ignition timing which is most advanced in an ignition timing range where occurrence of knocking can be suppressed; which sets a base ignition timing to one of the MBT ignition timing and the knock limit ignition timing, which is more retarded than the other, the base ignition timing being used for combustion of air-fuel mixture; and which calculates the MBT ignition timing and the knock limit ignition timing considering a change in a temperature or a pressure in a combustion chamber at a time when an opening/closing characteristic of an intake valve is changed, the opening/closing characteristic including a valve opening timing and a valve closing timing at least one of which is changed by a variable valve mechanism for the engine.

In the aforementioned configuration, the MBT ignition timing and the knock limit ignition timing are set considering a change in the temperature or the pressure in the combustion chamber at a time when the opening/closing characteristic of the intake valve is changed. Therefore, it is possible to set the appropriate base ignition timing, irrespective of the opening/closing characteristic of the intake valve.

A third aspect of the invention relates to an ignition timing control apparatus for an engine including a controller which uses an ignition timing used for combustion of air-fuel mixture as a base ignition timing, and sets the base ignition timing based on an operating state of the engine; and which sets the base ignition timing considering a change in a temperature or a pressure in a combustion chamber at a time when an opening/closing characteristic of an intake valve is changed, the opening/closing characteristic including a valve opening timing and a valve closing timing at least one of which is changed by a variable valve mechanism for the engine, wherein the controller uses, as a basic operating state, an operating state of the engine for which an appropriate base ignition timing has already been obtained; the controller estimates a state change amount that is a difference between a basic temperature or a basic pressure in the combustion chamber in the basic operating state and a present temperature or a present pressure in the combustion chamber in a present operating state, based on a basic opening/closing characteristic that is an opening/closing characteristic of the intake valve in the basic operating state and a present opening/closing characteristic that is an opening/closing characteristic of the intake valve in the present operating state; the controller corrects the base ignition timing appropriate for the basic operating state based on the state change amount; and the controller sets a base ignition timing appropriate for the present operating state to the corrected base ignition timing.

When the valve opening/closing characteristic of the intake valve is changed from the basic opening/closing characteristic to the present opening/closing characteristic, the temperature or the pressure in the combustion chamber is changed from the temperature or the pressure in the basic operating state to the temperature or the pressure in the present operating state, according to a change amount of the valve opening timing or the valve closing timing. Therefore, the base ignition timing appropriate for the basic operating state is deviated from the base ignition timing appropriate for the present operating state by an amount corresponding to the aforementioned state change amount. Accordingly, by setting the base ignition timing in the aforementioned mode, it is possible to set the appropriate base ignition timing, irrespective of a change in the opening/closing characteristic of the intake valve.

A fourth aspect of the invention relates to an ignition timing control apparatus for an engine including a controller which uses, as a base ignition timing, an ignition timing at which occurrence of knocking can be suppressed, and output torque and a fuel consumption rate become optimal; and which selects a base ignition timing appropriate for a present operating state from among plural basic base ignition timings that are stored in advance, wherein the controller uses, as a basic operating state, an operating state corresponding to one of the plural basic base ignition timings; the controller estimates a state change amount that is a difference between a basic temperature or a basic pressure in a combustion chamber in the basic operating state and a present temperature or a present pressure in the combustion chamber in a present operating state, based on a basic opening/closing characteristic that is an opening/closing characteristic of the intake valve in the basic operating state and a present opening/closing characteristic that is an opening/closing characteristic of an intake valve in the present operating state, the opening/closing characteristic including a valve opening timing and a valve closing timing at least one of which is changed by a variable valve mechanism for the engine; the controller corrects the base ignition timing appropriate for the basic operating state based on the state change amount; and the controller sets a base ignition timing appropriate for the present operating state to the corrected base ignition timing, in a case where the base ignition timing appropriate for the present operating state cannot be selected from among the plural basic base ignition timings.

When the valve opening/closing characteristic of the intake valve is changed from the basic opening/closing characteristic to the present opening/closing characteristic, the temperature or the pressure in the combustion chamber is changed from the basic temperature or the basic pressure in the basic operating state to the present temperature or the present pressure in the present operating state, according to the change amount of the valve opening timing or the valve closing timing. Therefore, the MBT ignition timing and the knock limit ignition timing which are appropriate for the basic operating state are deviated from the MBT ignition timing and the knock limit ignition timing which are appropriate for the present operating state by an amount corresponding to the aforementioned state change amount. Accordingly, by setting the MBT ignition timing and the knock limit ignition timing in the aforementioned mode, it is possible to set the appropriate base ignition timing, irrespective of a change in the opening/closing characteristic of the intake valve.

A fifth aspect of the invention relates to an ignition timing control apparatus for an engine including a controller which calculates an MBT ignition timing at which output torque and a fuel consumption rate become optimal, and a knock limit ignition timing that is most advanced in an ignition timing range where occurrence of knocking can be suppressed; which sets a base ignition timing to one of the MBT ignition timing and the knock limit ignition timing, which is more retarded than the other, the base ignition timing being used for combustion of air-fuel mixture; and which sets the base ignition timing considering a change in a temperature or a pressure in a combustion chamber at a time when an opening/closing characteristic of an intake valve is changed, the opening/closing characteristic including a valve opening timing and a valve closing timing at least one of which is changed by a variable valve mechanism for the engine, wherein the controller uses, as a basic operating state, an operating state of the engine for which an appropriate MBT ignition timing and an appropriate knock limit ignition timing have already been obtained; the controller estimates a state change amount that is a difference between a basic temperature or a basic pressure in the combustion chamber in the basic operating state and a present temperature or a present pressure in the combustion chamber in a present operating state, based on a basic opening/closing characteristic that is an opening/closing characteristic of the intake valve in the basic operating state and a present opening/closing characteristic that is an opening/closing characteristic of an intake valve in the present operating state; the controller corrects the MBT ignition timing and the knock limit ignition timing that are appropriate for the basic operating state based on the state change amount; and the controller sets a base ignition timing appropriate for the present operating state to one of the corrected MBT ignition timing and the corrected knock limit ignition timing, which is more retarded than the other.

With this configuration, it is possible to obtain effects similar to the effects that can be obtained with the ignition control apparatus for an engine according to a third aspect of the invention.

A sixth aspect of the invention relates to an ignition timing control apparatus for an engine including a controller which uses an ignition timing at which output torque and a fuel consumption rate become optimal as an MBT ignition timing; which uses an ignition timing that is most advanced in an ignition timing range where occurrence of knocking can be suppressed as a knock limit ignition timing; which selects an MBT ignition timing and a knock limit ignition timing that are appropriate for a present operating state from among plural basic MBT ignition timings that are stored in advance and plural basic knock limit timings that are stored in advance, respectively; and which sets a base ignition timing to one of the selected MBT ignition timing and the selected knock limit ignition timing, which is more retarded than the other, the base ignition timing being used for combustion of air-fuel mixture, wherein the controller uses, as a basic operating state, an operating state corresponding to one of the plural basic MBT ignition timings and one of the plural basic knock limit ignition timings; the controller estimates a state change amount that is a difference between a basic temperature or a basic pressure in a combustion chamber in the basic operating state and a present temperature or a present pressure in the combustion chamber in a present operating state, based on a basic opening/closing characteristic that is an opening/closing characteristic of the intake valve in the basic operating state and a present opening/closing characteristic that is an opening/closing characteristic of the intake valve in the present operating state, the opening/closing characteristic including a valve opening timing and a valve closing timing at least one of which is changed by a variable valve mechanism for the engine; the controller corrects the MBT ignition timing and the knock limit ignition timing that are appropriate for the basic operating state, based on the state change amount; and the controller sets a base ignition timing appropriate for the present operating state to one of the corrected MBT ignition timing and the corrected knock limit ignition timing, which is more retarded than the other, in a case where the MBT ignition timing and the knock limit ignition timing that are appropriate for the present operating state cannot be selected from among the plural basic MBT ignition timings and the plural basic knock limit ignition timings, respectively.

With this configuration, it is possible to obtain effects similar to the effects that can be obtained with the ignition timing control apparatus for an engine according to a fourth aspect of the invention.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE EXEMPLARY EMBODIMENTS

In the following description, the present invention will be described in more detail in terms of exemplary embodiments.

Figure 1:
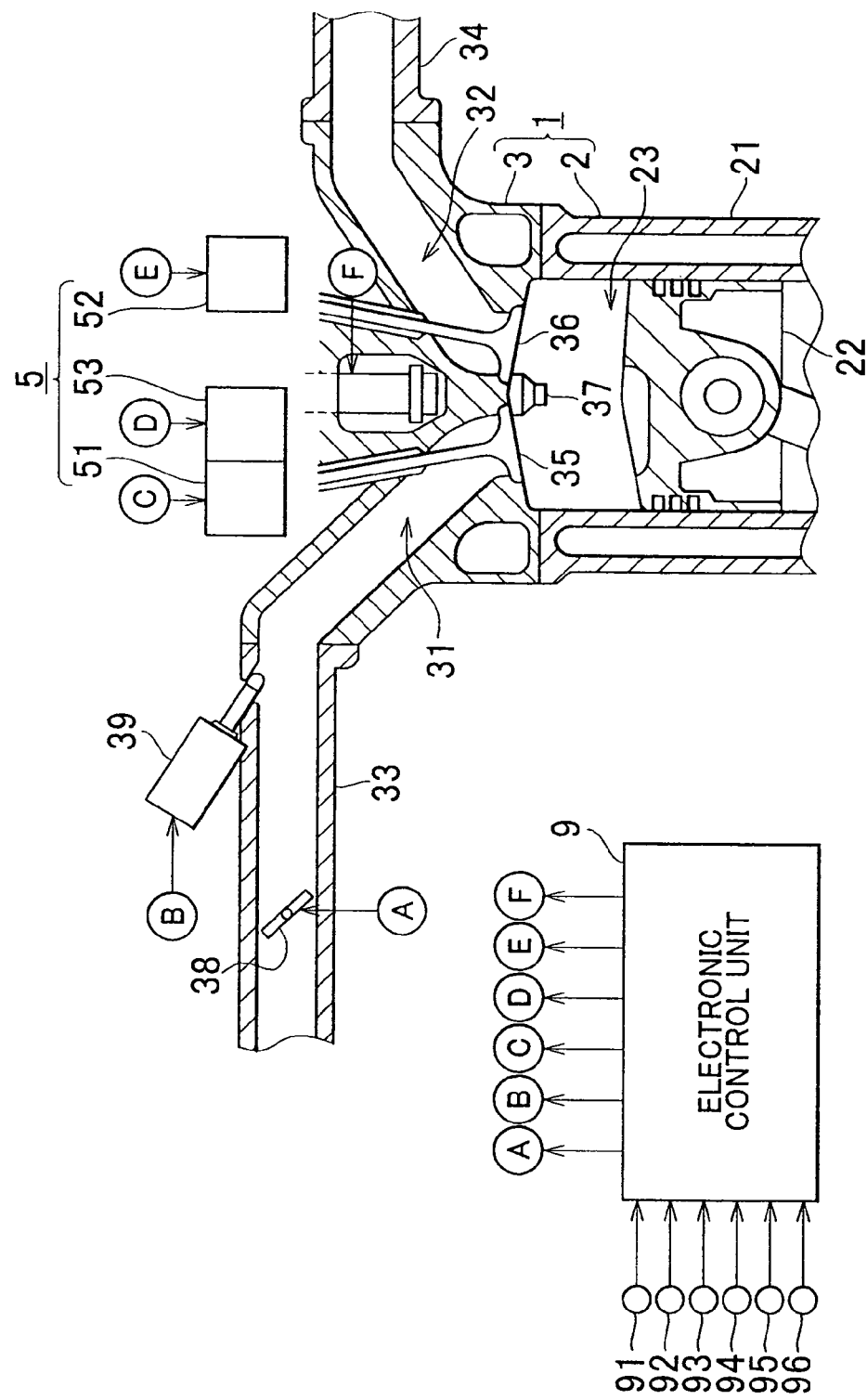
FIG. 1 is a diagram showing a structure of an engine to which an ignition timing control apparatus for an engine according to a first embodiment of the invention is applied.

A first embodiment of the invention will be described with reference to FIG. 1 to FIG. 54. In this embodiment, the invention is applied to an engine provided with a variable valve mechanism which can change a valve characteristic (a valve timing and the maximum valve lift amount) of an intake valve.

First, a structure of the engine will be described. FIG. 1 shows a sectional structure of an engine 1. The engine 1 includes a cylinder block 2 and a cylinder head 3.

A cylinder 21 is provided in the cylinder block 2. A piston 22 is housed in the cylinder 21 such that the piston 22 can be reciprocated. In the cylinder 21, a combustion chamber 23 is formed so as to be surrounded by an inner peripheral surface of the cylinder 21, a top surface of the piston 22, and the cylinder head 3.

An intake port 31 and an exhaust port 32 are provided in the cylinder head 3. An intake pipe 33 is connected to the intake port 31. Also, an intake valve 31 is provided. The intake valve 31 changes a state of connection between the intake pipe 33 and the combustion chamber 23 by opening/closing the intake port 31.

An exhaust pipe 34 is connected to the exhaust port 32. Also, an exhaust valve 36 is provided. The exhaust valve 36 changes a state of connection between the exhaust pipe 34 and the combustion chamber 23 by opening/closing the exhaust port 32.

An ignition plug 37 is provided in the cylinder head 3 at a portion which forms a top portion of the combustion chamber 23. The ignition plug 37 ignites, with a spark, air-fuel mixture formed by mixing fuel and air.

A throttle valve 38 is provided in the intake pipe 33. The throttle valve 38 adjusts a flow rate of air flowing in the intake pipe 33. Also, a port injector 39 is provided. The port injector 39 injects fuel toward the intake port 31.

A variable valve mechanism 5 is provided in the cylinder head 3. The variable valve mechanism 5 changes a valve characteristic of each of the intake valve 35 and the exhaust valve 36. The variable valve mechanism 5 includes an intake valve timing variable mechanism 51, an exhaust valve timing variable mechanism 52, and a maximum intake valve lift amount variable mechanism 53.

The intake valve timing variable mechanism 51 changes a valve timing of the intake valve 35 (i.e., an intake valve timing INVT). That is, the intake valve timing variable mechanism 51 changes a rotational phase of a cam shaft of the intake valve 35 with respect to a crank shaft of the engine 1. By changing the valve timing, a valve opening timing of the intake valve 35 (i.e., an intake valve opening timing IVO) and a valve closing timing of the intake valve 35 (i.e., an intake valve closing timing IVC) are advanced or retarded by the same crank angle.

Figure 2:
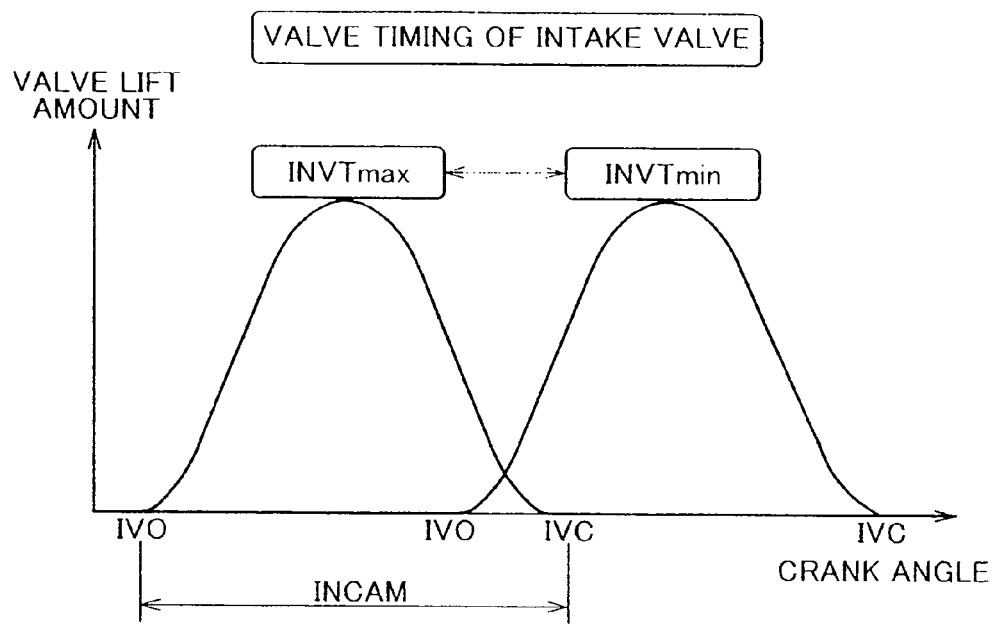
FIG. 2 is a diagram showing a mode in which an intake valve timing variable mechanism in the first embodiment changes an intake valve timing.

As shown in FIG. 2, the intake valve timing INVT is continuously changed in a range from the most advanced valve timing (i.e., the most advanced intake valve timing INVTmax) to the most retarded valve timing (i.e., the most retarded intake valve timing INVTmin). Also, while an opening period of the intake valve 35 (i.e., a crank angle from the intake valve opening timing IVO to the intake valve closing timing IVC) is maintained at a constant value, the intake valve opening timing IVO and the intake valve closing timing IVC are changed. Hereinafter, the opening period of the intake valve 35 will be referred to as "an intake valve working angle INCAM".

The exhaust valve timing variable mechanism 52 changes a valve timing of the exhaust valve 36 (i.e., an exhaust valve timing EXVT). That is, the exhaust valve timing variable mechanism 52 changes a rotational phase of a cam shaft of the exhaust valve 36 with respect to the crank shaft of the engine 1. By changing the valve timing, an opening timing of the exhaust valve 36 (i.e., an exhaust valve opening timing EVO) and a closing timing of the exhaust valve 36 (i.e., an exhaust valve closing timing EVC) are advanced or retarded by the same crank angle.

Figure 3:
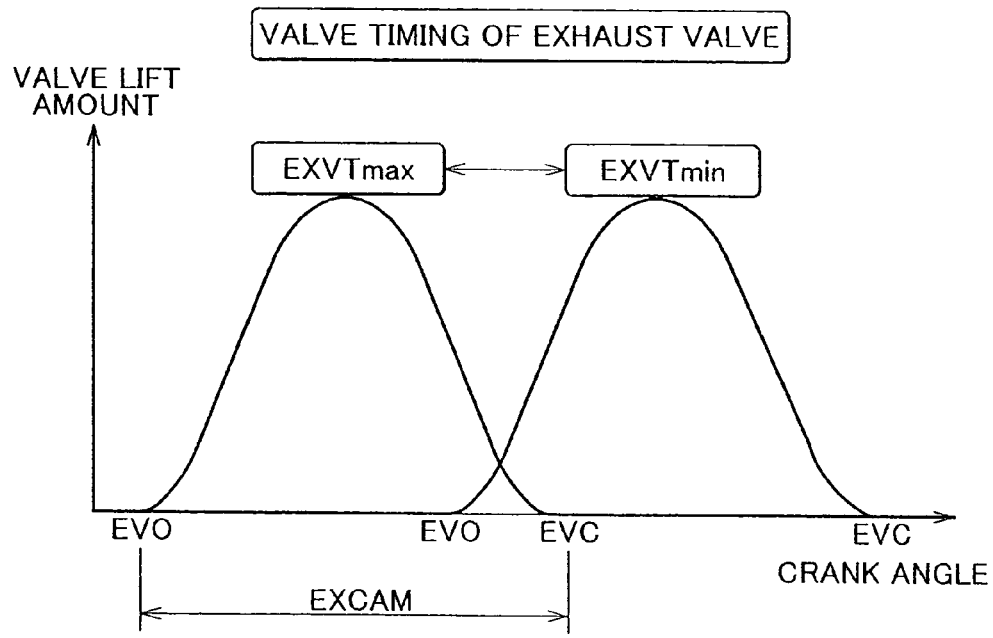
FIG. 3 is a diagram showing a mode in which an exhaust valve timing variable mechanism in the first embodiment changes an exhaust valve timing.

As shown in FIG. 3, the exhaust valve timing EXVT is continuously changed in a range form the most advanced valve timing (i.e., the most advanced exhaust valve timing EXVTmax) to the most retarded valve timing (i.e., the most retarded exhaust valve timing EXVTmin). Also, while an opening period of the exhaust valve 36 (i.e., a crank angle from the exhaust valve opening timing EVO to the exhaust valve closing timing EVC) is maintained at a constant value, the exhaust valve opening timing EVO and the exhaust valve closing timing EVC are changed. Hereinafter, the opening period of the exhaust valve 36 will be referred to as "an exhaust valve working angle EXCAM".

The maximum intake valve lift amount variable mechanism 53 changes the maximum valve lift amount (the maximum intake valve lift amount INVL) of the intake valve 35. Also, the maximum intake valve lift amount variable mechanism 53 changes the intake valve working angle INCAM as well as the maximum intake valve lift amount INVL.

Figure 4:
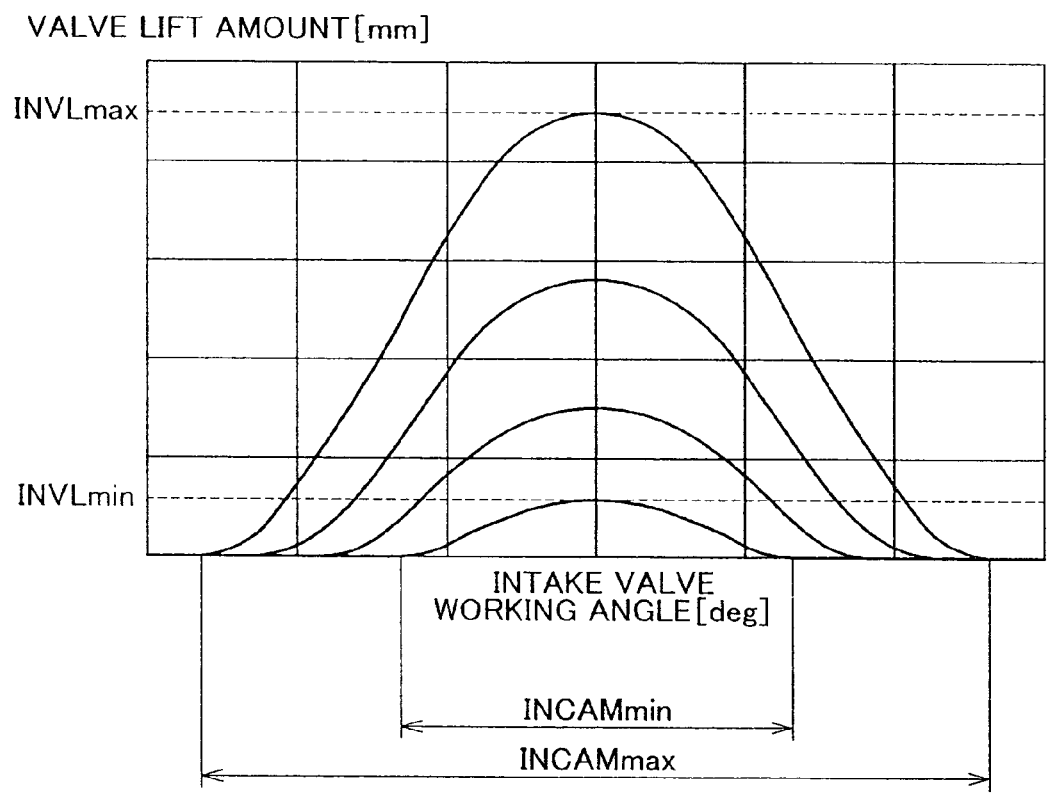
FIG. 4 is a diagram showing a mode in which a maximum intake valve lift amount variable mechanism in the first embodiment changes the maximum intake valve lift amount.

As shown in FIG. 4, the maximum intake valve lift amount INVL is continuously changed in a range from the largest maximum valve lift amount (i.e., an upper limit maximum valve lift amount INVLmax) to the smallest maximum valve lift amount (i.e., a lower limit maximum valve lift amount INVLmin). According to this change in the maximum intake valve lift amount INVL, the intake valve working angle INCAM is continuously changed in a range from the largest valve working angle (i.e., the largest intake valve working angle INCAMmax) to the smallest valve working angle (i.e., the smallest intake valve working angle INCAMmin).

In the engine 1, when the intake valve timing variable mechanism 51 and the maximum intake valve lift amount variable mechanism 53 changes the valve characteristic of the intake valve 35, the opening/closing characteristic of the intake valve 35 (at least one of the intake valve opening timing IVO and the intake valve closing timing IVC) is changed.

The engine 1 is provided with an electronic control unit 9 which controls a fuel injection amount, an ignition timing, the valve characteristic (combination of the valve timing and the maximum valve lift amount), and the like. The control means is configured to include the electronic control unit 9.

The electronic control unit 9 includes a CPU, memory, and an input port and an output port. The CPU performs computations relating to engine control. The memory stores programs and information necessary for the engine control. Signals from sensors described below are input to the electronic control unit 9 through the input port, and the electronic control unit 9 outputs signals to devices described below through the output port.

The input port of the electronic control unit 9 is connected to the following sensors 91 to 96 for detecting an engine operating state. A rotational speed sensor 91 detects a rotational speed of the crank shaft of the engine I (i.e., an engine rotational speed NE). A throttle valve opening amount sensor 92 detects an opening amount of the throttle valve (i.e., a throttle valve opening amount TA). An air flow meter 93 detects a flow rate of air flowing in the intake pipe 33 (i.e., an intake air amount GA). An intake valve timing sensor 94 detects the intake valve timing INVT. An exhaust valve timing sensor 95 detects the exhaust valve timing EXVT. A maximum intake valve lift amount sensor 96 detects the maximum intake valve lift amount INVL.

The output port of the electronic control unit 9 is connected to the ignition plug 37, the throttle valve 38, the port injector 39, the intake valve timing variable mechanism 51, the exhaust valve timing variable mechanism 52, the maximum intake valve lift amount variable mechanism 53, and the like.

The electronic control unit 9 adjusts the intake air amount by performing cooperative control of the intake valve timing variable mechanism 51, the maximum intake valve lift amount variable mechanism 53, and the throttle valve 38 so that the actual intake air amount (i.e., the intake air amount GA) becomes equal to a requested value of the intake air amount (i.e., a requested intake air amount GAreq). The requested intake air amount GAreq is calculated based on an operation amount of an accelerator pedal and the like.

Hereinafter, description will be made of each valve characteristic (the valve timing and the maximum valve lift amount) of the engine 1, which is used in control of the maximum intake valve lift amount variable mechanism 53, ignition timing control, and the like in the first embodiment of the invention.

[A] A target cam Ctrg indicates a target valve characteristic, which is set based on an operating state of the engine 1.
  [B] An optimal cam Cbst indicates a valve characteristic which makes a fuel consumption rate optimal. In the optimal cam Cbst, a valve overlap amount OVLP is set to a value larger than "0". The optimal cam Cbst is equivalent to the valve characteristic in the first operating state.
  [C] An initial cam Cdfl indicates a valve characteristic which can suppress deterioration of emission while the engine 1 is cold. In the initial cam Cdfl, the valve overlap amount OVLP is set to "0". The initial cam Cdfl is equivalent to the valve characteristic in the second operating state.
  [D] A reference cam Ctdc indicates a valve characteristic in which the intake valve opening timing IVO is at a top dead center (TDC), and the intake valve closing timing is at a bottom dead center (BDC). In this embodiment, the crank angle at the top dead center is "0" degree.
  [E] A present cam Cnow indicates a present valve characteristic.

Each of parameters in each of the aforementioned valve characteristics will be referred to as follows.

[1] Optimal Cam
    An intake valve opening timing IVO in the optimal cam Cbst is referred to as an optimal cam intake valve opening timing IVObst. An intake valve closing timing IVC in the optimal cam Cbst is referred to as an optimal cam intake valve closing timing IVCbst. An exhaust valve closing timing EVC in the optimal cam Cbst is referred to as an optimal cam exhaust valve closing timing EVCbst. A valve overlap amount OVLP in the optimal cam Cbst is referred to as an optimal cam overlap amount OVLPbst.
  [2] Initial Cam
    An intake valve opening timing IVO in the initial cam Cdfl is referred to as an initial cam intake valve opening timing IVOdfl. An intake valve closing timing IVC in the initial cam Cdfl is referred to as an initial cam intake valve closing timing IVCdfl. An exhaust valve closing timing EVC in the initial cam Cdfl is referred to as an initial cam exhaust valve closing timing EVCdfl.
  [3] Reference Cam
    An intake valve opening timing IVO in the reference cam Ctdc is referred to as a reference cam intake valve opening timing IVOtdc. An intake valve closing timing IVC in the reference cam Ctdc is referred to as a reference cam intake valve closing timing IVCtdc. An exhaust valve closing timing EVC in the reference cam Ctdc is referred to as a reference cam exhaust valve closing timing EVCtdc.
  [4] Present Cam
    An intake valve opening timing IVO in the present cam Cnow is referred to as a present cam intake valve opening timing IVOnow. An intake valve closing timing IVC in the present cam Cnow is referred to as a present cam intake valve closing timing IVCnow. An exhaust valve closing timing EVC in the present cam Cnow is referred to as a present cam exhaust valve closing timing EVCnow. A valve overlap amount OVLP in the present cam Cnow is referred to as a present cam overlap amount OVLPnow.

The optimal cam intake valve opening timing IVObst is equivalent to the basic valve opening timing. The optimal cam intake valve closing timing IVCbst is equivalent to the basic valve closing timing. The reference cam intake valve opening timing IVOtdc is equivalent to the reference valve opening timing. The reference cam intake valve closing timing IVCtdc is equivalent to the reference valve closing timing. The present cam intake valve opening timing IVOnow is equivalent to the present valve opening timing. The present cam intake valve closing timing IVCnow is equivalent to the present valve closing timing.

Hereinafter, description will be made of a mode in which the valve characteristic is set. The electronic control unit 9 sets the target cam Ctrg to the initial cam Cdfl when the engine 1 is cold. Also, basically, the electronic control unit 9 sets the target cam Ctrg to the optimal cam Cbst after warming-up of the engine 1 is completed. When a specific request is detected, the target cam Ctrg is set to a valve characteristic in accordance with the request.

The characteristic of the intake valve 35 (the intake valve timing INVT and the intake valve working angle INCAM) and the characteristic of the exhaust valve 34 (the exhaust valve timing EXVT) are changed as follows.

[A] When the engine 1 is cold, the intake valve timing INVT and the intake valve working angle INCAM (the maximum intake valve lift amount INVL) are maintained at the values in the initial cam Cdfl. Also, the exhaust valve timing EXVT is maintained at the value in the initial cam Cdfl.
  [B] After warming-up of the engine 1 is completed, basically, the intake valve timing INVT and the intake valve working angle INCAM are changed according to the requested intake air amount GAreq. Also, the exhaust valve timing EXVT is maintained at a constant valve timing (i.e., a steady exhaust valve timing EXVTst) unless a specific request is made.

The electronic control unit 9 selects the characteristic of the intake valve 35 according to the operating state of the engine 1 using an intake cam selection map. In the intake cam selection map, the characteristic of the intake valve 35 (the intake valve timing INVT and the intake valve working angle INCAM) in each of the optimal cam Cbst, the initial cam Cdfl, and the reference cam Ctdc is set on a valve timing-valve working angle diagram. The intake cam selection map is stored in advance in the electronic control unit 9.

Figure 5:
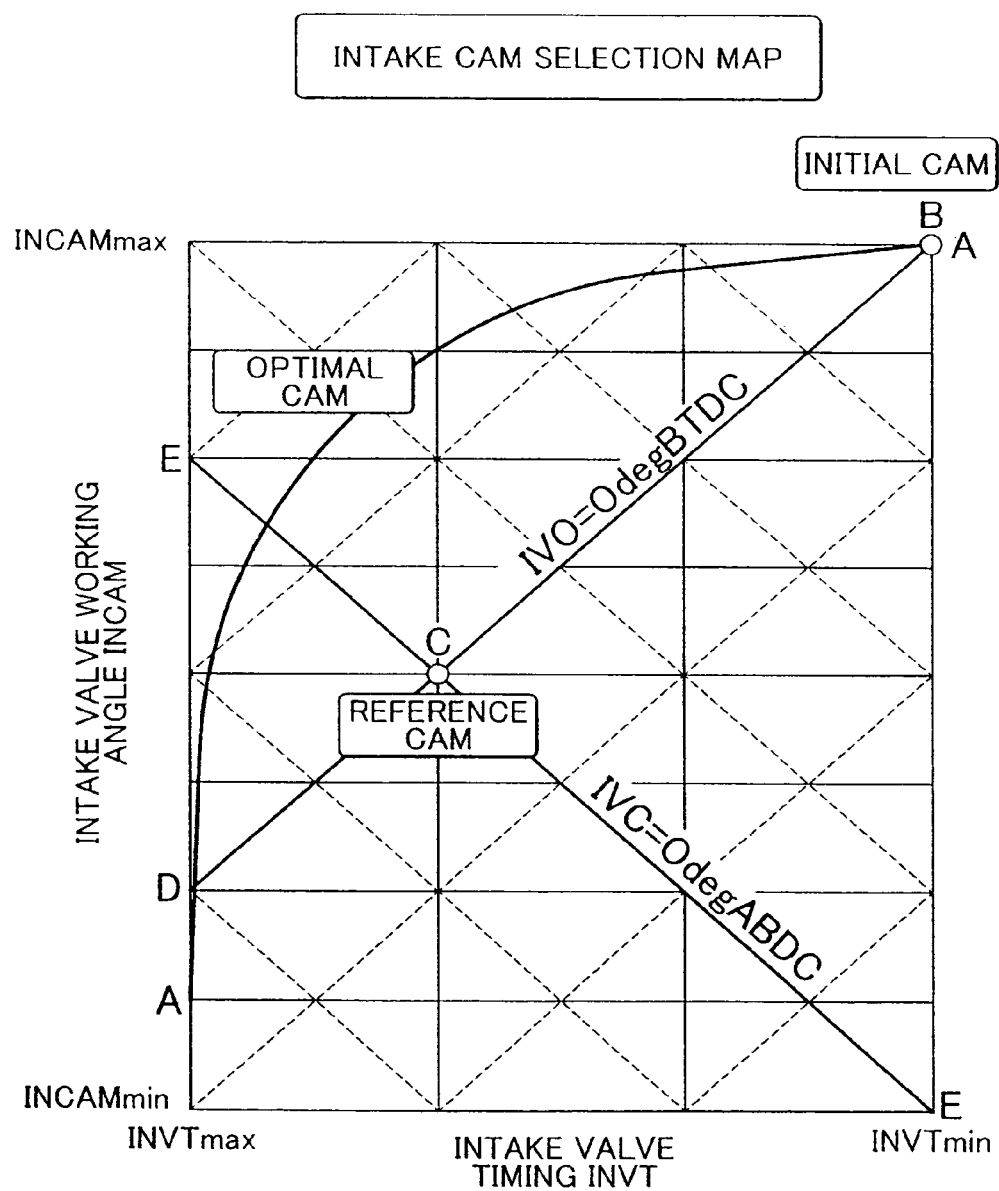
FIG. 5 is a diagram showing an example of an intake cam selection map in the first embodiment.

FIG. 5 shows one example of the intake cam selection map. In the intake cam selection map, there are inclined lines indicating that the intake valve working angle INCAM is changed from the largest intake valve working angle INCAMmax to the smallest intake valve working angle INCAMmin as the intake valve timing INVT is changed from the most advanced intake valve timing INVTmax to the most retarded intake valve timing INVTmin. Each of the inclined lines is a uniform intake valve opening timing lines, and indicates valve characteristics whose intake valve opening timings IVO are uniform.

Also, there are inclined lines indicating that the intake valve working angle INCAM is changed from the smallest intake valve working angle INCAMmin to the largest intake valve working angle INCAMmax as the intake valve timing INVT is changed from the most advanced intake valve timing INVTmax to the most retarded intake valve timing INVTmin. Each of the inclined lines is a uniform intake valve closing timing line, and indicates valve characteristics whose intake valve closing timings IVC are uniform.

In the intake cam selection map, the optimal cam Cbst, the initial cam Cdfl, and the reference cam Ctdc are shown as follows. The intake valve timing INVT and the intake valve working angle INCAM in the optimal cam Cbst are shown by a curve A—A. The intake valve timing INVT and the intake valve working angle INCAM in the initial cam Cdfl are shown by a point B. The intake valve timing INVT and the intake valve working angle INCAM in the reference cam Ctdc are shown by a point C.

The electronic control unit 9 stores in advance an exhaust cam selection map, in addition to the aforementioned intake cam selection map. In the exhaust cam selection map, the characteristic of the exhaust valve 34 in each of the optimal cam Cbst, the initial cam Cdfl, and the reference cam Ctdc is set. The characteristics of the exhaust valve 34 in the optimal cam Cbst, the initial cam Cdfl, and the reference cam Ctdc are set so as to be related to the characteristics of the intake valve 35 in the optimal cam Cbst, the initial cam Cdfl, and the reference cam Ctdc, respectively.

When the electronic control unit 9 sets the target cam Ctrg based on the operating state of the engine 1, the electronic control unit 9 selects the characteristic of the intake valve 35 which corresponds to the operating state of the engine 1, using the intake cam selection map. Also, the electronic control unit 9 selects the characteristic of the exhaust valve 34 which corresponds to the operating state of the engine 1, using the exhaust cam selection map.

Based on the characteristic of the intake valve 35 and the characteristic of the exhaust valve 34, the target cam Ctrg is set. Then, an actuator of each of the intake valve timing variable mechanism 51, the exhaust valve timing variable mechanism 52, and the maximum intake valve lift amount variable mechanism 53 is driven so that the present cam Cnow matches the target cam Ctrg.

Hereinafter, description will be made of a mode in which an ignition timing is set. The electronic control unit 9 stores in advance a map in which an MBT ignition timing and a knock limit ignition timing that are appropriate for the optimal cam Cbst are set, and a map in which an MBT ignition timing and a knock limit ignition timing that are appropriate for the initial cam Cdfl are set. Each of the optimal cam Cbst and the initial cam Cdfl indicates the valve characteristic in the operating state for which an appropriate base ignition timing has already been obtained (i.e., the basic operating state).

When the target cam Ctrg is set to the optimal cam Cbst, the electronic control unit 9 sets the base ignition timing to one of the MBT ignition timing and the knock limit ignition timing in the optimal cam Cbst, which is more retarded than the other. The base ignition timing is ultimately applied to the ignition plug 37.

Meanwhile, when the target cam Ctrg is set to the initial cam Cdfl, the base ignition timing is set to one of the MBT ignition timing and the knock limit ignition timing in the initial cam Cdfl, which is more retarded than the other. The base ignition timing is ultimately applied to the ignition plug 37.

The MBT ignition timing is the ignition timing at which output torque and the fuel consumption rate become optimal in the present operating state. The knock limit ignition timing is most advanced in an ignition timing range where occurrence of knocking can be suppressed in the present operating state.

In the engine 1, basically, the variable valve mechanism 5 is controlled such that the present cam Cnow moves on the curve A—A in the intake cam selection map. However, since there is a difference between response of the intake valve timing variable mechanism 51 and response of the maximum intake valve lift amount variable mechanism 53, the present cam Cnow may be deviated from the optimal cam Cbst (i.e., the present cam Cnow may be deviated from the curve A—A in the intake cam selection map). In this case, a state in the combustion chamber 23 becomes different from a state in the combustion chamber 23 that is supposed to be when the appropriate MBT ignition timing and appropriate knock limit ignition timing in the optimal cam Cbst are set. Therefore, when the base ignition timing is set based on the MBT ignition timing and the knock limit ignition timing in the optimal cam Cbst, the output torque is decreased and the knock occurs.

These problems are caused not only when the present cam Cnow does not match the optimal cam Cbst, but also when the valve characteristic for which the appropriate MBT ignition timing and knock limit ignition timing are obtained in advance (i.e., the optimal cam Cbst and the initial cam Cdfl in this embodiment) does not match the present valve characteristic. That is, when there is no ignition timing appropriate for the present cam Cnow among the MBT ignition timings and the knock limit ignition timings that are stored in advance, the aforementioned problems are caused.

Also, the aforementioned problems may be caused by factors other than the difference between the response of the intake valve timing variable mechanism 51 and the maximum intake valve lift amount variable mechanism 53. In the engine 1, the target cam Ctrg may be actively set to a valve characteristic other than the optimal cam Cbst and the initial cam Cdfl. For example, when the requested intake air amount GAreq sharply increases to a large extent, in order to sharply increase the actual intake air amount in response to the sharp increase in the requested intake air amount GAreq, the target cam Ctrg is set to a valve characteristic which makes it possible to meet this request. In this case as well, since the present cam Cnow becomes different from the optimal cam Cbst and the initial cam Cdfl, the aforementioned problems occur.

When the present cam Cnow is deviated from the optimal cam Cbst, there are the following differences between the state in the combustion chamber 23 at a time when the valve characteristic is the optimal cam Cbst and the state in the combustion chamber 23 at a time when the valve characteristic is the present cam Cnow.

[A] Since the valve timing (the intake valve opening timing IVO and the intake valve closing timing IVC) of the intake valve 35 in the present cam Cnow is different from that in the optimal cam Cbst, a temperature and a pressure in the combustion chamber 23 at a time when the valve characteristic is the present cam Cnow is different from those at a time when the valve characteristic is the optimal cam Cbst.

[B] Since the valve overlap amount OVLP in the present cam Cnow is different from the valve overlap amount OVLP in the optimal cam Cbst, an amount of residual gas in the combustion chamber 23 at a time when the valve characteristic is the present cam Cnow is different from that at a time when the valve characteristic is the optimal cam Cbst. The residual gas contains internal EGR gas that has flown out to the exhaust pipe 34 from the combustion chamber 23, and then has flown into the combustion chamber 23 from the exhaust pipe 34; and gas that has not flown out into the exhaust pipe 34 and remains in the combustion chamber 23.

Accordingly, in this embodiment, the difference between the state in the combustion chamber 23 at a time when the valve characteristic is the optimal cam Cbst and the state in the combustion chamber 23 at a time when the valve characteristic is the present cam Cnow is obtained, and the base ignition timing is set considering this difference.

Hereinafter, description will be made of a relationship between the valve timing, and the temperature and the pressure in the combustion chamber.

Figure 6:
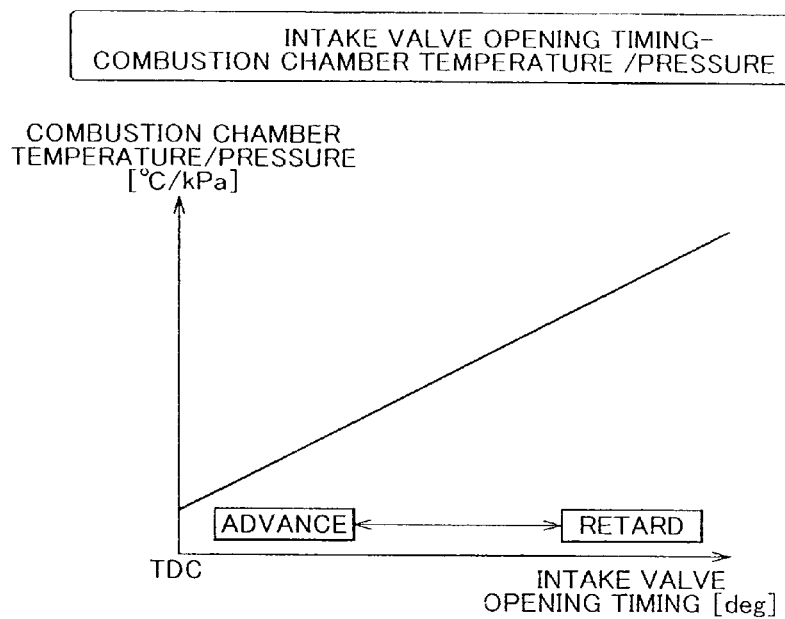
FIG. 6 is a graph showing a relationship between an intake valve opening timing, and a temperature/a pressure in a combustion chamber.

[1] Relationship between the intake valve opening timing, and the temperature and the pressure in the combustion chamber FIG. 6 shows a relationship between the intake valve opening timing IVO, and the temperature and the pressure in the combustion chamber 23.

During the intake stroke of the engine 1, while the valve lift amount of the intake valve 35 is small, an opening area of the intake port 31 is small. Therefore, a flow of air is sharply bent in the vicinity of the intake valve 35 (in the vicinity of a boundary between the combustion chamber 23 and the intake port 31), and then the air is taken into the combustion chamber 23 through a small gap between the intake valve 35 and a cylinder wall. At this time, as a flow speed of the air flowing into the combustion chamber 23 becomes higher, the direction of air flow is changed more sharply. Therefore, an amount of heat energy generated due to the change in the direction of air flow is increased (that is, the temperature of the air in the combustion chamber 23 is increased).

Accordingly, the intake valve 35 is opened under the condition that as the intake valve opening timing IVO is retarded in an ATDC range, a vacuum pressure in the combustion chamber 23 is increased (the flow speed of air is increased). Therefore, as the intake valve opening timing IVO is retarded in the ATDC range, the temperature and the pressure in the combustion chamber 23 are increased.

When the maximum intake valve lift amount INVL is large, the valve lift amount is small immediately after the intake port 31 is opened and immediately before the intake port 31 is closed. When the maximum intake valve lift amount INVL is small, the valve lift amount is small in the total range of the valve lift amount of the intake valve 35.

Figure 7:
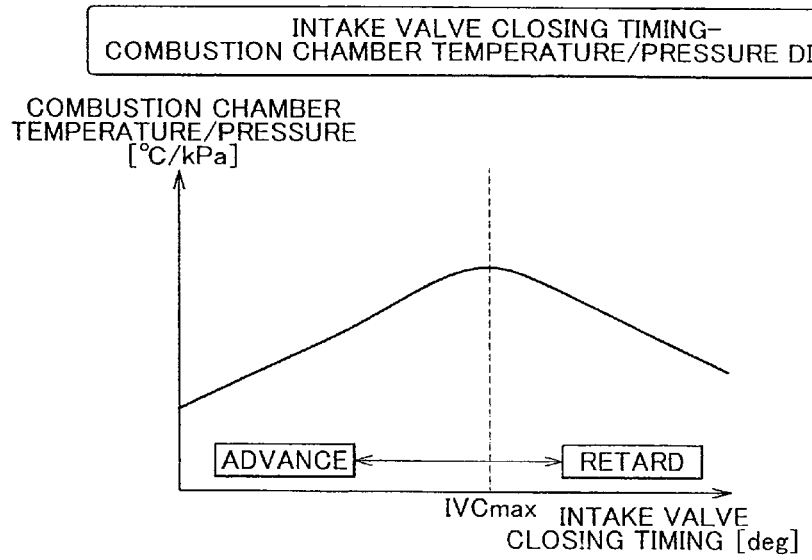
FIG. 7 is a graph showing a relationship between an intake valve closing timing, and the temperature/the pressure in the combustion chamber.

[2] Relationship Between the Intake Valve Closing Timing, and the Temperature and the Pressure in the Combustion Chamber FIG. 7 shows a relationship between the intake valve closing timing IVC, and the temperature and the pressure in the combustion chamber 23. During the intake stroke of the engine 1, when the pressure in the vicinity of the intake port 31 is increased by pulsation of the intake air, the flow speed of the air flowing into the combustion chamber 23 is increased.

Accordingly, in a case where the intake valve 35 is closed when filling efficiency becomes highest due to the pulsation of the intake air, since the flow speed of the air flowing into the combustion chamber 23 becomes high while the valve lift amount is small, the direction of air flow is sharply changed, and therefore the amount of heat energy generated due to the change in the direction of air flow is increased.

Thus, the temperature and the pressure in the combustion chamber 23 are changed with respect to the intake valve closing timing IVC as follows.

[A] The temperature and the pressure in the combustion chamber 23 become highest at the intake valve closing timing IVC at which the filling efficiency becomes highest (i.e., a highest filling efficiency closing timing IVCmax). Since inertia of the air taken into the combustion chamber 23 becomes larger as the engine rotational speed NE becomes higher, the highest filling efficiency closing timing IVCmax tends to be retarded as the engine rotational speed NE becomes higher.

[B] In a region in which the intake valve closing timing IVC is more advanced than the highest filling efficiency closing timing IVCmax, as the intake valve closing timing IVC is advanced with respect to the highest filling efficiency closing timing IVCmax, a degree of increase in the pressure caused by the pulsation of the intake air is decreased. Accordingly, as the intake valve closing timing IVC is advanced with respect to the highest filling efficiency closing timing IVCmax, the temperature and the pressure in the combustion chamber 23 are decreased.

[C] In a region in which the intake valve closing timing IVC is more retarded than the highest filling efficiency closing timing IVCmax, as the intake valve closing timing IVC is retarded with respect to the highest filling efficiency closing timing, an actual compression ratio of the air-fuel mixture in the combustion chamber 23 is decreased. Accordingly, as the intake valve closing timing IVC is retarded with respect to the highest filling efficiency closing timing IVCmax, the temperature and the pressure in the combustion chamber 23 are decreased. Basically, the highest filling efficiency closing timing IVCmax is more retarded than BDC.

Figure 8:
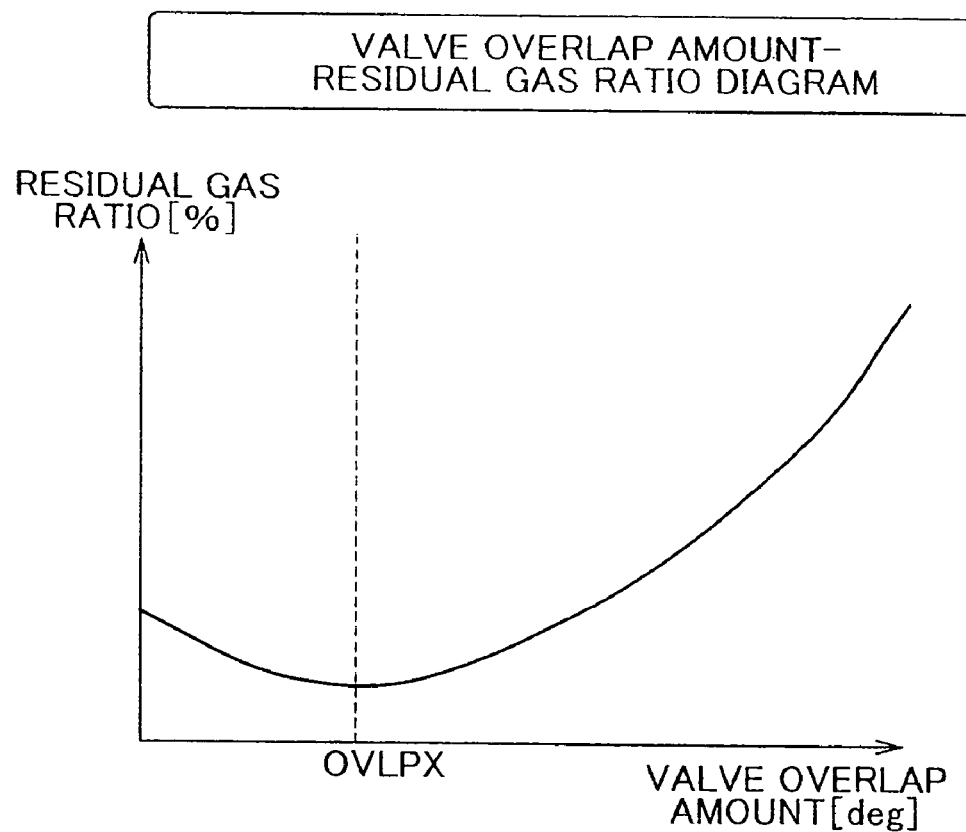
FIG. 8 is a graph showing a relationship between a valve overlap amount and a residual gas ratio.

Hereinafter, description will be made of a relationship between the valve overlap and the residual gas. FIG. 8 shows a relationship between the valve overlap amount OVLP and a residual gas ratio EGrate. The residual gas ratio EGrate shows a ratio of the residual gas amount to the intake air amount GA.

As the valve overlap amount OVLP is increased, the amount of the internal EGR gas flowing into the combustion chamber 23 from the exhaust pipe 34 is increased. Therefore, basically, the residual gas ratio EGrate is increased with an increase in the valve overlap amount OVLP. However, in a region in which the valve overlap amount OVLP is smaller than a reference overlap amount OVLPX, since efficiency of discharging combustion gas is increased with an increase in the valve overlap amount OVLP, the residual gas ratio EGrate tends to be decreased with an increase in the valve overlap amount OVLP.

That is, in the region in which the valve overlap amount OVLP is smaller than the reference overlap amount OVLPX, the residual gas ratio EGrate is decreased with an increase in the valve overlap amount OVLP. In a region in which the valve overlap amount OVLP is larger than the reference overlap amount OVLPX, the residual gas ratio EGrate is increased with an increase in the valve overlap amount OVLP.

Hereinafter, description will be made of a mode in which the MBT ignition timing and the knock limit ignition timing are corrected. In this embodiment, as parameters indicating the difference between the state in the combustion chamber 23 at a time when the valve characteristic is the optimal cam Cbst and the state in the combustion chamber 23 at a time when the valve characteristic is the present cam Cnow, the temperature and the pressure in the combustion chamber 23, and the residual gas ratio are employed. Based on the parameters, the MBT ignition timing and the knock limit ignition timing for the optimal cam Cbst are separately corrected. Thus, each of the MBT ignition timing and the knock limit ignition timing for the optimal cam Cbst is converted to an ignition timing appropriate for the present cam Cnow.

Hereinafter, description will be made of each of the aforementioned parameters in each valve characteristic. A temperature in the combustion chamber 23 at a time when the valve characteristic is the optimal cam Cbst is referred to as "an optimal cam combustion chamber temperature Tbst". A pressure in the combustion chamber 23 at a time when the valve characteristic is the optimal cam Cbst is referred to as "an optimal cam combustion chamber pressure Pbst". A residual gas ratio in the combustion chamber 23 at a time when the valve characteristic is the optimal cam Cbst is referred to as "an optimal cam residual gas ratio Gbst". A temperature in the combustion chamber 23 at a time when the valve characteristic is the present cam Cnow is referred to as "a present cam combustion chamber temperature Tnow". A pressure in the combustion chamber 23 at a time when the valve characteristic is the present cam Cnow is referred to as "a present cam combustion chamber pressure Pnow". A residual gas ratio in the combustion chamber 23 at a time when the valve characteristic is the present cam Cnow is referred to as "a present cam residual gas ratio Gnow".

[1] Correction of the MBT ignition timing based on C change in the pressure in the combustion chamber When the present cam Cnow is deviated from the optimal cam Cbst, the present cam combustion chamber pressure Pnow becomes different from the optimal cam combustion chamber pressure Pbst according to the deviation between the present cam intake valve opening timing IVOnow and the optimal cam intake valve opening timing IVObst. Also, the present cam combustion chamber pressure Pnow becomes different from the optimal cam combustion chamber pressure Pbst according to the deviation between the present cam intake valve closing timing IVCnow and the optimal cam intake valve closing timing IVCbst.

Therefore, in order to appropriately set the MBT ignition timing when the present cam Cnow is deviated from the optimal cam Cbst, it is necessary to obtain the difference between the present cam combustion chamber pressure Pnow and the optimal cam combustion chamber pressure Pbest, and to set the MBT ignition timing considering this difference.

In this embodiment, a value indicating each of the optimal cam combustion chamber pressure Pbst and the present cam combustion chamber pressure Pnow is a pressure in the combustion chamber 23 at a time when the piston 22 reaches a compression top dead center while the air-fuel mixture is not ignited (i.e., a compression end pressure).

On the basis of a change amount of the compression end pressure (i.e., an IVO compression end pressure change amount) at a time when the intake valve opening timing IVO is changed from the optimal cam intake valve opening timing IVObst to the present cam intake valve opening timing IVOnow, and a change amount of the compression end pressure (i.e., an IVC compression end pressure change amount) at a time when the intake valve closing timing IVC is changed from the optimal cam intake valve closing timing IVCbst to the present cam intake valve closing timing IVCnow, calculations are performed to obtain a change amount of the compression end pressure (i.e., a pressure change amount in the combustion chamber 23) at a time when the valve characteristic is changed from the optimal cam Cbst to the present cam Cnow.

On the basis of the change amount of the compression end pressure, the MBT ignition timing for the optimal cam Cbst is corrected so as to compensate for deviation of the MBT ignition timing for the optimal cam Cbst from an optimal value, which is caused by the change in the pressure in the combustion chamber 23.

[2] Correction of the Knock Limit Ignition Timing Based on a Change in the Temperature in the Combustion Chamber When the present cam Cnow is deviated from the optimal cam Cbst, the present cam combustion chamber temperature Tnow becomes different from the optimal cam combustion chamber temperature Tbst according to the deviation between the present cam intake valve opening timing IVOnow and the optimal cam intake valve opening timing IVObst. Also, the present cam combustion chamber temperature Tnow becomes different from the optimal cam combustion chamber temperature Tbst according to the deviation between the present cam intake valve closing timing IVCnow and the optimal cam intake valve closing timing IVCbst.

Therefore, in order to appropriately set the knock limit ignition timing when the present cam Cnow is deviated from the optimal cam Cbst, it is necessary to obtain the difference between the present cam combustion chamber temperature Tnow and the optimal cam combustion chamber temperature Tbst, and to set the knock limit ignition timing considering this difference.

In this embodiment, a value indicating each of the optimal cam combustion chamber temperature Tbst and the present cam combustion chamber temperature Tnow is a temperature in the combustion chamber 23 at a time when the piston 22 reaches a compression top dead center while the air-fuel mixture is not ignited (i.e., a compression end temperature).

On the basis of a change amount of the compression end temperature (i.e., an IVO compression end temperature change amount) at a time when the intake valve opening timing IVO is changed from the optimal cam intake valve opening timing IVObst to the present cam intake valve opening timing IVOnow, and a change amount of the compression end temperature (i.e., an IVC compression end temperature change amount) at a time when intake valve closing timing IVC is changed from the optimal cam intake valve closing timing IVCbst to the present cam intake valve closing timing IVCnow, calculations are performed to obtain a change amount of the compression end temperature (i.e., a temperature change amount in the combustion chamber 23) at a time when the optimal cam Cbst is changed to the present cam Cnow.

On the basis of the temperature change amount in the combustion chamber 23, the knock limit ignition timing for the optimal cam Cbst is corrected so as to compensate for deviation of the knock limit ignition timing for the optimal cam Cbst from an optimal value, which is caused by the change in the temperature in the combustion chamber 23.

[3] Correction of the MBT Ignition Timing and the Knock Limit Ignition Timing Based on a Change in the Residual Gas Ratio When the present cam Cnow is deviated from the optimal cam Cbst, the present cam residual gas ratio Gnow becomes different from the optimal cam Cbst residual gas ratio Gbst according to the difference between the optimal cam overlap amount OVLPbst and the present cam overlap amount OVLPnow.

Therefore, in order to appropriately set the MBT ignition timing and the knock limit ignition timing when the present cam Cnow is deviated from the optimal cam Cbst, it is necessary to obtain the difference between the present cam residual gas ratio Gnow and the optimal cam residual gas ratio Gbst, and to set the MBT ignition timing and the knock limit ignition timing considering the difference.

In this embodiment, a value indicating the difference between the present cam residual gas ratio Gnow and the optimal cam residual gas ratio Gbst is a ratio of the present cam overlap amount OVLPnow to the optimal cam overlap amount OVLPbst (i.e., overlap ratio).

On the basis of the overlap ratio, an overlap correction amount included in the MBT ignition timing for the optimal cam Cbst (i.e., a correction amount corresponding to the optimal cam overlap amount OVLPbst) is converted to a correction amount corresponding to the present cam overlap amount OVLPnow. Using this correction amount corresponding to the present cam overlap amount OVLPnow, each of the MBT ignition timing and the knock limit ignition timing for the optimal cam Cbst is corrected so as to compensate for deviation of each of the MBT ignition timing and the knock limit ignition timing from the optimal value, which is caused by the difference between the optimal cam residual gas ratio Gbst and the present cam residual gas ratio Gnow.

Hereinafter, an outline of an ignition timing setting routine will be described. In this embodiment, the base ignition timing is set by "a base ignition timing setting routine" shown in FIG. 15.

Figure 9:
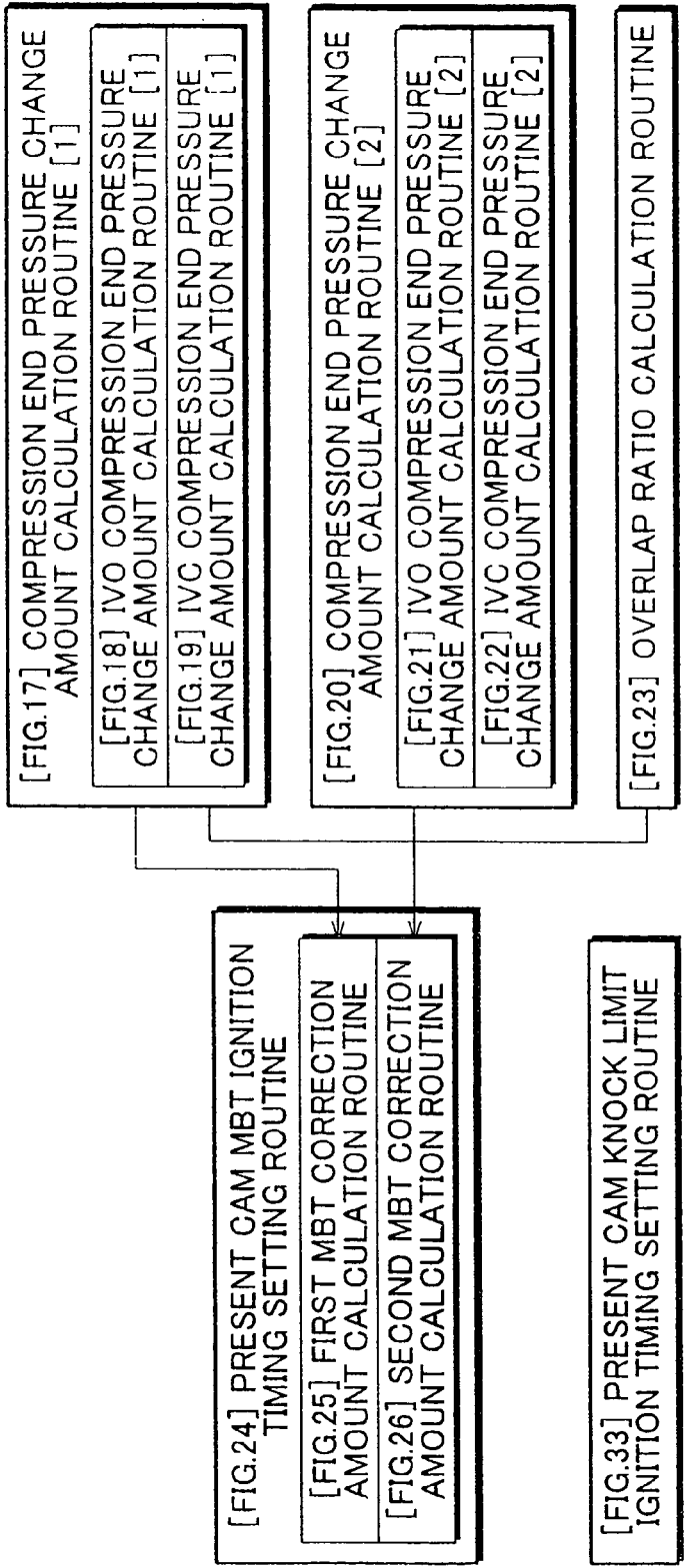
FIG. 9 is a diagram showing a structure of "a base ignition timing setting routine" which is performed in order to set a base ignition timing in the first embodiment.
Figure 10:
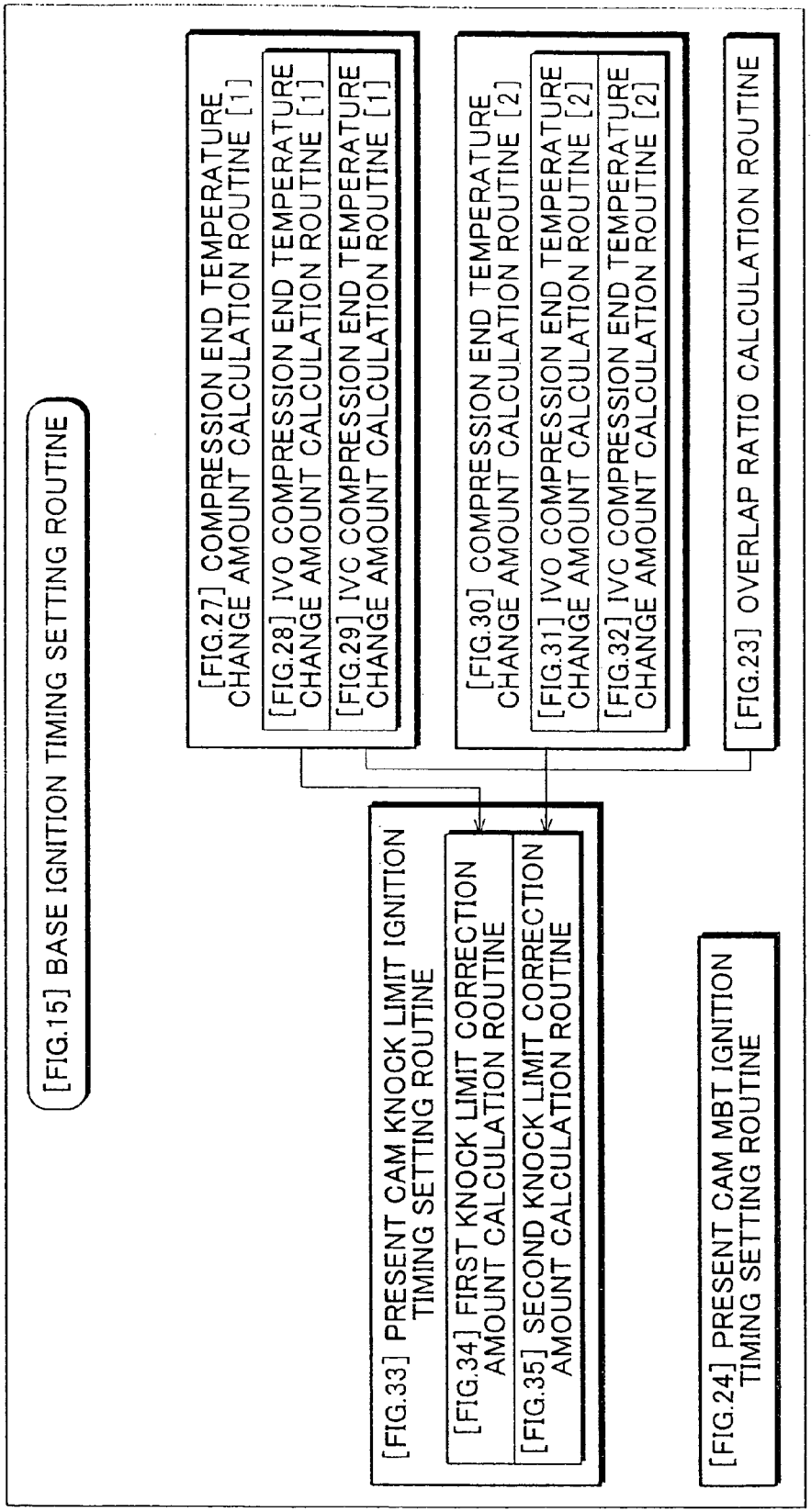
FIG. 10 is a diagram showing the structure of "the base ignition timing setting routine" which is performed in order to set the base ignition timing in the first embodiment.

FIG. 9 and FIG. 10 show a structure of "the base ignition timing setting routine". "The base ignition timing setting routine" is configured to include a present cam MBT ignition timing setting routine shown in FIG. 24; a present cam knock limit ignition timing setting routine shown in FIG. 33; a compression end pressure change amount calculation routine [1] shown in FIG. 17; a compression end pressure change amount calculation routine [2] shown in FIG. 20; a compression end temperature change amount calculation routine [1] shown in FIG. 27; a compression end temperature change amount calculation routine [2] shown in FIG. 30; and an overlap ratio calculation routine shown in FIG. 23.

Figure 25:
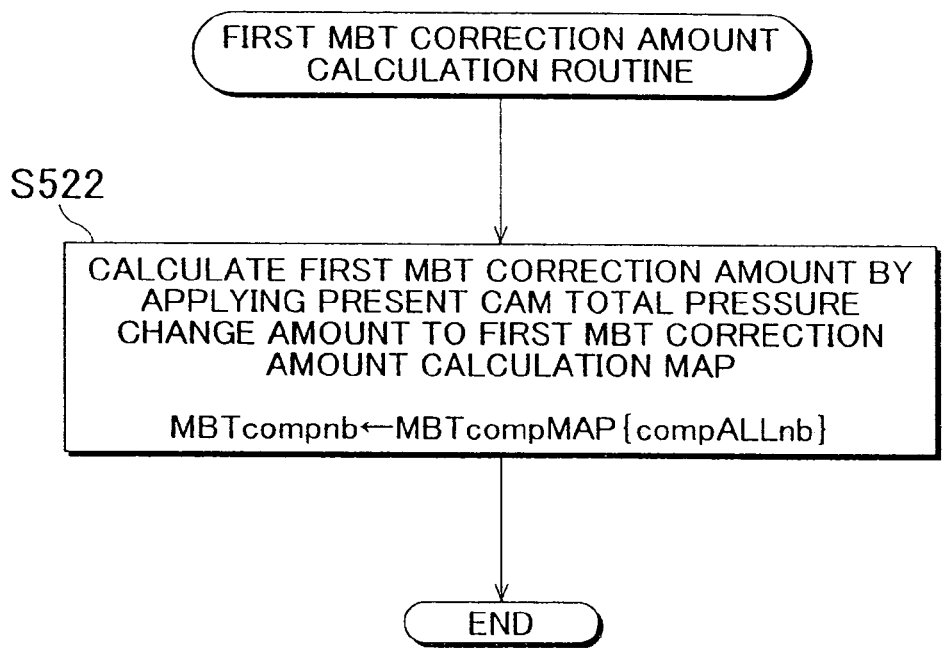
FIG. 25 is a flowchart showing steps of "a first MBT correction amount calculation routine" which is performed in order to calculate a first MBT correction amount in the first embodiment.
Figure 26:
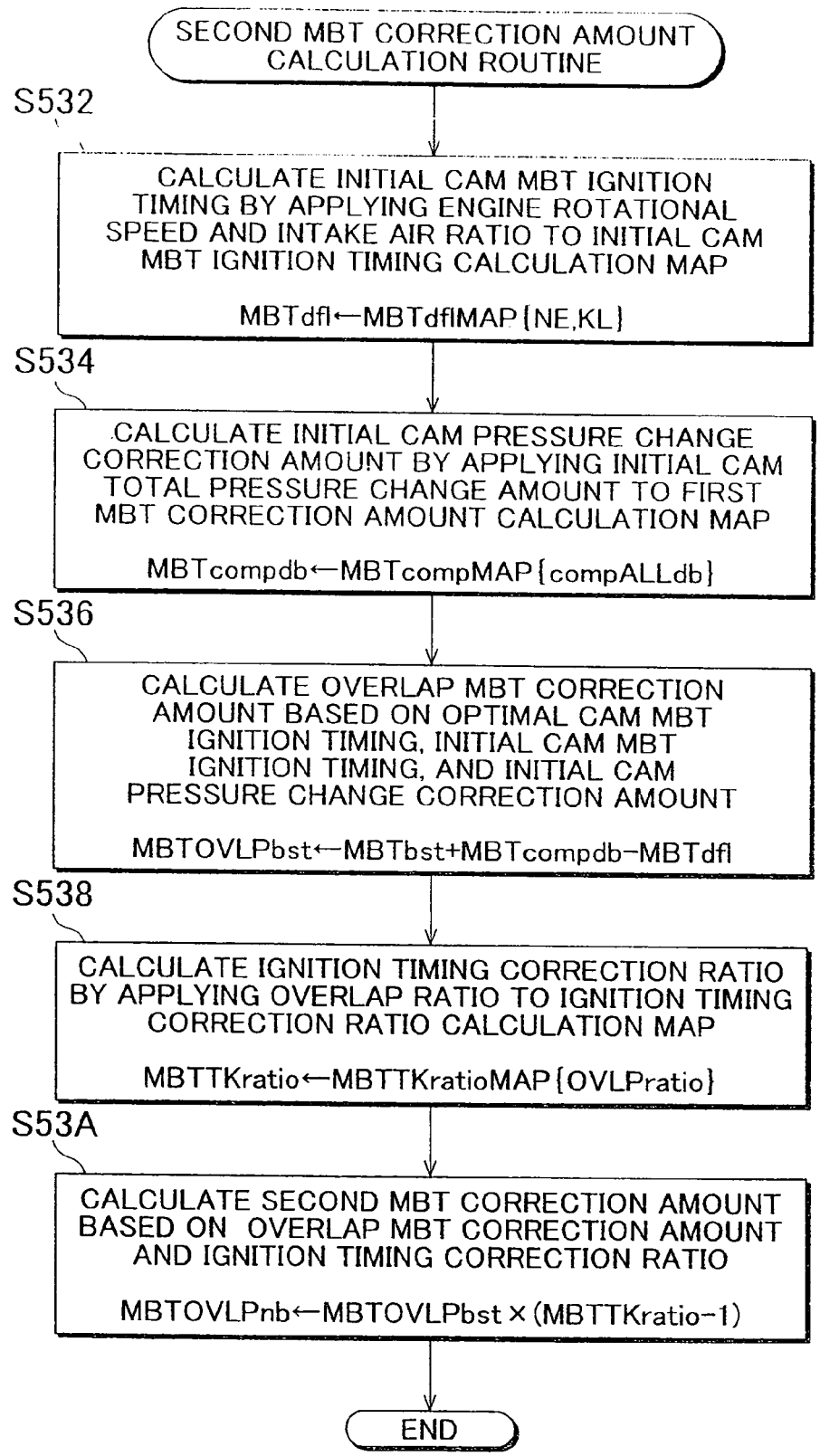
FIG. 26 is a flowchart showing steps of "a second MBT correction amount calculation routine" which is performed in order to calculate a second MBT correction amount in the first embodiment.

"The present cam MBT ignition timing setting routine" is configured to include a first MBT correction amount calculation routine shown in FIG. 25; and a second MBT correction amount calculation routine shown in FIG. 26.

Figure 34:
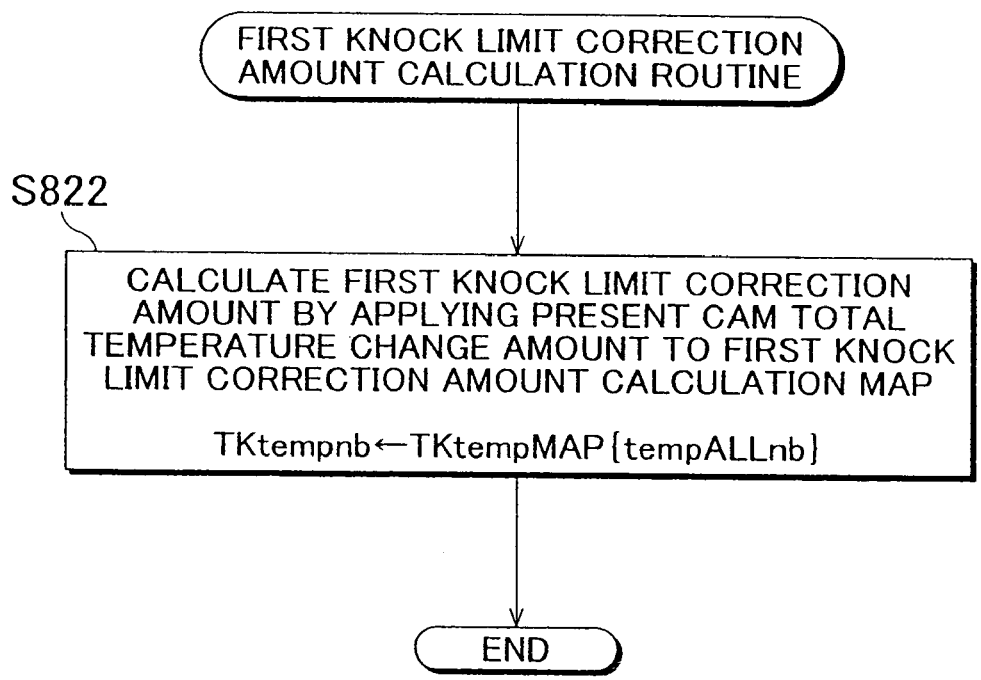
FIG. 34 is a flowchart showing steps of "a first knock limit correction amount calculation routine" which is performed in order to calculate a first knock limit correction amount in the first embodiment.
Figure 35:
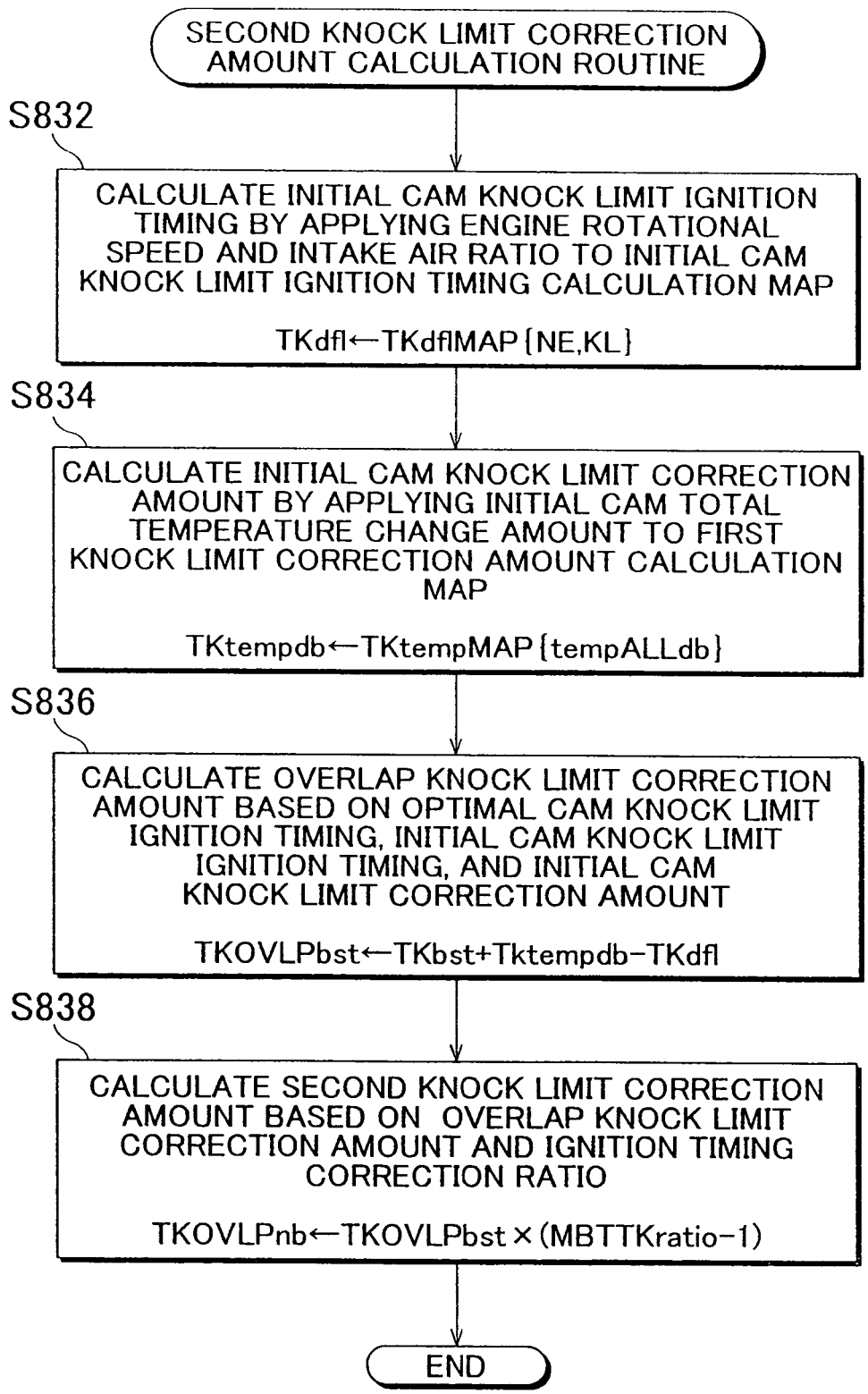
FIG. 35 is a flowchart showing steps of "a second knock limit correction amount calculation routine" which is performed in order to calculate a second knock limit correction amount in the first embodiment.

"The present cam knock limit ignition timing setting routine" is configured to include a first knock limit correction amount calculation routine shown in FIG. 34; and a second knock limit correction amount calculation routine shown in FIG. 35.

Figure 18:
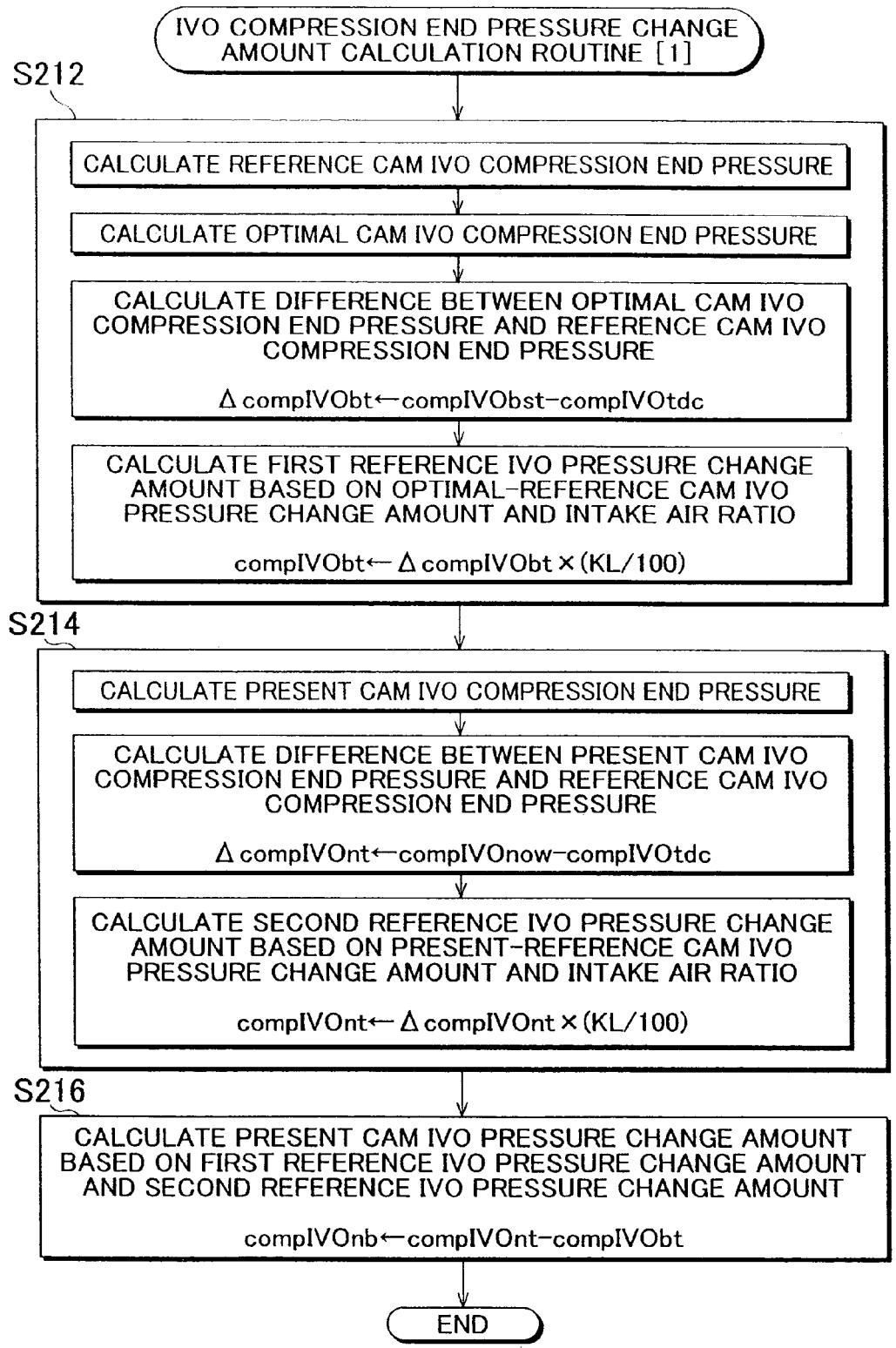
FIG. 18 is a flowchart showing steps of "an IVO compression end pressure change amount calculation routine [1]" which is performed in order to calculate a present cam IVO pressure change amount in the first embodiment.
Figure 19:
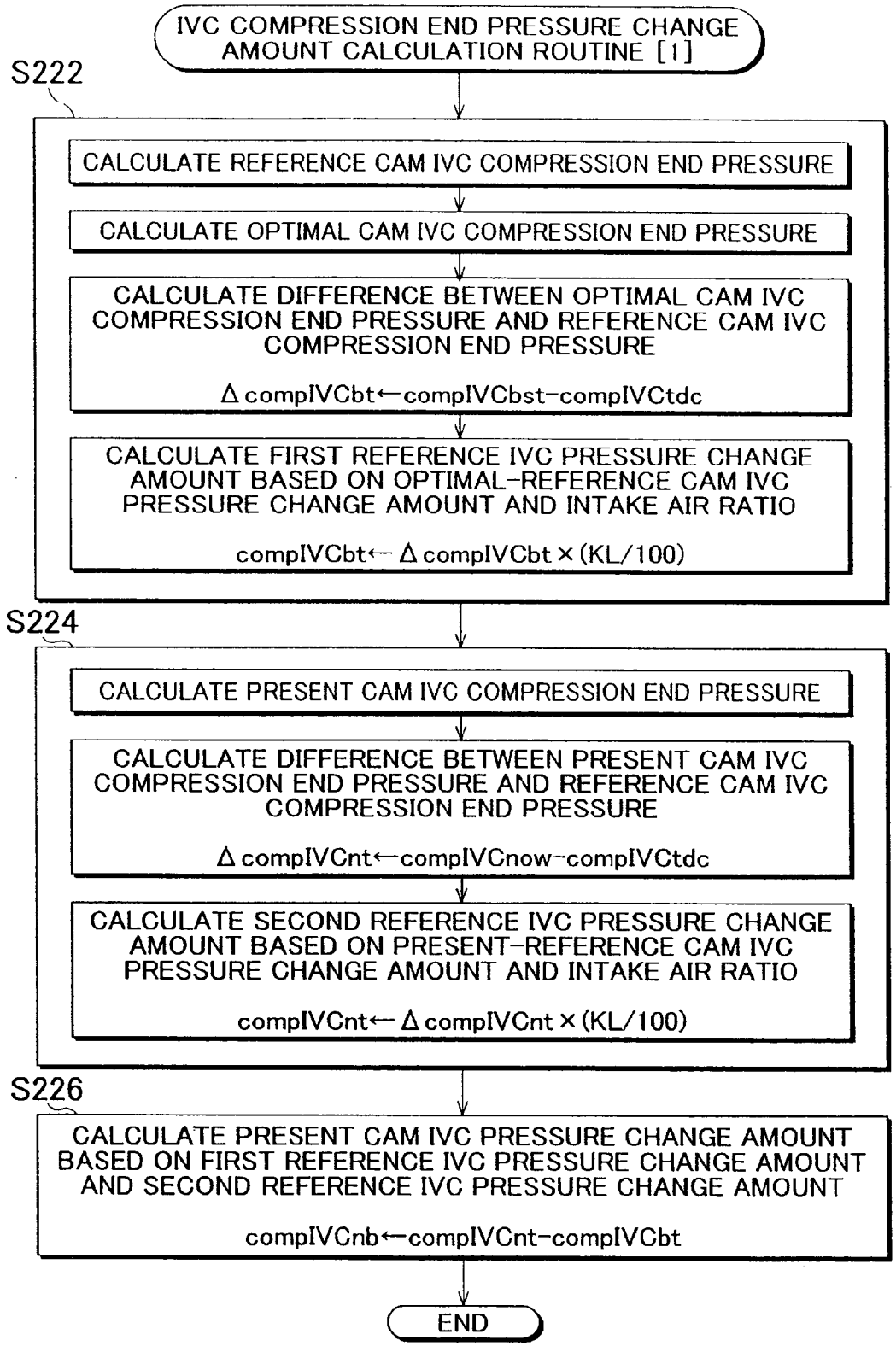
FIG. 19 is a flowchart showing steps of "an IVC compression end pressure change amount calculation routine [1]" which is performed in order to calculate a present cam IVC pressure change amount in the first embodiment.

"The compression end pressure change amount calculation routine [1]" is configured to include an IVO compression end pressure change amount calculation routine [1] shown in FIG. 18; and an IVC compression end pressure change amount calculation routine [1] shown in FIG. 19.

Figure 21:
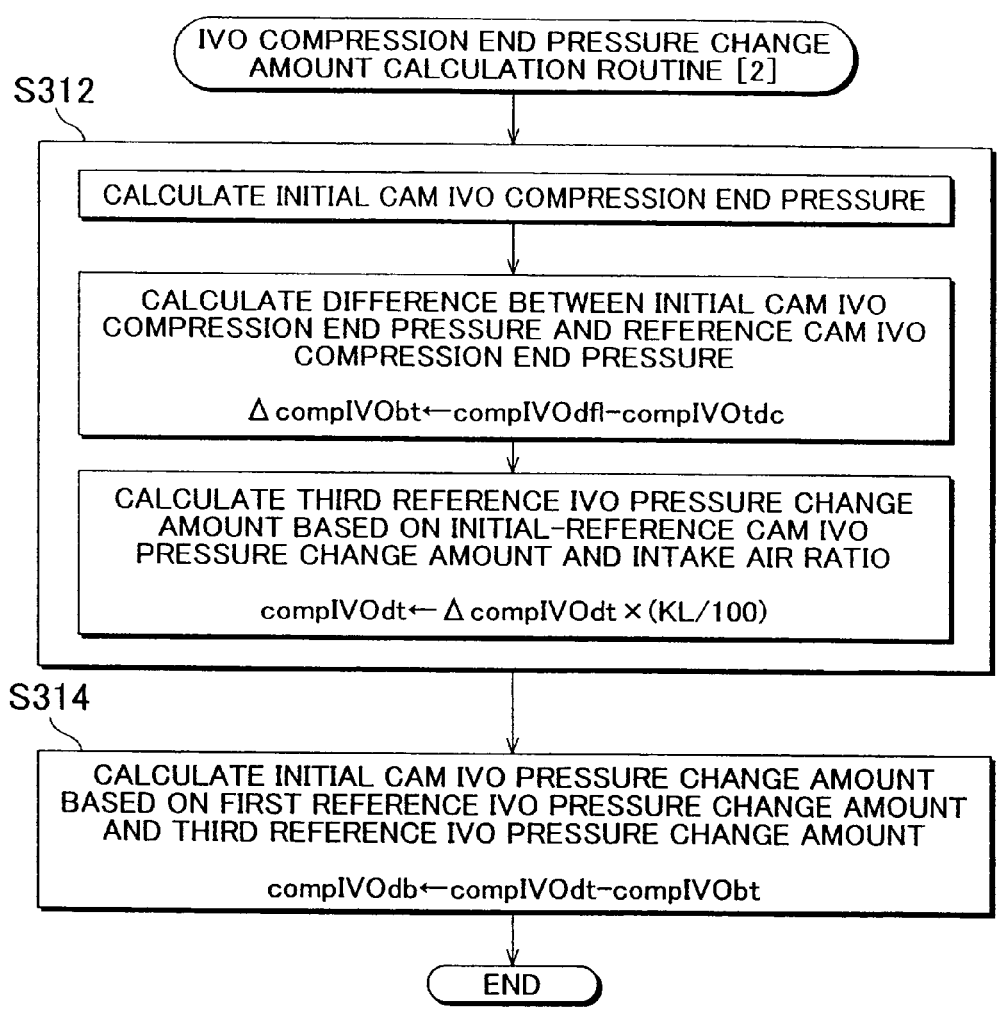
FIG. 21 is a flowchart showing steps of "an IVO compression end pressure change amount calculation routine [2]" which is performed in order to calculate an initial cam IVO pressure change amount in the first embodiment.
Figure 22:
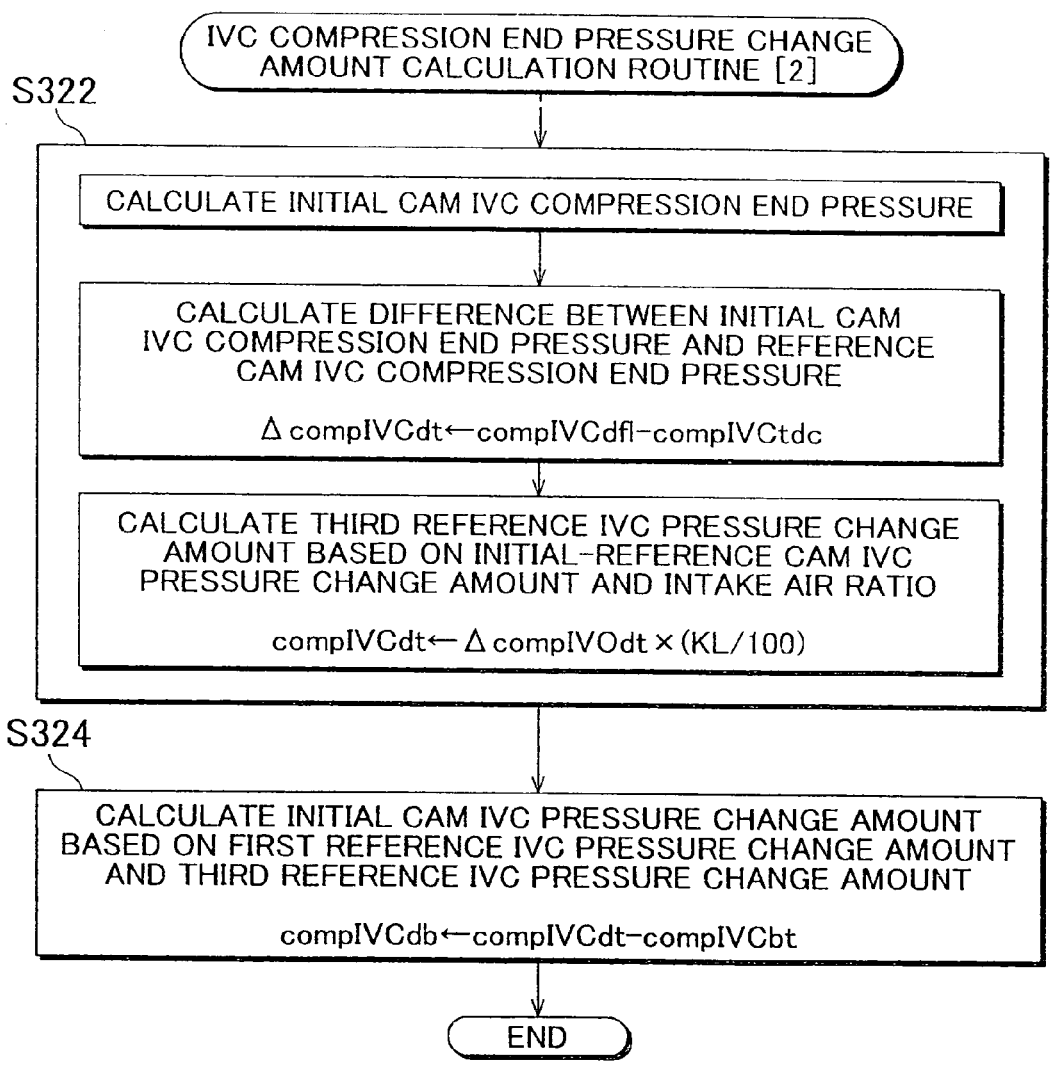
FIG. 22 is a flowchart showing steps of "an IVC compression end pressure change amount calculation routine [2]" which is performed in order to calculate an initial cam IVC pressure change amount in the first embodiment.

"The compression end pressure change amount calculation routine [2]" is configured to an IVO compression end pressure change amount calculation routine [2] shown in FIG. 21; and an IVC compression end pressure change amount calculation routine [2] shown in FIG. 22.

Figure 28:
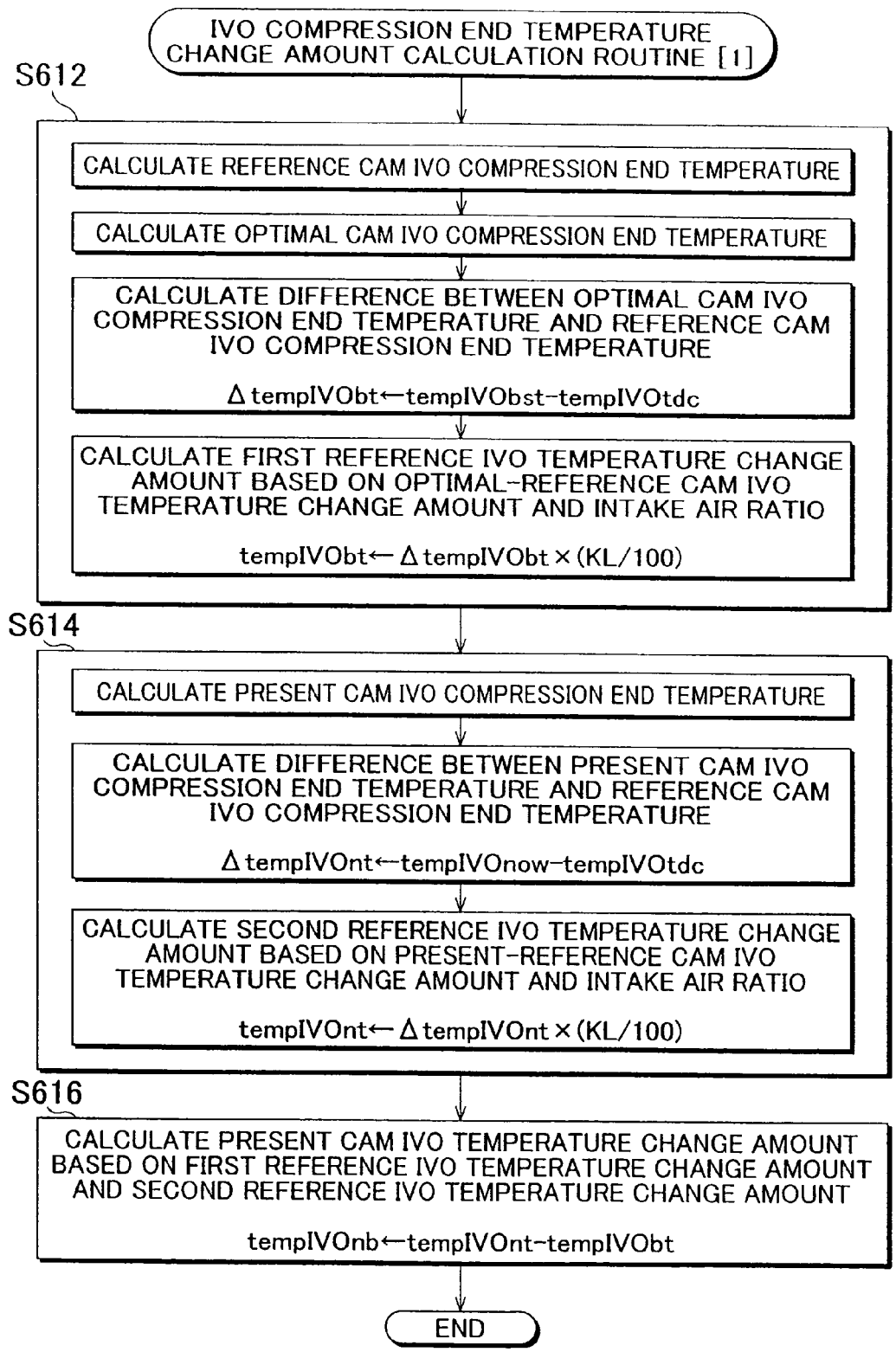
FIG. 28 is a flowchart showing steps of "an IVO compression end temperature change amount calculation routine [1]" which is performed in order to calculate a present cam IVO temperature change amount in the first embodiment.
Figure 29:
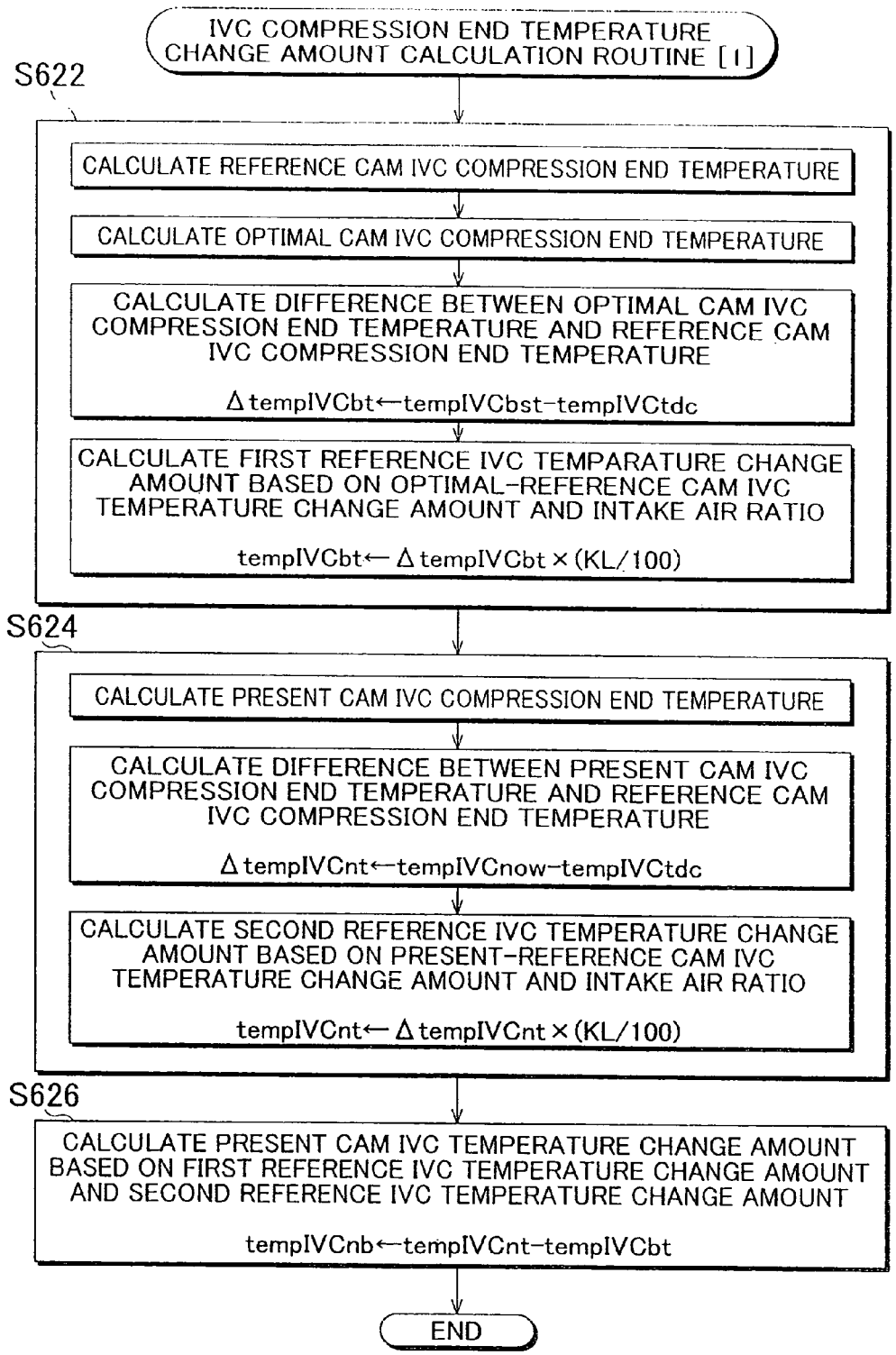
FIG. 29 is a flowchart showing steps of "an IVC compression end temperature change amount calculation routine [1]" which is performed in order to calculate a present cam IVC temperature change amount in the first embodiment.

"The compression end temperature change amount calculation routine [1]" is configured to include an IVO compression end temperature change amount calculation routine [1] shown in FIG. 28; and an IVC compression end temperature change amount calculation routine [1] shown in FIG. 29.

Figure 31:
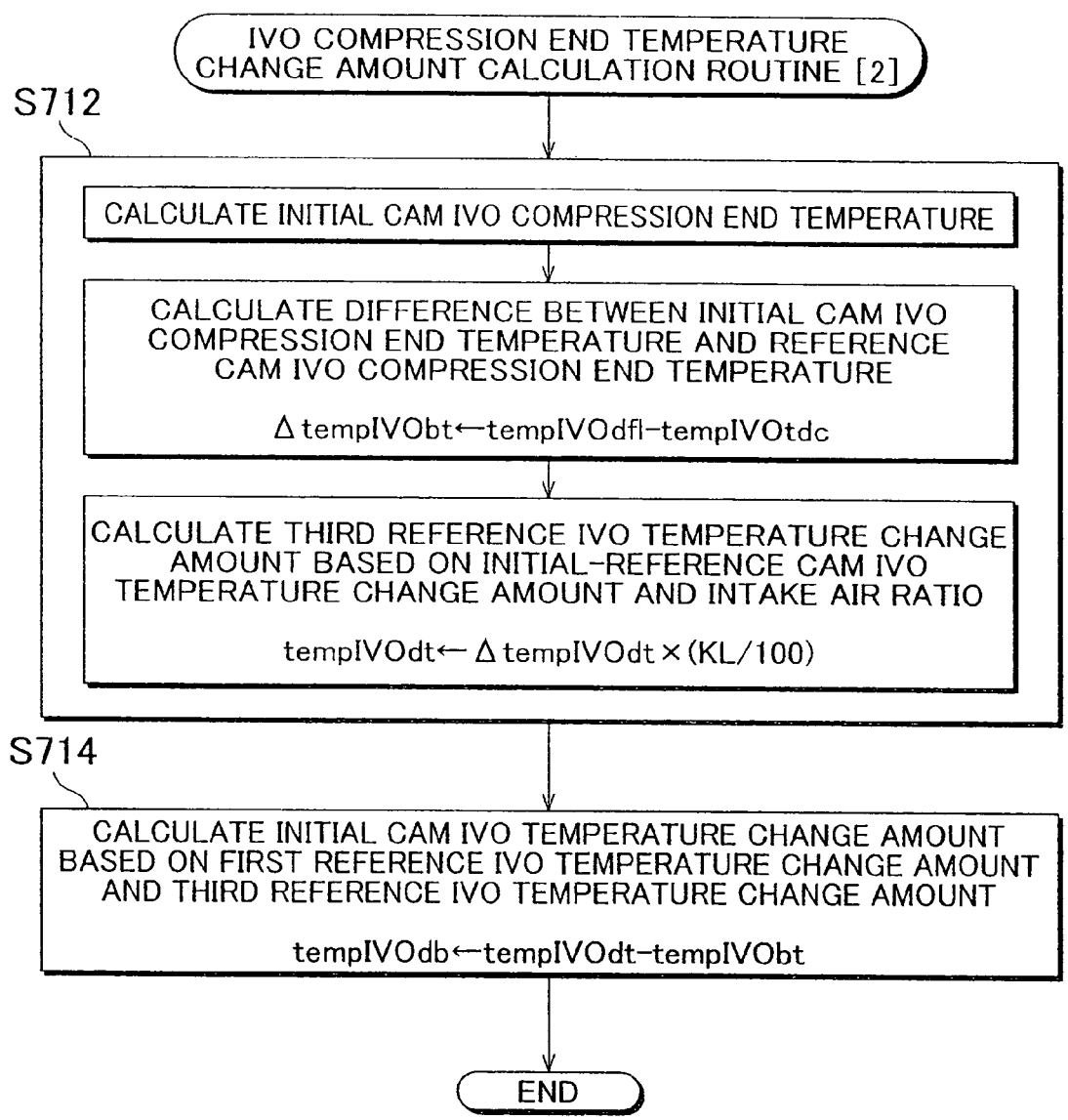
FIG. 31 is a flowchart showing steps of "an IVO compression end temperature change amount calculation routine [2]" which is performed in order to calculate an initial cam IVO temperature change amount in the first embodiment.
Figure 32:
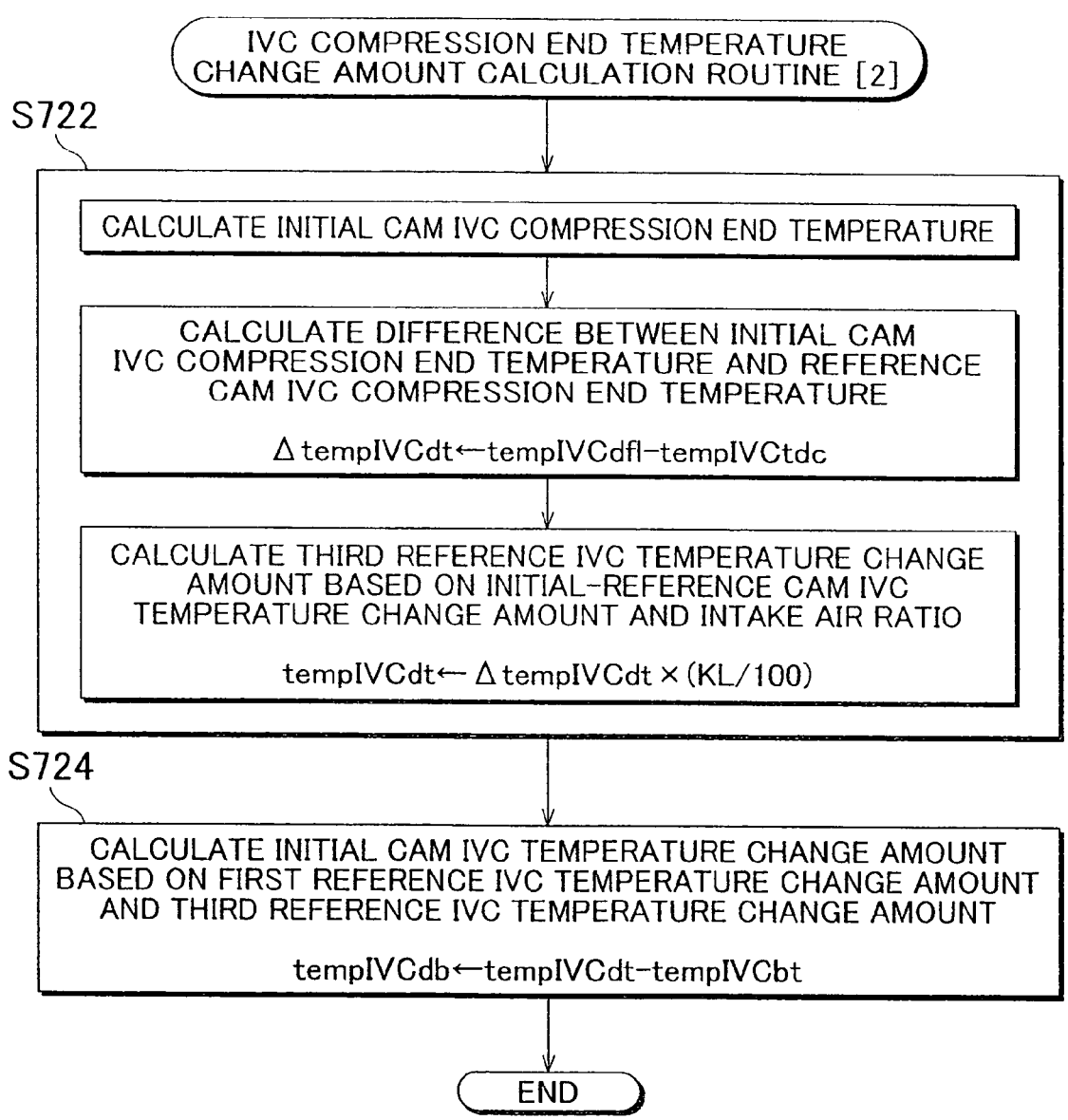
FIG. 32 is a flowchart showing steps of "an IVC compression end temperature change amount calculation routine [2]" which is performed in order to calculate an initial cam IVC temperature change amount in the first embodiment.

"The compression end temperature change amount calculation routine [2]" is configured to include an IVO compression end temperature change amount calculation routine [2] shown in FIG. 31; and an IVC compression end temperature change amount calculation routine [2] shown in FIG. 32.

Figure 11:
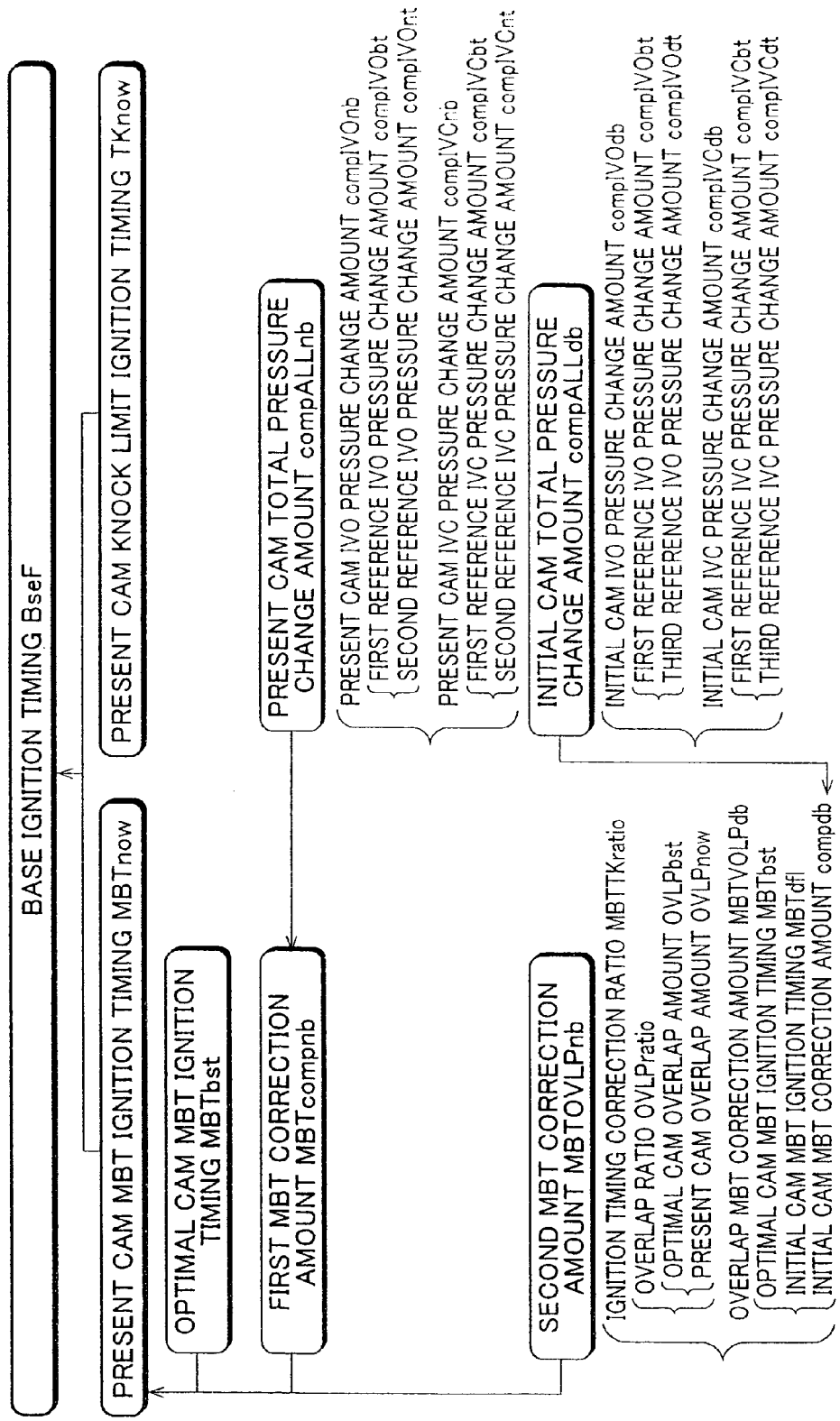
FIG. 11 is a diagram showing a relationship among parameters calculated through "the base ignition timing setting routine" in the first embodiment.
Figure 12:
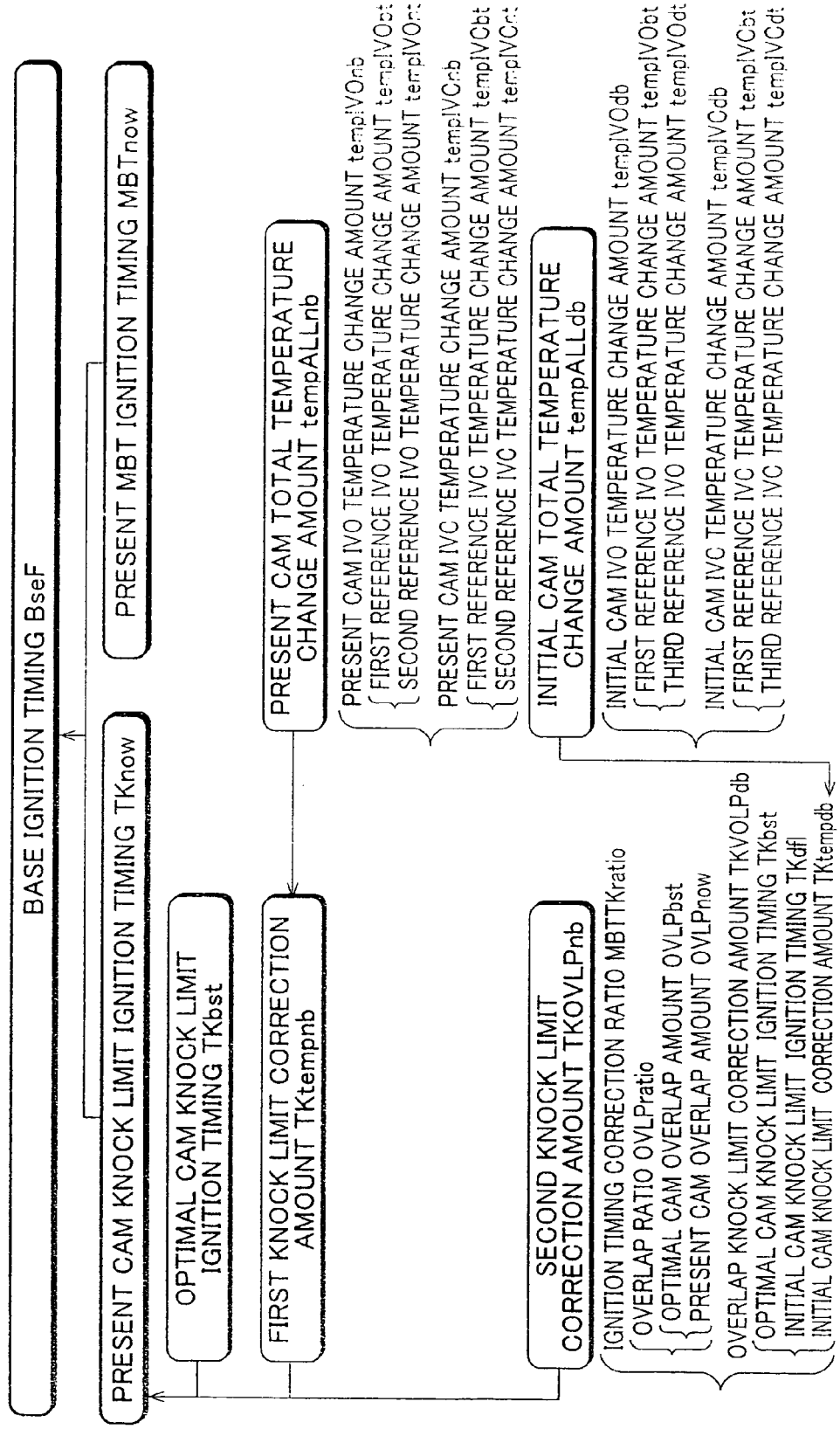
FIG. 12 is a diagram showing a relationship among parameters calculated through "the base ignition timing setting routine" in the first embodiment.

Referring to FIG. 9 to FIG. 12, an outline of each of the aforementioned routines will be described. FIG. 11 and FIG. 12 show a relationship among parameters calculated by the aforementioned routines.

[1] Base Ignition Timing Setting Routine

In this routine, a base ignition timing BseF is set to one of a present cam MBT ignition timing MBTnow calculated by "the present cam MBT ignition timing setting routine" and a present cam knock limit ignition timing TKnow calculated by "the present cam knock limit ignition timing setting routine", which is more retarded than the other.

"The base ignition timing BseF" is an ignition timing at which occurrence of knocking is suppressed, and the output torque and the fuel consumption rate becomes optimal in the operating state in which the present cam Cnow is selected.

Also, "the present cam MBT ignition timing MBTnow" is an ignition timing at which the output torque and the fuel consumption rate become optimal in the operating state in which the present cam Cnow is selected.

Also, "the present cam knock limit ignition timing TKnow" is the most advance ignition timing in an ignition timing range where occurrence of knocking can be suppressed in the operating state in which the present cam Cnow is selected.

[2] Present Cam MBT Ignition Timing Setting Routine

In this routine, the present cam MBT ignition timing MBTnow is calculated based on a first MBT correction amount MBTcompnb calculated by "the first MBTcorrection amount calculation routine", a second MBT correction amount MBTOVLPnb calculated by "the second MBT correction amount calculation routine", and an optimal cam MBT ignition timing MBTbst.

"The optimal cam MBT ignition timing MBTbst" is an ignition timing at which the output torque and the fuel consumption rate become optimal in the operating state in which the optimal cam Cbst is selected. The optimal cam MBT ignition timing MBTbst is equivalent to the first MBT ignition timing.

"The first MBT correction amount MBTcompnb" is a correction amount for the optimal cam MBT ignition timing MBTbst, which corresponds to the difference between the pressure in the combustion chamber 23 at a time when the valve characteristic is the optimal cam Cbst and that at a time when the valve characteristic is the present cam Cnow.

"The second MBT correction amount MBTOVLPnb" is a correction amount for the optimal cam MBT ignition timing MBTbst, which corresponds to the difference between the residual gas ratio at a time when the valve characteristic is the optimal cam Cbst and that at a time when the valve characteristic is the present cam Cnow.

[3] First MBT Correction Amount Calculation Routine

In this routine, the first MBT correction amount MBTcompnb is calculated based on a present cam total pressure change amount compALLnb calculated by "the compression end pressure change amount calculation routine [1]".

"The present cam total pressure amount compALLnb" is an estimated change amount of the compression end pressure at a time when the valve characteristic is changed from the optimal cam Cbst to the present cam Cnow. The present cam total pressure change amount compALLnb is equivalent to the state change amount according to the invention.

[4] Second MBT Correction Amount Calculation Routine

In this routine, an overlap MBT correction amount MBTOVLPbst is derived from the optimal cam MBT ignition timing MBTbst, using an initial cam MBT ignition timing MBTdfl and an initial cam MBT correction amount MBTcompdb. Then, the second MBT correction amount MBTOVLPnb is calculated based on the overlap MBT correction amount MBTOVLPbst and an ignition timing correction ratio MBTTKratio.

"The initial cam MBT ignition timing MBTdfl" is an ignition timing at which the output torque and the fuel consumption rate become optimal in the operating state in which the initial cam Cdfl is selected. The initial cam MBT ignition timing MBTdfl is equivalent to the second MBT ignition timing according to the invention.

Also, "the initial cam MBT correction amount MBTcompdb" is a correction amount for the initial cam MBT ignition timing MBTdfl, which corresponds to a difference between the pressure in the combustion chamber 23 at a time when the valve characteristic is the optimal cam Cbst and that at a time when the valve characteristic is the initial cam Cdfl (i.e., an initial cam total pressure change amount compALLdb).

Also, "the initial cam total pressure change amount compALLdb" is an estimated change amount of the compression end pressure at a time when the valve characteristic is changed from the optimal cam Cbst to the initial cam Cdfl. The initial cam total pressure change amount compALLdb is equivalent to the opening/closing state change amount according to the invention.

Also, "the overlap MBT correction amount MBTOVLPbst" is a correction amount for the MBT ignition timing, which corresponds to the valve overlap amount (the residual gas ratio) in the optimal cam Cbst. Note that the optimal cam MBT ignition timing MBTbst is a value that is set so as to include this correction amount.

Also, "the ignition timing correction ratio MBTTKratio" is a correction coefficient used for converting the ignition timing correction amount for the optimal cam Cbst to the ignition timing correction amount corresponding to the valve overlap amount in the present cam Cnow.

[5] Knock Limit Ignition Timing Setting Routine

In this routine, the present cam knock limit ignition timing TKnow is calculated based on a first knock limit correction amount TKtempnb that is calculated by "the first knock limit correction amount calculation routine", a second limit correction amount TKOVLPnb that is calculated by "the second knock limit correction amount calculation routine", and optimal cam knock limit ignition timing TKbst.

"The optimal cam knock limit ignition timing TKbst" is the most advanced ignition timing in the ignition timing range where occurrence of knocking can be suppressed in the operating state in which the optimal cam Cbst is selected. The optimal cam knock limit ignition timing TKbst is equivalent to the first knock limit ignition timing according to the invention.

Also, "the first knock limit correction amount TKtempnb" is a correction amount for the optimal cam knock limit ignition timing TKbst, which corresponds to the difference between the temperature in the combustion chamber 23 at a time when the valve characteristic is the optimal cam Cbst and that at a time when the valve characteristic is the present cam Cnow.

Also, "the second knock limit correction amount TKOVLPnb" is a correction amount for the optimal cam knock limit ignition timing TKbst, which corresponds to the difference between the valve overlap amount in the optimal cam Cbst and that in the present cam Cnow.

[6] First Knock Limit Correction Amount Calculation Routine

In this routine, the first knock limit correction amount TKtempnb is calculated based on a present cam total temperature change amount tempALLnb which is calculated by "the compression end temperature change amount calculation routine [1]".

"The present cam total temperature change amount tempALLnb" is an estimated change amount of the compression end temperature at a time when the valve characteristic is changed from the optimal cam Cbst to the present cam Cnow. The present cam total temperature change amount tempALLnb is equivalent to the state change amount according to the invention.

[7] Second Knock Limit Correction Amount Calculation Routine

In this routine, an overlap knock limit correction amount TKOVLPbst is derived from the optimal cam knock limit ignition timing TKbst using the initial cam knock limit ignition timing TKdfl and an initial cam knock limit correction amount TKtempdb. Then, the second knock limit correction amount TKOVLPnb is calculated based on the overlap knock limit correction amount TKOVLPbst and the ignition timing correction ratio MBTTKratio.

"The overlap knock limit correction amount TKOVLPbst" is a correction amount for the knock limit ignition timing, which corresponds to the valve overlap amount in the optimal cam Cbst. The optimal cam knock limit ignition timing TKbst is a value that is set so as to include the overlap knock limit correction amount TKOVLPbst.

Also, "the initial cam knock limit ignition timing TKdfl" is the most advanced ignition timing in the ignition timing range where occurrence of knocking can be suppressed in the operating state in which the initial cam Cdfl is selected. The initial cam knock limit ignition timing TKdfl is equivalent to the second knock limit ignition timing according to the invention.

Also, "the initial cam knock limit correction amount TKtempdb" is a correction amount for the initial cam knock limit ignition timing TKdfl, which corresponds to the difference between the temperature in the combustion chamber 23 at a time when the valve characteristic is the optimal cam Cbst and that at a time when the valve characteristic is the initial cam Cdfl (i.e., an initial cam total temperature change amount tempALLdb).

Also, "the initial cam total temperature change amount tempALLdb" is an estimated change amount of the compression end temperature at a time when the valve characteristic is changed from the optimal cam Cbst to the initial cam Cdfl. The initial cam total temperature change amount tempALLdb is equivalent to the opening/closing state change amount according to the invention.

[8] Compression End Pressure Change Amount Calculation Routine [1]

In this routine, the present cam total pressure change amount compALLnb is calculated based on a present cam IVO pressure change amount compIVOnb which is calculated by "the IVO compression end pressure change amount calculation routine [1]" and a present cam IVC pressure change amount compIVCnb which is calculated by "the IVC compression end pressure change amount calculation routine [1]".

"The present cam IVO pressure change amount compIVOnb" is an estimated change amount of the compression end pressure at a time when the intake valve opening timing IVO is changed from the opening timing in the optimal cam Cbst (i.e., the optimal cam intake valve opening timing IVObst) to the opening timing in the present cam Cnow (i.e., the present cam intake valve opening timing IVOnow).

Also, "the present cam IVC pressure change amount compIVCnb" is an estimated change amount of the compression end pressure at a time when the intake valve closing timing IVC is changed from the closing timing in the optimal cam Cbst (i.e., the optimal cam intake valve closing timing IVCbst) to the closing timing in the present cam Cnow (i.e., the present cam intake valve closing timing IVCnow).

[9] IVO Compression End Pressure Change Amount Calculation Routine [1]

In this routine, the present cam IVO pressure change amount compIVOnb is calculated based on a first reference IVO pressure change amount compIVObt and a second reference IVO pressure change amount compIVOnt.

"The first reference IVO pressure change amount compIVObt" is an estimated change amount of the compression end pressure at a time when the intake valve opening timing IVO is changed from the opening timing in the reference cam Ctdc (i.e., the reference cam intake valve opening timing IVOtdc) to the opening timing in the optimal cam Cbst (i.e., the optimal cam intake valve opening timing IVObst). The first reference IVO pressure change amount compIVObt is equivalent to the first valve opening state change amount according to the invention.

Also, "the second reference IVO pressure change amount compIVOnt" is an estimated change amount of the compression end pressure at a time when the intake valve opening timing IVO is changed from the opening timing in the reference cam Ctdc (i.e., the reference cam intake valve opening timing IVOtdc) to the opening timing in the present cam Cnow (i.e., the present cam intake valve opening timing IVOnow). The second reference IVO pressure change amount compIVOnt is equivalent to the second valve opening state change amount according to the invention.

[10] IVC Compression End Pressure Change Amount Calculation Routine [1]

In this routine, the present cam IVC pressure change amount compIVCnb is calculated based on a first reference IVC pressure change amount compIVCbt and a second reference IVC pressure change amount compIVCnt.

"The first reference IVC pressure change amount compIVCbt" is an estimated change amount of the compression end pressure at a time when the intake valve closing timing IVC is changed from the closing timing in the reference cam Ctdc (i.e., the reference cam intake valve closing timing IVCtdc) to the closing timing in the optimal cam Cbst (i.e., the optimal cam intake valve closing timing IVCbst). The first reference IVC pressure change amount compIVCbt is equivalent to the first valve closing state change amount according to the invention.

Also, "the second reference IVC pressure change amount compIVCnt" is an estimated change amount of the compression end pressure at a time when the intake valve closing timing IVC is changed from the closing timing in the reference cam Ctdc (i.e., the reference cam intake valve closing timing IVCtdc) to the closing timing in the present cam Cnow (i.e., the present cam intake valve closing timing IVCnow). The second reference IVC pressure change amount compIVCnt is equivalent to the second valve closing state change amount according to the invention.

[11] Compression End Pressure Change Amount Calculation Routine [2]

In this routine, the initial cam total pressure change amount compALLdb is calculated based on an initial cam IVO pressure change amount compIVOdb which is calculated by "the IVO compression end pressure change amount calculation routine [2]" and an initial cam IVC pressure change amount compIVCdb which is calculated by "the IVC compression end pressure change amount calculation routine [2]".

"The initial cam IVO pressure change amount compIVOdb" is an estimated change amount of the compression end pressure at a time when the intake valve opening timing IVO is changed from the opening timing in the optimal cam Cbst (i.e., the optimal cam intake valve opening timing IVObst) to the opening timing in the initial cam Cdfl (i.e., the initial cam intake valve opening timing IVOdfl). The initial cam IVO pressure change amount compIVOdb is equivalent to the valve opening side state change amount according to the invention.

Also, "the initial cam IVC pressure change amount compIVCdb" is an estimated change amount of the compression end pressure at a time when the intake valve closing timing IVC is changed from the closing timing in the optimal cam Cbst (i.e., the optimal cam intake valve closing timing IVCbst) to the closing timing in the initial cam Cdfl (i.e., the initial cam intake valve closing timing IVCdfl). The initial cam IVC pressure change amount compIVCdb is equivalent to the valve closing side state change amount according to the invention.

[12] IVO Compression End Pressure Change Amount Calculation Routine [2]

In this routine, the initial cam IVO pressure change amount is calculated based on the first reference IVO pressure change amount compIVObt and a third reference IVO pressure change amount compIVOdt.

"The first reference IVO pressure change amount compIVObt" is an estimated change amount of the compression end pressure at a time when the intake valve opening timing IVO is changed from the opening timing in the reference cam Ctdc (i.e., the reference cam intake valve opening timing IVOtdc) to the opening timing in the optimal cam Cbst (i.e., the optimal cam intake valve opening timing IVObst).

Also, "the third reference IVO pressure change amount compIVOdt" is an estimated change amount of the compression end pressure at a time when the intake valve opening timing IVO is changed from the opening timing in the reference cam Ctdc (i.e., the reference cam intake valve opening timing IVOtdc) to the opening timing in the initial cam Cdfl (i.e., the initial cam intake valve opening timing IVOdfl).

[13] IVC Compression End Pressure Change Amount Calculation Routine [2]

In this routine, the initial cam IVC pressure change amount compIVCdb is calculated based on the first reference IVC pressure change amount compIVCbt and a third reference IVC pressure change amount compIVCdt.

"The first reference IVC pressure change amount compIVCbt" is an estimated change amount of the compression end pressure at a time when the intake valve closing timing IVC is changed from the closing timing in the reference cam Ctdc (i.e., the reference cam intake valve closing timing IVCtdc) to the closing timing in the optimal cam Cbst (i.e., the optimal cam intake valve closing timing IVCbst).

Also, "the third reference IVC pressure change amount compIVCdt" is an estimated change amount of the compression end pressure at a time when the intake valve closing timing IVC is changed from the closing timing in the reference cam Ctdc (i.e., the reference cam intake valve closing timing IVCtdc) to the closing timing in the initial cam Cdfl (i.e., the initial cam intake valve closing timing IVCdfl).

[14] Compression End Temperature Change Amount Calculation Routine [1]

In this routine, the present cam total temperature change amount tempALLnb is calculated based on a present cam IVO temperature change amount tempIVOnb which is calculated by "the IVO compression end temperature change amount calculation routine [1]" and a present cam IVC temperature change amount tempIVCnb which is calculated by "the IVC compression end temperature change amount calculation routine [1]".

"The present cam IVO temperature change amount tempIVOnb" is an estimated change amount of the compression end temperature at a time when the intake valve opening timing IVO is changed from the opening timing in the optimal cam Cbst (i.e., the optimal cam intake valve opening timing IVObst) to the opening timing in the present cam Cnow (i.e., the present cam intake valve opening timing IVOnow).

Also, "the present cam IVC temperature change amount tempIVCnb" is an estimated change amount of the compression end temperature at a time when the intake valve closing timing IVC is changed from the closing timing in the optimal cam Cbst (i.e., the optimal cam intake valve closing timing IVCbst) to the closing timing in the present cam Cnow (i.e., the present cam intake valve closing timing IVCnow).

[15] IVO Compression End Temperature Change Amount Calculation Routine [1]

In this routine, the present cam IVO temperature change amount tempIVOnb is calculated based on a first reference IVO temperature change amount tempIVObt and a second reference IVO temperature change amount tempIVOnt.

"The first reference IVO temperature change amount tempIVObt" is an estimated change amount of the compression end temperature at a time when the intake valve opening timing IVO is changed from the opening timing in the reference cam Ctdc (i.e., the reference cam intake valve opening timing IVOtdc) to the opening timing in the optimal cam Cbst (i.e., the optimal cam intake valve opening timing IVObst).

Also, "the second reference IVO temperature change amount tempIVOnt" is an estimated change amount of the compression end temperature at a time when the intake valve opening timing IVO is changed from the opening timing in the reference cam Ctdc (i.e., the reference cam intake valve opening timing IVOtdc) to the opening timing in the present cam Cnow (i.e., the present cam intake valve opening timing IVOnow).

[16] IVC Compression End Temperature Change Amount Calculation Routine [1]

In this routine, the present cam IVC temperature change amount tempIVCnb is calculated based on a first reference IVC temperature change amount tempIVCbt and a second reference IVC temperature change amount tempIVCnt.

"The first reference IVC temperature change amount tempIVCbt" is an estimated change amount of the compression end temperature at a time when the intake valve closing timing IVC is changed from the closing timing in the reference cam Ctdc (i.e., the reference cam intake valve closing timing IVCtdc) to the closing timing in the optimal cam Cbst (i.e., the optimal cam intake valve closing timing IVCbst).

Also, "the second reference IVC temperature change amount tempIVCnt" is an estimated change amount of the compression end temperature at a time when the intake valve closing timing IVC is changed from the closing timing in the reference cam Ctdc (i.e., the reference cam intake valve closing timing IVCtdc) to the closing timing in the present cam Cnow (i.e., the present cam intake valve closing timing IVCnow).

[17] Compression End Temperature Change Amount Calculation Routine [2]

In this routine, the initial cam total temperature change amount tempALLdb is calculated based on an initial cam IVO temperature change amount tempIVOdb which is calculated by "the IVO compression end temperature change amount calculation routine [2]" and an initial cam IVC temperature change amount tempIVCdb which is calculated by "the IVC compression end temperature change amount calculation routine [2]".

"The initial cam IVO temperature change tempIVOdb" is an estimated change amount of the compression end temperature at a time when the intake valve opening timing IVO is changed from the opening timing in the optimal cam Cbst (i.e., the optimal cam intake valve opening timing IVObst) to the opening timing in the initial cam Cdfl (i.e., the initial cam intake valve opening timing IVOdfl). The initial cam IVO temperature change amount tempIVOdb is equivalent to the valve opening side state change amount according to the invention.

Also, "the initial cam IVC temperature change amount tempIVCdb" is an estimated change amount of the compression end temperature at a time when the intake valve closing timing IVC is changed from the closing timing in the optimal cam Cbst (i.e., the optimal cam intake valve closing timing IVCbst) to the closing timing in the initial cam Cdfl (i.e., the initial cam intake valve closing timing IVCdfl). The initial cam IVC temperature change amount tempIVCdb is equivalent to the valve closing side state change amount.

[18] IVO Compression End Temperature Change Amount Calculation Routine [2]

In this routine, the initial cam IVO temperature change amount tempIVOdb is calculated based on the first reference IVO temperature change amount tempIVObt and a third reference IVO temperature change amount tempIVOdt.

"The first reference IVO temperature change amount tempIVObt" is an estimated change amount of the compression end temperature at a time when the intake valve opening timing IVO is changed from the opening timing in the reference cam Ctdc (i.e., the reference cam intake valve opening timing IVOtdc) to the opening timing in the optimal cam Cbst (i.e., the optimal cam intake valve opening timing IVObst).

Also, "the third reference IVO temperature change amount tempIVOdt" is an estimated change amount of the compression end temperature at a time when the intake valve opening timing IVO is changed from the opening timing in the reference cam Ctdc (i.e., the reference cam intake valve opening timing IVOtdc) to the opening timing in the initial cam Cdfl (i.e., the initial cam intake valve opening timing IVOdfl).

[19] IVC Compression End Temperature Change Amount Calculation Routine [2]

In this routine, the initial cam IVC temperature change amount tempIVCdb is calculated based on a first reference IVC temperature change amount tempIVCbt and a third reference IVC temperature change amount tempIVCdt.

"The first reference IVC temperature change amount tempIVCbt" is an estimated change amount of the compression end temperature at a time when the intake valve closing timing IVC is changed from the closing timing in the reference cam Ctdc (i.e., the reference cam intake valve closing timing IVCtdc) to the closing timing in the optimal cam Cbst (i.e., the optimal cam intake valve closing timing IVCbst).

Also, "the third reference IVC temperature change amount tempIVCdt" is an estimated change amount of the compression end temperature at a time when the intake valve closing timing IVC is changed from the closing timing in the reference cam Ctdc (i.e., the reference cam intake valve closing timing IVCtdc) to the closing timing in the initial cam Cdfl (i.e., the initial cam intake valve closing timing IVCdfl".

[20] Overlap Ratio Calculation Routine

In this routine, calculations are performed to obtain a ratio of the present cam overlap amount OVLPnow to the optimal cam overlap amount OVLPbst (i.e., an overlap ratio OVLPratio).

"The optimal cam overlap amount OVLPbst" is a valve overlap amount in the optimal cam Cbst.

Also, "the present cam overlap amount OVLPnow" is a valve overlap amount in the present cam Cnow.

Figure 13:
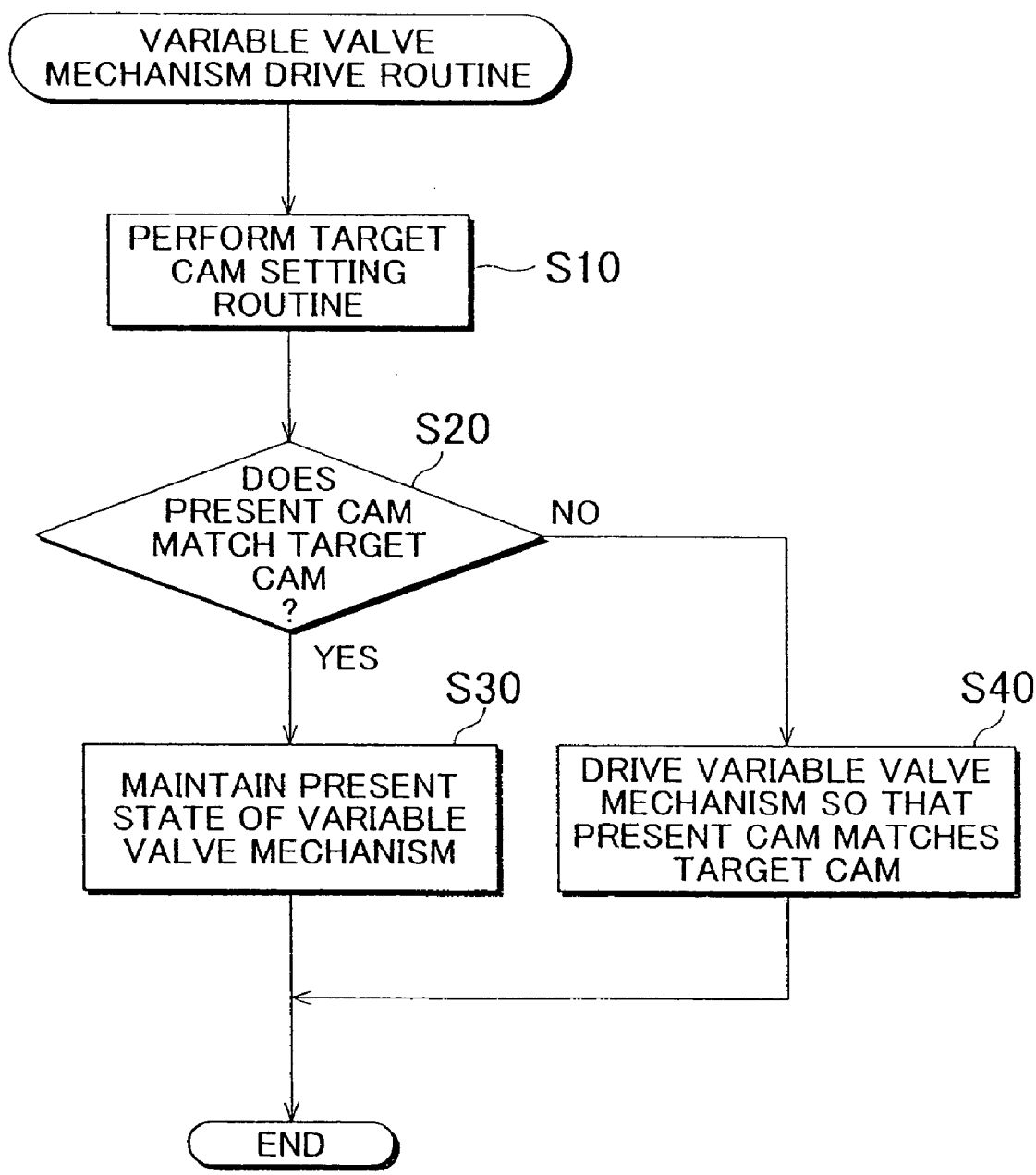
FIG. 13 is a flowchart showing steps of "a variable valve mechanism drive routine" which is performed in order to drive the variable valve mechanism in the first embodiment.
Figure 14:
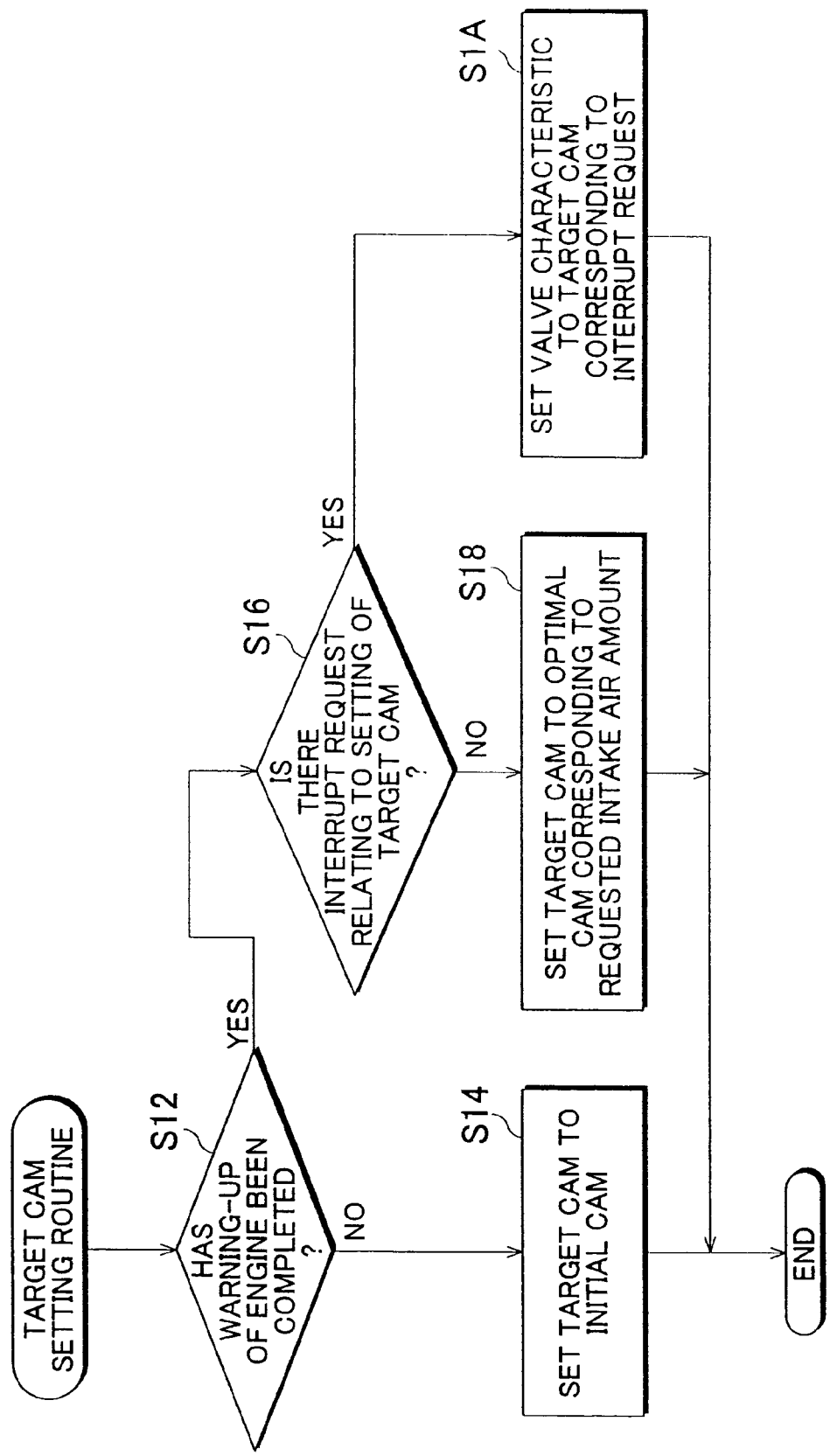
FIG. 14 is a flowchart showing steps of "a target cam setting routine" which is performed in order to set a target cam in the first embodiment.

Hereinafter, description will be made of a mode in which the variable valve mechanism is driven. Before the base ignition timing setting routine is described in detail, a control mode of the variable valve mechanism 5 will be described with reference to FIG. 13 and FIG. 14.

[1] Variable Valve Mechanism Drive Routine

This routine is performed by the electronic control unit 9 at predetermined time intervals while the engine 1 is operated.

In step S10, "a target cam setting routine" is performed. The valve characteristic (i.e., the target cam Ctrg) is set according to the operating state of the engine 1 in this routine.

In step S20, it is determined whether the present cam Cnow matches the target cam Ctrg. In this routine, the present intake valve timing INVT, the present exhaust valve timing EXVT, and the present maximum intake valve lift amount INVL are compared with the intake valve timing INVT, the exhaust valve timing EXVT, and the maximum intake valve lift amount INVL in the target cam Ctrg. On the basis of the result of this comparison, the aforementioned determination is made. When it is determined that the present cam Cnow matches the target cam Ctrg as a result of the aforementioned determination, step S30 is performed. Meanwhile, when it is determined that the present cam Cnow does not match the target cam Ctrg, step S40 is performed.

In step S30, the present drive state of each of the intake valve timing variable mechanism 51, the exhaust valve timing variable mechanism 52, and the maximum intake valve lift amount variable mechanism 53 is maintained. That is, each of the present intake valve timing INVT, the present exhaust valve timing EXVT, and the present maximum intake valve lift amount INVL is maintained.

In step S40, the intake valve timing variable mechanism 51, the exhaust valve timing variable mechanism 52, and the maximum intake valve lift amount variable mechanism 53 are driven so that the present cam Cnow matches the target cam Ctrg.

[2] Target Cam Setting Routine

This routine is performed as step S10 in "the variable valve mechanism drive routine".

In step S12, it is determined whether warming-up of the engine 1 has been completed. When it is determined that warming-up of the engine 1 has not been completed as the result of the determination, step S14 is performed. Meanwhile, when it is determined that warming-up of the engine 1 has been completed, step S16 is performed.

In step S14, the target cam Ctrg is set to the initial cam Cdfl.

In step S16, it is determined whether there is an interrupt request relating to setting of the target cam Ctrg. That is, it is determined whether there is a request which should be satisfied in priority to a request concerning the fuel consumption rate when the target cam Ctrg is set. Examples of the interrupt request which should be satisfied in priority to the request concerning the fuel consumption rate include a request concerning the aforementioned change in the intake air amount in response to the increase in the requested intake air amount GAreq. When it is determined that there is no interrupt request relating to setting of the target cam Ctrg as a result of the determination, step S18 is performed. Meanwhile, when it is determined that there is an interrupt request relating to setting of the target cam Ctrg, step S1A is performed.

In step S18, the target cam Ctrg is set to the optimal cam Cbst corresponding to the requested intake air amount GAreq.

In step S1A, the target cam Ctrg is set to a valve characteristic in accordance with the interrupt request.

Hereinafter, description will be made of a mode in which the base ignition timing is set. The electronic control unit 9 sets the base ignition timing at predetermined time intervals while the engine 1 is operated. The base ignition timing is set according to the present cam Cnow using one of processes (A) to (C) described below.

(A) When the present cam Cnow matches the optimal cam Cbst, that is, when the MBT ignition timing and the knock limit ignition timing that are appropriate for the present cam Cnow can be selected from among the MBT ignition timings and the knock limit ignition timings for the optimal cam Cbst and the initial cam Cdfl, the base ignition timing BseF is set to one of the optimal cam MBT ignition timing MBTbst and the optimal cam knock limit ignition timing TKbst, which is more retarded than the other.

(B) When the present cam Cnow matches the initial cam Cdfl, the base ignition timing BseF is set to one of the initial cam MBT ignition timing MBTdfl and the initial cam knock limit ignition timing TKdfl, which is more retarded than the other.

Figure 15:
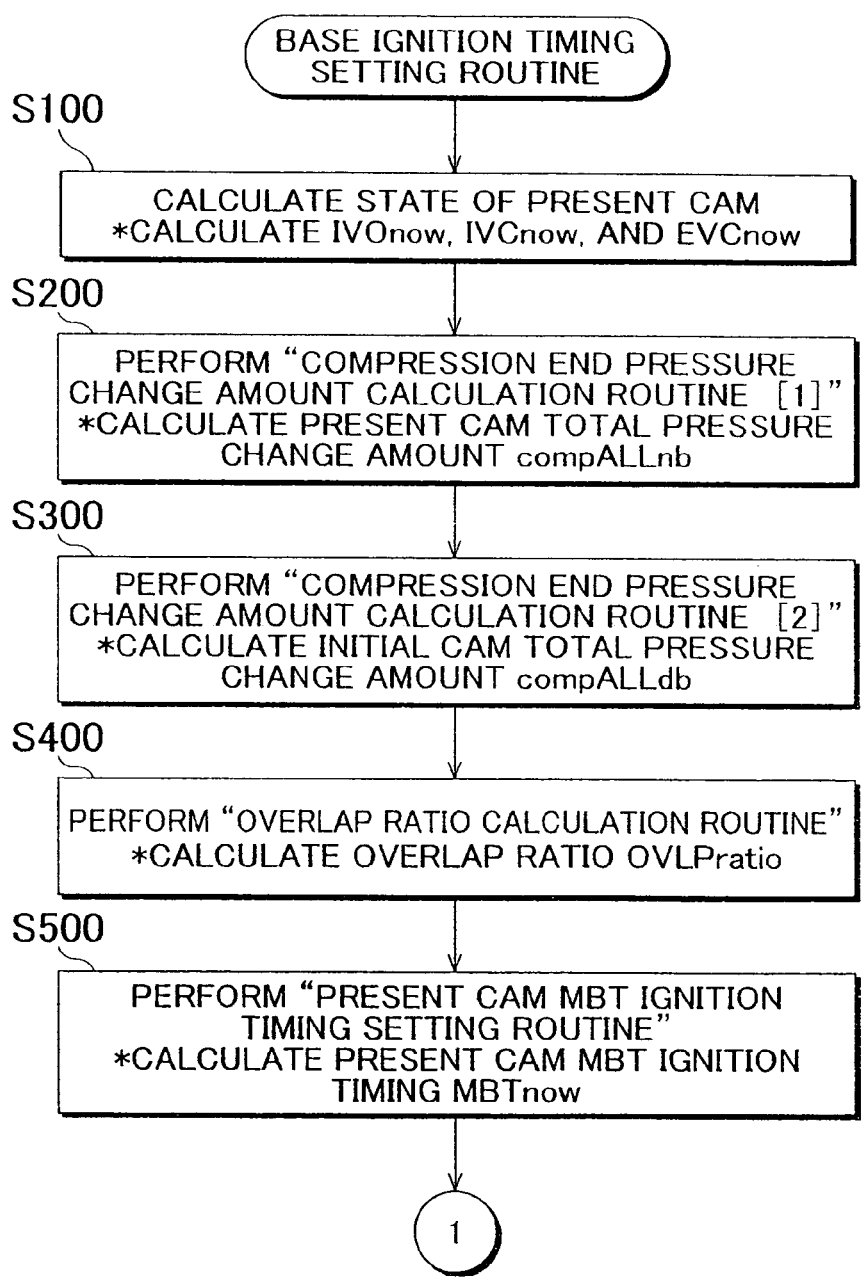
FIG. 15 is a flowchart showing steps of "the base ignition timing setting routine" which is performed in order to set the base ignition timing in the first embodiment.
Figure 16:
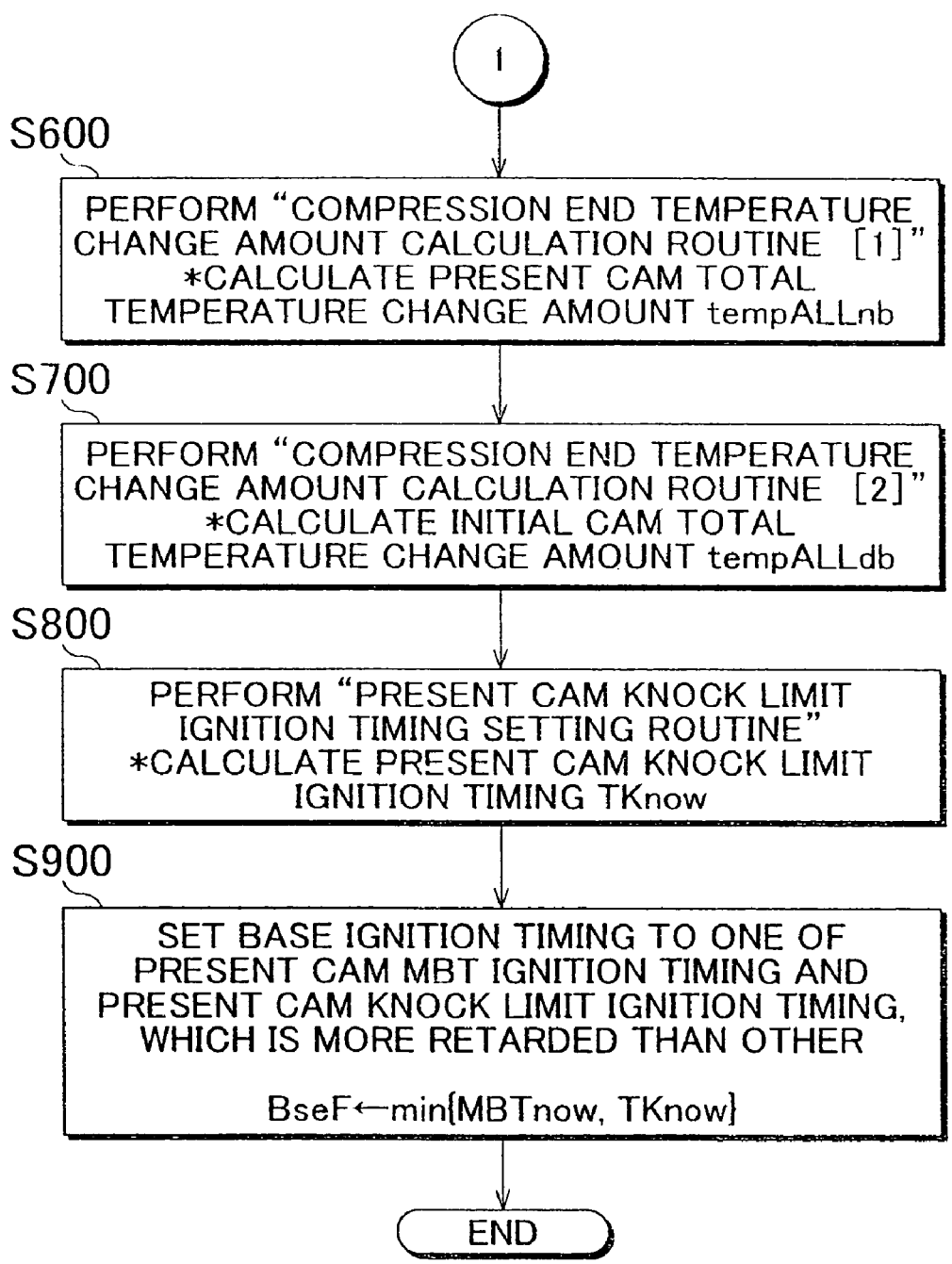
FIG. 16 is a flowchart showing steps of "the base ignition timing setting routine" which is performed in order to set the base ignition timing in the first embodiment.

(C) When the present cam Cnow does not match the optimal cam Cbst nor the initial cam Cdfl, that is, when the MBT ignition timing and the knock limit ignition timing that are appropriate for the present cam Cnow cannot be selected from the MBT ignition timings and the knock limit ignition timings for the optimal cam Cbst and the initial cam Cdfl, the base ignition timing BseF is set by "the base ignition timing setting routine" shown in FIG. 15 and FIG. 16.

Hereinafter, the base ignition timing setting routine will be described with reference to FIG. 15 and FIG. 16.

In step S100, with regard to the optimal cam Cbst that may be set as the present cam Cnow and the target cam Ctrg, the valve opening timing of the intake valve 35 (i.e., the intake valve opening timing IVO), the valve closing timing of the intake valve 35 (i.e., the intake valve closing timing IVC), and the valve closing timing of the exhaust valve 36 (i.e., the exhaust valve closing timing EVC) are calculated. In this routine, the intake valve opening timing IVO, the intake valve closing timing IVC, and the exhaust valve closing timing EVC are calculated based on [A] and [B] described below.

[A] The present intake valve timing INVT, the present exhaust valve timing EXVT, and the present maximum intake valve lift amount INVL (the present intake valve working angle INCAM) which are detected by sensors.

[B] The relationship between the maximum intake valve lift amount INVL and the intake valve working angle INCAM, which is stored in the electronic control unit 9 in advance (i.e., the relationship shown in FIG. 4).

Figure 17:
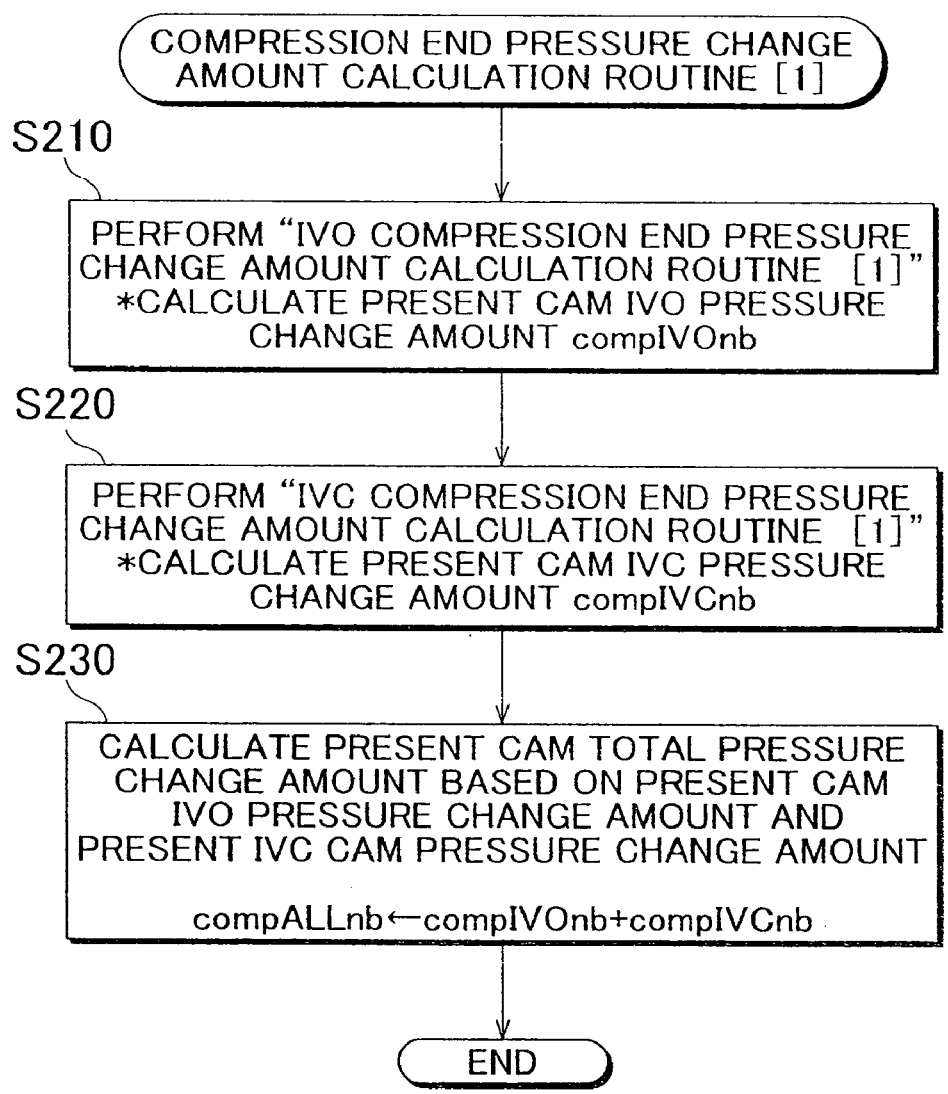
FIG. 17 is a flowchart showing steps of "a compression end pressure change amount calculation routine [1]" which is performed in order to calculate a present cam total pressure change amount in the first embodiment.

In step S200, "the compression end pressure change amount calculation routine [1]" shown in FIG. 17 is performed. In this routine, calculations are performed to obtain the estimated change amount of the compression end pressure at a time when the valve characteristic is changed from the optimal cam Cbst to the present cam Cnow (i.e., the present cam total pressure change amount compALLnb).

Figure 20:
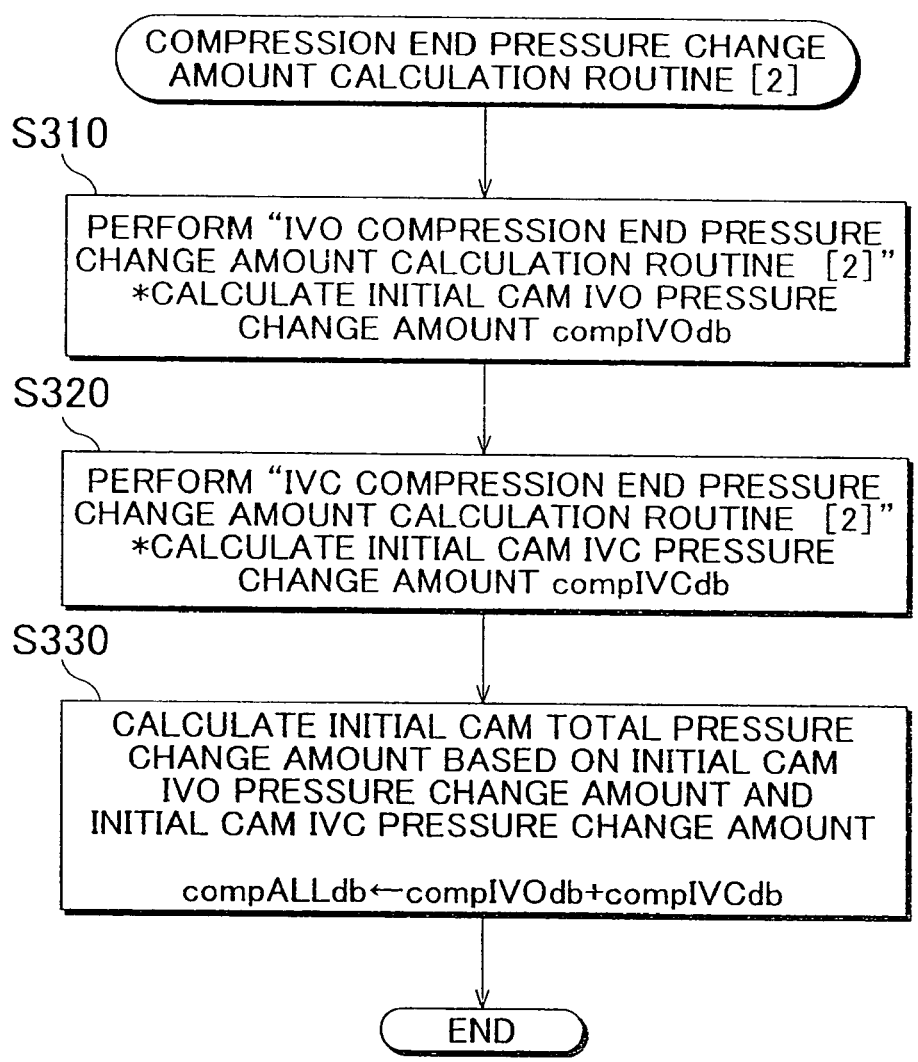
FIG. 20 is a flowchart showing steps of "a compression end pressure change amount calculation routine [2]" which is performed in order to calculate an initial cam total pressure change amount in the first embodiment.

In step S300, "the compression end pressure change amount calculation routine [2]" shown in FIG. 20 is performed. In this routine, calculations are performed to obtain the estimated change amount of the compression end pressure at a time when the valve characteristic is changed from the optimal cam Cbst to the initial cam Cdfl (i.e., the initial cam total pressure change amount compALLdb).

Figure 23:
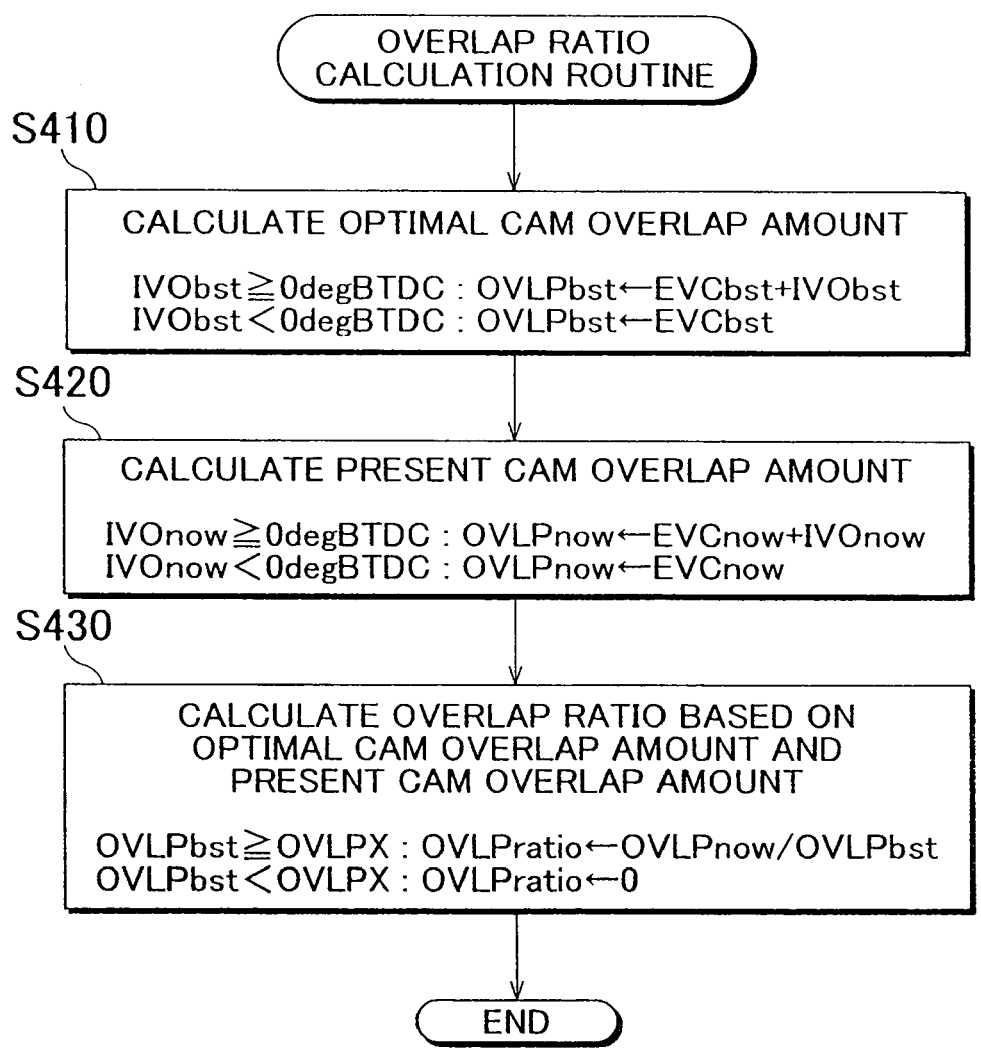
FIG. 23 is a flowchart showing steps of "an overlap ratio calculation routine" which is performed in order to calculate an overlap ratio in the first embodiment.

In step S400, "the overlap ratio calculation routine" shown in FIG. 23 is performed. In this routine, calculations are performed to obtain the ratio of the present cam overlap amount OVLPnow to the optimal cam overlap amount OVLPbst (i.e., the overlap ratio OVLPratio).

Figure 24:
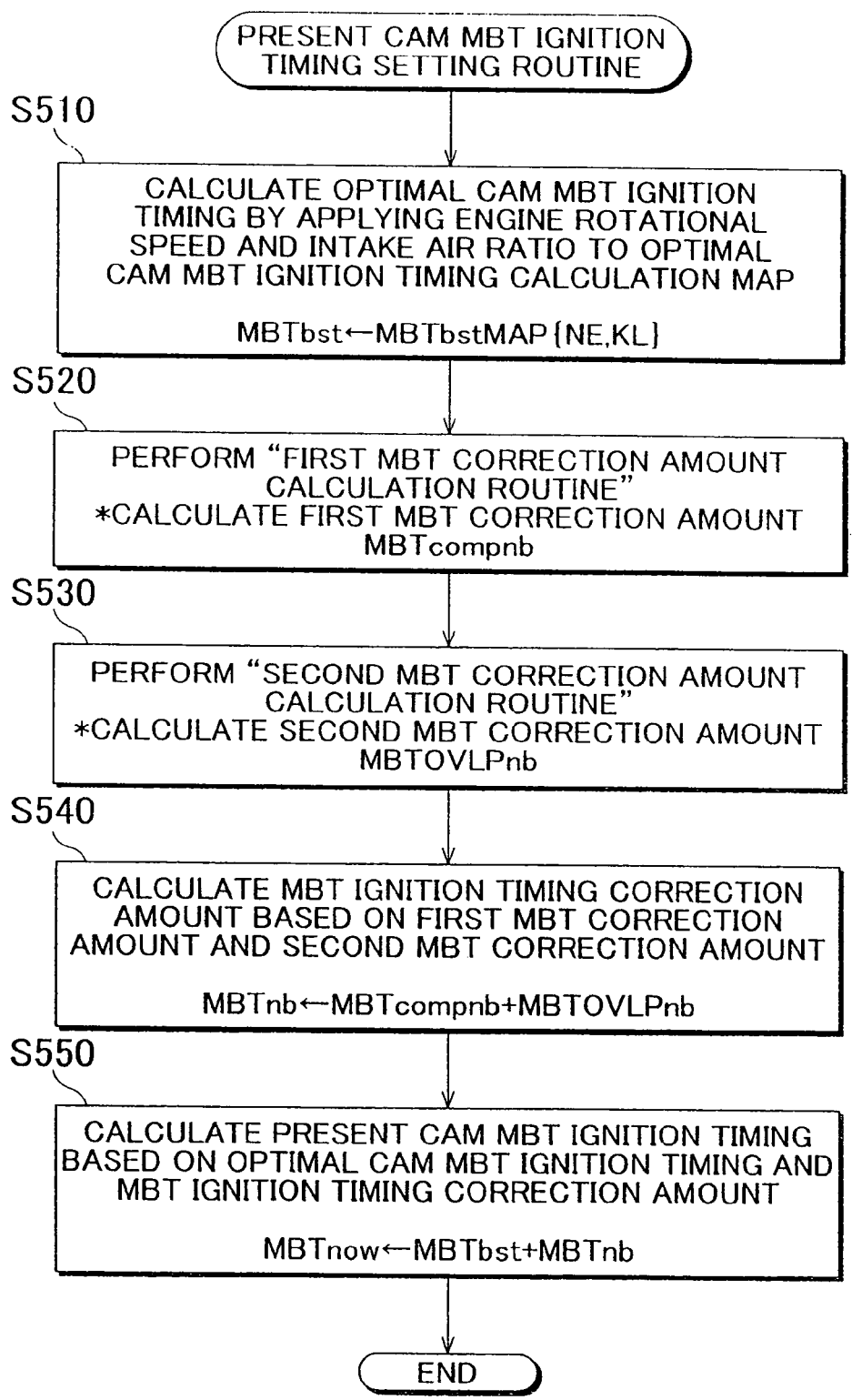
FIG. 24 is a flowchart showing steps of "a present cam MBT ignition timing setting routine" which is performed in order to calculate a present cam MBT ignition timing in the first embodiment.

In step S500, "the present cam MBT ignition timing setting routine" shown in FIG. 24 is performed. In this routine, calculations are performed to obtain the ignition timing at which the output torque and the fuel consumption rate of the engine 1 become optimal in the operating state in which the present cam Cnow is selected (i.e., the present cam MBT ignition timing MBTnow).

Figure 27:
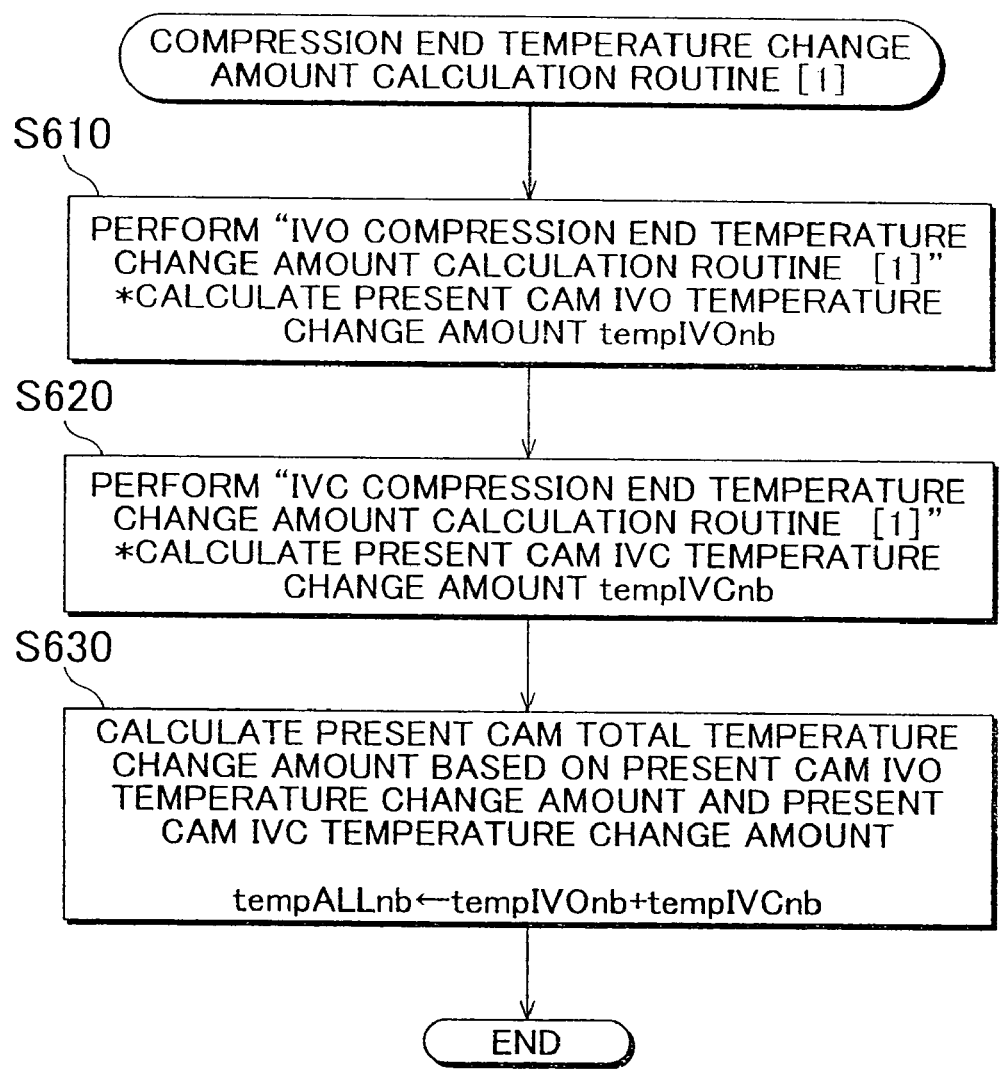
FIG. 27 is a flowchart showing steps of "a compression end temperature change amount calculation routine [1]" which is performed in order to calculate a present cam total temperature change amount in the first embodiment.

In step S600, "the compression end temperature change amount calculation routine [1]" shown in FIG. 27 is performed. In this routine, calculations are performed to obtain the estimated change amount of the compression end temperature at a time when the valve characteristic is changed from the optimal cam Cbst to the present cam Cnow (i.e., the present cam total temperature change amount tempALLnb).

Figure 30:
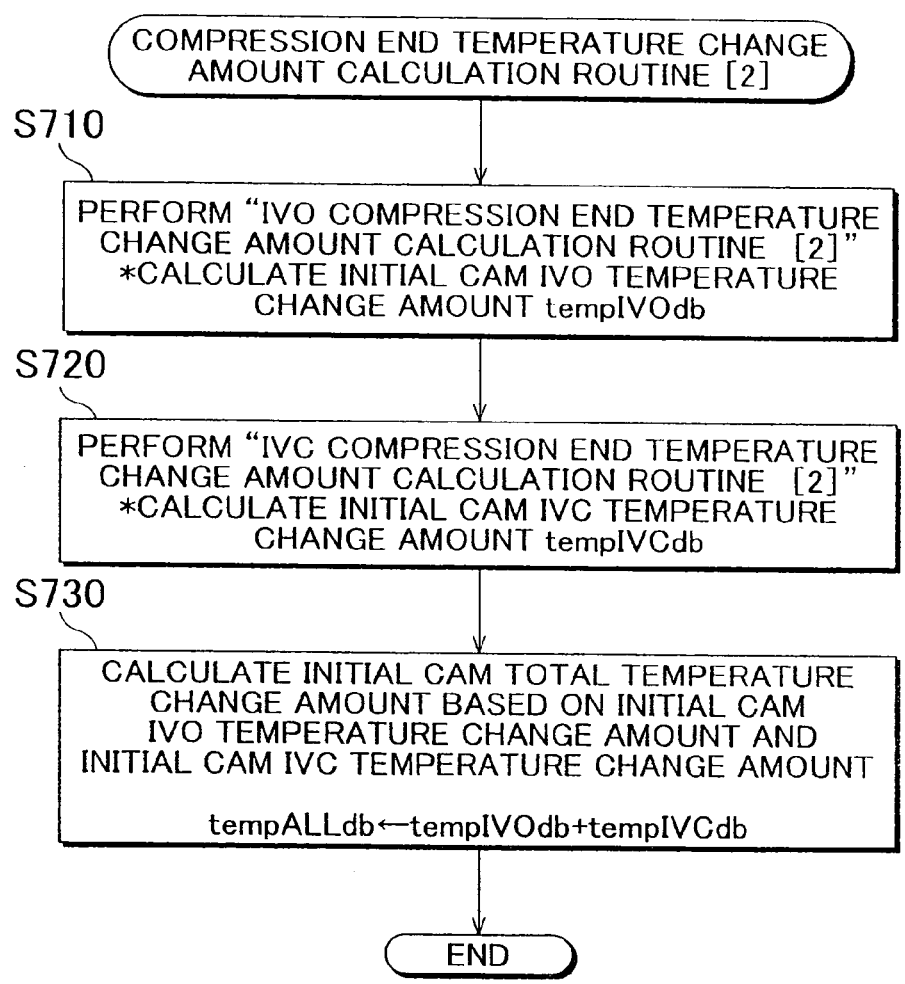
FIG. 30 is a flowchart showing steps of "a compression end temperature change amount calculation routine [2]" which is performed in order to calculate an initial cam total temperature change amount in the first embodiment.

In step S700, "the compression end temperature change amount calculation routine [2]" shown in FIG. 30 is performed. In this routine, calculations are performed to obtain the estimated change amount of the compression end temperature at a time when the valve characteristic is changed from the optimal cam Cbst to the initial cam Cdfl (i.e., the initial cam total temperature change amount tempALLdb).

Figure 33:
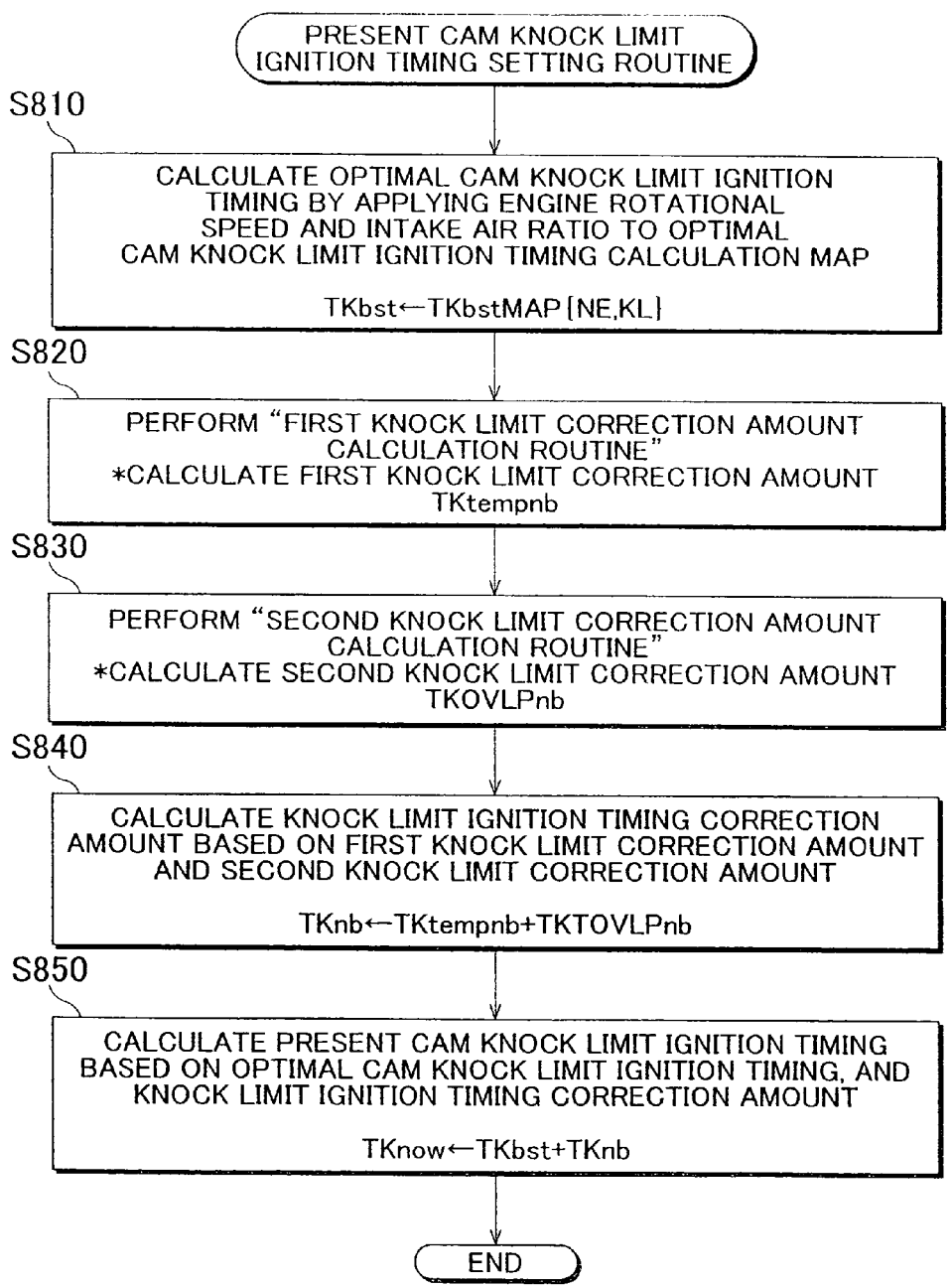
FIG. 33 is a flowchart showing steps of "a present cam knock limit ignition timing setting routine" which is performed in order to calculate a present cam knock limit ignition timing in the first embodiment.

In step S800, "the present cam knock limit ignition timing setting routine" shown in FIG. 33 is performed. In this routine, calculations are performed to obtain the most advanced ignition timing in the ignition timing range where occurrence of knocking can be suppressed in the engine 1 in the operating state in which the present cam Cnow is selected (i.e., the present cam knock limit ignition timing TKnow).

In step S900, the base ignition timing BseF is set to one of the present cam MBT ignition timing MBTnow and the present cam knock limit ignition timing TKnow, which is more retarded than the other. That is, the base ignition timing BseF is set through a process described below.

$$BseF \leftarrow \min\{MBTnow, TKnow\}$$

Hereinafter, "the compression end pressure change amount calculation routine [1]" will be described with reference to FIG. 17. This routine is performed as step S200 in "the base ignition timing setting routine".

First, in step S210, "the IVO compression end pressure change amount calculation routine [1]" shown in FIG. 18 is performed. In this routine, calculations are performed to obtain the estimated change amount of the compression end pressure at a time when the intake valve opening timing IVO is changed from the optimal cam intake valve opening timing IVObst to the present cam intake valve opening timing IVOnow (i.e., the present cam IVO pressure change amount compIVOnb).

In step S220, "the IVC compression end pressure change amount calculation routine [1]" shown in FIG. 19 is performed. In this routine, calculations are performed to obtain the estimated change amount of the compression end pressure at a time when the intake valve closing timing IVC is changed from the optimal cam intake valve closing timing IVCbst to the present cam intake valve closing timing IVCnow (i.e., the present cam IVC pressure change amount compIVCnb).

In step S230, on the basis of the present cam IVO pressure change amount compIVOnb and the present cam IVC pressure change amount compIVCnb, the present cam total pressure change amount compALLnb is calculated. That is, the present cam total pressure change amount compALLnb is calculated through a process described below.

$$compALLnb \leftarrow compIVOnb + compIVCnb$$

Hereinafter, the IVO compression end pressure change amount calculation routine [1] will be described with reference to FIG. 18. This routine is performed as step S210 in "the compression end pressure change amount calculation routine [1]".

In step S212, calculations are performed to obtain the estimated change amount of the compression end pressure at a time when the intake valve opening timing IVO is changed from the reference cam intake valve opening timing IVOtdc to the optimal cam intake valve opening timing IVObst (i.e., the first reference IVO pressure change amount compIVObt). That is, the first reference IVO pressure change amount compIVObt is calculated through processes [1] to [4] described below.

Figure 36:
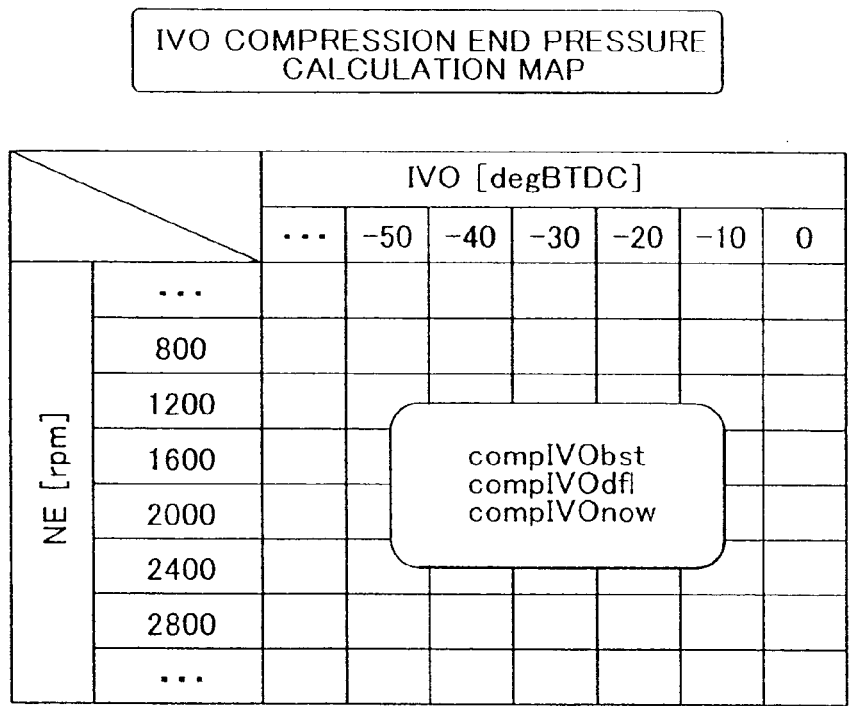
FIG. 36 is a diagram showing an example of an IVO compression end pressure calculation map in which a relationship between an intake valve opening timing and an engine rotational speed, and a compression end pressure is set in the first embodiment.

[1] By applying the reference cam intake valve opening timing IVOtdc and the present engine rotational speed NE to an IVO compression end pressure calculation map shown in FIG. 36, a calculation is performed to obtain an estimated compression end pressure at a time when the intake valve opening timing IVO is set to the reference cam intake valve opening timing IVOtdc (i.e., a reference cam IVO compression end pressure compIVOtdc).

[2] By applying the optimal cam intake valve opening timing IVObst and the present engine rotational speed NE to the aforementioned IVO compression end pressure calculation map, a calculation is performed to obtain an estimated compression end pressure at a time when the intake valve opening timing IVO is set to the optimal cam intake valve opening timing IVObst (i.e., the optimal cam IVO compression end pressure compIVObst).

[3] A calculation is performed to obtain a difference between the optimal cam IVO compression end pressure compIVObst and a reference cam IVO compression end pressure compIVOtdc (i.e., an optimal-reference IVO pressure change amount $\Delta$compIVObt). That is, the optimal-reference IVO pressure change amount $\Delta$compIVObt is calculated through a process described below.

$$\Delta compIVObt \leftarrow compIVObst - compIVOtdc$$

[4] On the basis of the optimal-reference IVO pressure change amount $\Delta$compIVObt and an intake air ratio KL, the first reference IVO pressure change amount compIV6Obt is calculated. That is, the first reference IVO pressure change amount compIVObt is calculated through a process described below.

$$compIVObt \leftarrow \Delta compIVObt \times (KL/100)$$

The intake air ratio KL is a ratio of the intake air amount GA to the maximum air amount that can be taken into the engine 1 (i.e., the maximum intake air amount GAmax). That is, the intake air ratio KL is a value obtained by an equation, GA/GAmax. The intake air ratio KL is equivalent to a load factor of the engine 1.

The IVO compression end pressure calculation map shows the relationship between the intake valve opening timing IVO and the compression end pressure when the intake air ratio KL is 100%. Therefore, by multiplying the optimal-reference IVO pressure change amount $\Delta$compIVObt by the intake air ratio KL (which is a dimensionless value), it is possible to calculate the change amount of the compression end pressure corresponding to the present intake air ratio KL.

Figure 37:
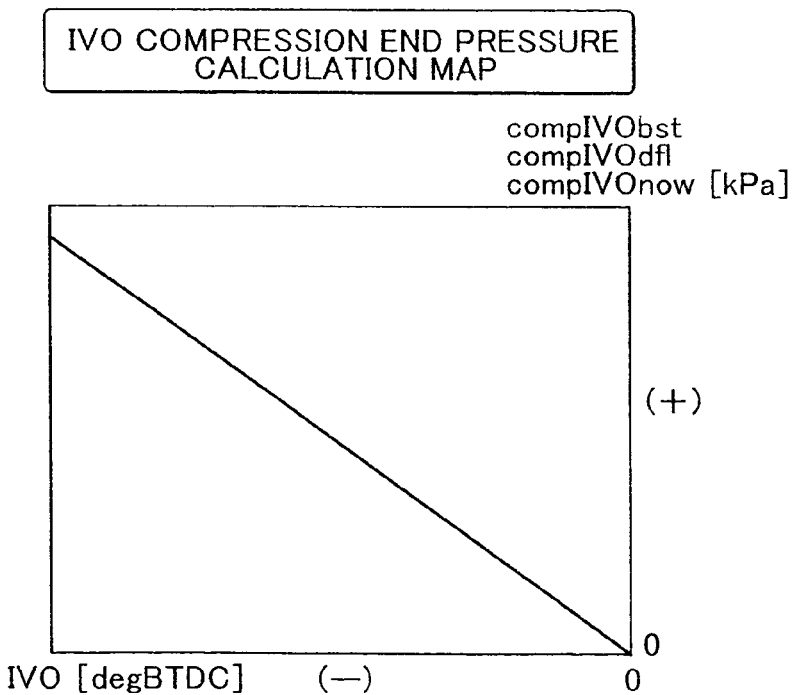
FIG. 37 is a graph showing a relationship between the intake valve opening timing and the compression end pressure at a uniform engine rotational speed based on the IVO compression end pressure calculation map in the first embodiment.

FIG. 37 shows a relationship between the intake valve opening timing IVO and the compression end pressure compIVO at a uniform engine rotational speed NE. As the intake valve opening timing IVO is retarded in the ATDC range, the vacuum pressure in the combustion chamber 23 is increased when the intake valve 35 is opened. Therefore, as the intake valve opening timing IVO is retarded, the compression end pressure compIVO is increased.

Meanwhile, the compression end pressure compIVO (the pressure in the combustion chamber 23) is changed by influence of the pulsation of the intake air, which corresponds to the engine rotational speed NE. Therefore, the magnitude of the compression end pressure compIVO with respect to the intake valve opening timing IVO varies depending on the engine rotational speed NE. No matter what the engine rotational speed NE is, the compression end pressure compIVO tends to be changed with respect to the intake valve opening timing IVO in the same manner, if the engine rotational speed NE remains the same.

Accordingly, in this embodiment, a relationship between the intake valve opening timing IVO and the compression end pressure compIVO at each engine rotational speed NE is obtained in advance, and the IVO compression end pressure calculation map shown in FIG. 36 is set using the intake valve opening timing IVO and the engine rotational speed NE as parameters for obtaining the compression end pressure compIVO.

In the IVO compression end pressure calculation map, a value of the compression end pressure compIVO at each intake valve opening timing IVO is set with respect to a value of the compression end pressure compIVO (0 kPa in this map) at the reference cam intake valve opening timing IVOtdc. Also, in a case where the compression end pressure compIVO is calculated using the IVO compression end pressure calculation map, when the intake valve opening timing IVO is BTDC, the intake valve opening timing IVO is regarded as "0 degree BTDC" for calculating the compression end pressure compIVO.

In step S214, calculations are performed to obtain the estimated change amount of the compression end pressure at a time when the intake valve opening timing IVO is changed from the reference cam intake valve opening timing IVOtdc to the present cam intake valve opening timing IVOnow (i.e., the second reference IVO pressure change amount compIVOnt). The second reference IVO pressure change amount compIVOnt is calculated through processes [1] to [3] described below.

[1] By applying the present cam intake valve opening timing IVOnow and the present engine rotational speed NE to the IVO compression end pressure calculation map shown in FIG. 36, a calculation is performed to obtain an estimated compression end pressure at a time when the intake valve opening timing IVO is set to the present cam intake valve opening timing IVOnow (i.e., a present cam IVO compression end pressure compIVOnow).

[2] A calculation is performed to obtain a difference between the present cam IVO compression end pressure compIVOnow and the reference cam IVO compression end pressure compIVOtdc (i.e., a present-reference IVO pressure change amount $\Delta$compIVOnt). That is, the present-reference IVO pressure change amount $\Delta$compIVOnt is calculated through a process described below.

$$\Delta compIVOnt \leftarrow compIVOnow - compIVOtdc.$$

[3] On the basis of the present-reference IVO pressure change amount $\Delta$compIVOnt and the intake air ratio KL, the second reference IVO pressure change amount compIVOnt is calculated. That is, the second reference IVO pressure change amount compIVOnt is calculated through a process described below.

$$compIVOnt \leftarrow \Delta compIVOnt \times (KL/100)$$

In step S216, a calculation is performed to obtain a difference between the second reference IVO pressure change amount compIVOnt and the first reference IVO pressure change amount compIVObt (i.e., the present cam IVO pressure change amount compIVOnb). That is, the present cam IVO pressure change amount compIVOnb is calculated through a process described below.

$$compIVOnb \leftarrow compIVOnt - compIVObt$$

Hereinafter, the IVC compression end pressure change amount calculation routine [1] will be described with reference to FIG. 19. This routine is performed as step S220 in "the compression end pressure change amount calculation routine [1]".

In step S222, calculations are performed to obtain the estimated change amount of the compression end pressure at a time when the intake valve closing timing IVC is changed from the reference cam intake valve closing timing IVCtdc to the optimal cam intake valve closing timing IVCbst (i.e., the first reference IVC pressure change amount compIVCbt). That is, the first reference IVC pressure change amount compIVCbt is calculated through processes [1] to [4] described below.

Figures 38, 39:
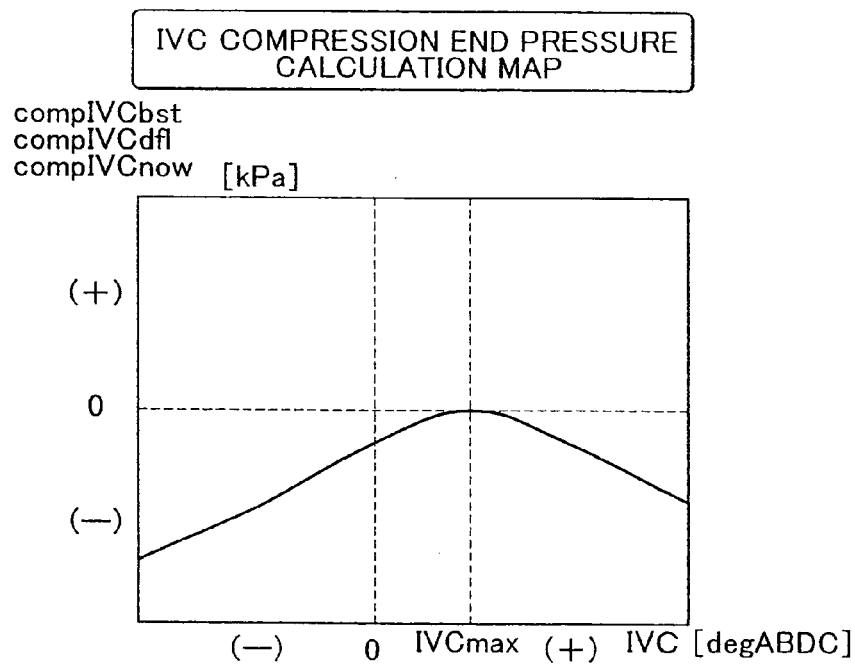
FIG. 38 is a diagram showing an example of an IVC compression end pressure calculation map in which a relationship between an intake valve closing timing and the engine rotational speed, and a compression end pressure is set in the first embodiment.
FIG. 39 is a graph showing a relationship between the intake valve closing timing and the compression end pressure at a uniform engine rotational speed based on the IVC compression end pressure calculation map in the first embodiment.

[1] By applying the reference cam intake valve closing timing IVCtdc and the present engine rotational speed NE to an IVC compression end pressure calculation map shown in FIG. 38, a calculation is performed to obtain an estimated compression end pressure at a time when the intake valve closing timing IVC is set to the reference cam intake valve closing timing IVCtdc (i.e., the reference cam IVC compression end pressure compIVCtdc).

[2] By applying the optimal cam intake valve closing timing IVCbst and the present engine rotational speed NE to the aforementioned IVC compression end pressure calculation map, a calculation is performed to obtain an estimated compression end pressure at a time when the intake valve closing timing IVC is set to the optimal cam intake valve closing timing IVCbst (i.e., an optimal cam IVC compression end pressure compIVCbst).

[3] A calculation is performed to obtain a difference between the optimal cam IVC compression end pressure compIVCbst and a reference cam IVC compression end pressure compIVCtdc (i.e., an optimal-reference IVC pressure change amount ΔcompIVCbt). That is, the optimal-reference IVC pressure change amount ΔcompIVCbt is calculated through a process described below.

$$\Delta compIVCbt \leftarrow compIVCbst - compIVCtdc.$$

[4] On the basis of the optimal-reference IVC pressure change amount ΔcompIVCbt and the intake air ratio KL, the first reference IVC pressure change amount compIVCbt is calculated. That is, the first reference IVC pressure change amount compIVCbt is calculated through a process described below.

$$compIVCbt \leftarrow \Delta compIVCbt \times (KL/100)$$

The IVC compression end pressure calculation map shows the relationship between the intake valve closing timing IVC and the compression end pressure when the intake air ratio KL is 100%. Therefore, by multiplying the optimal-reference IVC pressure change amount ΔcompIVCbt by the intake air ratio KL (which is a dimensionless value), it is possible to calculate the change amount of the compression end pressure, which corresponds to the present intake air ratio KL.

FIG. 39 shows a relationship between the intake valve closing timing IVC and the compression end pressure compIVC at a uniform engine rotational speed NE.

[A] When the intake valve closing timing IVC is set to the highest filling efficiency closing timing IVCmax, the flow speed of the air at the intake valve closing timing IVC becomes highest, and therefore the compression end pressure compIVC becomes highest at the intake valve closing timing IVC.

[B] In the region in which the intake valve closing timing IVC is more advanced than the highest filling efficiency closing timing IVCmax, as the intake valve closing timing IVC is advanced with respect to the highest filling efficiency closing timing IVCmax, a degree of increase in the pressure caused by the pulsation of the intake air is decreased. Accordingly, as the intake valve closing timing IVC is advanced, the compression end pressure compIVC is decreased.

[C] In the region in which the intake valve closing timing IVC is more retarded than the highest filling efficiency closing timing IVCmax, as the intake valve closing timing IVC is retarded with respect to the highest filling efficiency closing timing IVCmax, the actual compression ratio of the air-fuel mixture in the combustion chamber 23 is decreased. Accordingly, as the intake valve closing timing IVC is retarded with respect to the highest filling efficiency closing timing IVCmax, the compression end pressure compIVC is decreased.

Meanwhile, the compression end pressure compIVC is changed by influence of the pulsation of the intake air, which corresponds to the engine rotational speed NE. Therefore, the magnitude of the compression end pressure compIVC with respect to the intake valve closing timing IVC varies depending on the engine rotational speed NE. No matter what the engine rotational speed NE is, the compression end pressure compIVC tends to be changed with respect to the intake valve closing timing IVC in the same manner (as shown in the aforementioned [A] to [C]), if the engine rotational speed NE remains the same.

Accordingly, in this embodiment, a relationship between the intake valve closing timing IVC and the compression end pressure compIVC at each engine rotational speed NE is obtained in advance, and the IVC compression end pressure calculation map shown in FIG. 38 is set using the intake valve closing timing IVC and the engine rotational speed NE as parameters for obtaining the compression end pressure compIVC.

In the IVC compression end pressure calculation map, a value of the compression end pressure compIVC at each intake valve closing timing IVC is set with respect to a value of the compression end pressure compIVC (0 kpa in this map) at the highest filling efficiency closing timing IVCmax.

In step S224, calculations are performed to obtain the estimated change amount of the compression end pressure at a time when the intake valve closing timing IVC is changed from the reference cam intake valve closing timing IVCtdc to the present cam intake valve closing timing IVCnow (i.e., the second reference IVC pressure change amount compIVCnt). That is, the second reference IVC pressure change amount compIVCnt is calculated through processes [1] to [3].

[1] By applying the present cam intake valve closing timing IVCnow and the present engine rotational speed NE to the IVC compression end pressure calculation map shown in FIG. 38, a calculation is performed to obtain an estimated compression end pressure at a time when the intake valve closing timing IVC is set to the present cam intake valve closing timing IVCnow (i.e., the present cam IVC compression end pressure compIVCnow).

[2] A calculation is performed to obtain a difference between the present cam IVC compression end pressure compIVCnow and the reference cam IVC compression end pressure compIVCtdc (i.e., a present-reference IVC pressure change amount ΔcompIVCnt). That is, the present-reference IVC pressure change amount ΔcompIVCnt is calculated through a process described below.

$$\Delta compIVCnt \leftarrow compIVCnow - compIVCtdc$$

[3] On the basis of the present-reference IVC pressure change amount ΔcompIVCnt and the intake air ratio KL, the second reference IVC pressure change amount compIVCnt is calculated. That is, the second reference IVC pressure change amount compIVCnt is calculated through a process described below.

$$compIVCnt \leftarrow \Delta compIVCnt \times (KL/100)$$

In step S226, a calculation is performed to obtain the difference between the second reference IVC pressure change amount compIVCnt and the first reference IVC pressure change amount compIVCbt (i.e., the present cam IVC pressure change amount compIVCnb). That is, the present cam IVC pressure change amount compIVCnb is calculated through a process described below.

$$compIVCnb \leftarrow compIVCnt - compIVCbt$$

Hereinafter, the compression end pressure change amount calculation routine [2] will be described with reference to FIG. 20. This routine is performed as step S300 in "the base ignition timing setting routine".

In step S310, "the IVO compression end pressure change amount calculation routine [2]" shown in FIG. 21 is performed. In this routine, calculations are performed to obtain the estimated change amount of the compression end pressure at a time when the intake valve opening timing IVO is changed from the optimal cam intake valve opening timing IVObst to the initial cam intake valve opening timing IVOdfl (i.e., the initial cam IVO pressure change amount compIVOdb).

In step S320, "the IVC compression end pressure change amount calculation routine [2]" shown in FIG. 22 is performed. In this routine, calculations are performed to obtain the estimated change amount of the compression end pressure at a time when the intake valve closing timing IVC is changed from the optimal cam intake valve closing timing IVCbst to the initial cam intake valve closing timing IVCdfl (i.e., the initial cam IVC pressure change amount compIVCdb).

In step S330, a calculation is performed to obtain the initial cam total pressure change amount compALLdb based on the initial cam IVO pressure change amount compIVOdb and the initial cam IVC pressure change amount compIVCdb. That is, the initial cam total pressure change amount compALLdb is calculated through a process described below.

compALLdb←compIVOdb+compIVCdb

Hereinafter, the IVO compression end pressure change amount calculation routine [2] will be described with reference to FIG. 21. This routine is performed as step S310 in "the compression end pressure change amount calculation routine [2]".

In step S312, calculations are performed to obtain the estimated change amount of the compression end pressure at a time when the intake valve opening timing IVO is changed from the reference cam intake valve opening timing IVOtdc to the initial cam intake valve opening timing IVOdfl (i.e., the third reference IVO pressure change amount compIVOdt). That is, the third reference IVO pressure change amount compIVOdt is calculated through processes [1] to [3] described below.

[1] By applying the initial cam intake valve opening timing IVOdfl and the present engine rotational speed NE to the IVO compression end pressure calculation map shown in FIG. 36, a calculation is performed to obtain an estimated compression end pressure at a time when the intake valve opening timing IVO is set to the initial cam intake valve opening timing IVOdfl (i.e., a present cam IVO compression end pressure compIVOdfl).

[2] A calculation is performed to obtain a difference between the initial cam IVO compression end pressure compIVOdfl and the reference cam IVO compression end pressure compIVOtdc (i.e., an initial-reference IVO pressure change amount ΔcompIVOdt). That is, the initial-reference IVO pressure change amount ΔcompIVOdt is calculated through a process described below.

ΔcompIVOdt←compIVOdfl−compIVOtdc

[3] On the basis of the initial-reference IVO pressure change amount ΔcompIVOdt and the intake air ratio KL, the third reference IVO pressure change amount compIVOdt is calculated. That is, the third reference IVO pressure change amount compIVOdt is calculated through a process described below.

compIVOdt←ΔcompIVOdt×(KL/100)

In step S314, a calculation is performed to obtain the difference between the third reference IVO pressure change amount compIVOdt and the first reference IVO pressure change amount compIVObt (i.e., the initial cam IVO pressure change amount compIVOdb). That is, the initial cam IVO pressure change amount compIVOdb is calculated through a process described below.

compIVOdb←compIVOdt−compIVObt

Hereinafter, the IVC compression end pressure change amount calculation routine [2] will be described with reference to FIG. 22. This routine is performed as step S320 in "the compression end pressure change amount calculation routine [2]".

In step S322, calculations are performed to obtain the estimated change amount of the compression end pressure at a time when the intake valve closing timing IVC is changed from the reference cam intake valve closing timing IVCtdc to the initial cam intake valve closing timing IVCdfl (i.e., the third reference IVC pressure change amount compIVCdt). That is, the third reference IVC pressure change amount compIVCdt is calculated through processes [1] to [3] described below.

[1] By applying the initial cam intake valve closing timing IVCdfl and the present engine rotational speed NE to the IVC compression end pressure calculation map shown in FIG. 38, a calculation is performed to obtain an estimated compression end pressure at a time when the intake valve closing timing IVC is set to the initial cam intake valve closing timing IVCdfl (i.e., an initial cam IVC compression end pressure compIVCdfl).

[2] A calculation is performed to obtain a difference between the initial cam IVC compression end pressure compIVCdfl and the reference cam IVC compression end pressure compIVCtdc (i.e., an initial-reference IVC pressure change amount ΔcompIVCdt). That is, the initial-reference IVC pressure change amount ΔcompIVCdt is calculated through a process described below.

ΔcompIVCdt←compIVCdfl−compIVCtdc

[3] On the basis of the initial-reference IVC pressure change amount ΔcompIVCdt and the intake air ratio KL, the third reference IVC pressure change amount compIVCdt is calculated. That is, the third reference IVC pressure change amount compIVCdt is calculated through a process described below.

compIVCdt←ΔcompIVCdt×(KL/100)

In step S324, a calculation is performed to obtain the difference between the third reference IVC pressure change amount compIVCdt and the first reference IVC pressure change amount compIVCbt (i.e., the initial cam IVC pressure change amount compIVCdb). That is, the initial cam IVC pressure change amount compIVCdb is calculated through a process described below.

compIVCdb←compIVCdt−compIVCbt

Hereinafter, the overlap ratio calculation routine will be described with reference to FIG. 23. This routine is performed as step S400 in "the ignition timing setting routine".

In step S410, the optimal cam overlap amount OVLPbst is calculated. The optimal cam overlap amount OVLPbst is calculated through one of a process [1] and a process [2], according to the optimal cam intake valve opening timing IVObst.

[1] When the optimal cam intake valve opening timing IVObst is BTDC, a crank angle from the optimal cam intake valve opening timing IVObst to the optimal cam exhaust valve closing timing EVCbst is calculated as the optimal cam overlap amount OVLPbst. That is, the optimal cam overlap amount OVLPbst is calculated through a process described below.

OVLPbst←IVObst+EVCbst

For example, when the optimal cam intake valve opening timing IVObst is 10 degrees (BTDC) and the optimal cam exhaust valve closing timing EVCbst is 10 degrees (ATDC), the optimal cam overlap amount OVLPbst is "20 degrees".

[2] When the optimal cam intake valve opening timing IVObst is ATDC, a crank angle from TDC to the optimal cam exhaust valve closing timing EVCbst is calculated as the optimal cam overlap amount OVLPbst. That is, the optimal cam overlap amount OVLPbst is calculated through a process described below.

OVLPbst←EVCbst

For example, when the optimal cam intake valve opening timing IVObst is 10 degrees (ATDC) and the optimal cam exhaust valve closing timing EVCbst is 20 degrees (ATDC), the optimal cam overlap amount OVLPbst is "20 degrees".

In step S420, the present cam overlap amount OVLPnow is calculated. The present cam overlap amount OVLPnow is calculated through one of a process [1] and a process [2] described below, according to the present cam intake valve opening timing IVOnow.

[1] When the present cam intake valve opening timing IVOnow is BTDC, a crank angle from the present cam intake valve opening timing IVOnow to the present cam exhaust valve closing timing EVCnow is calculated as the present cam overlap amount OVLPnow. That is, the present cam overlap amount OVLPnow is calculated through a process described below.

OVLPnow←IVOnow+EVCnow

[2] When the present cam intake valve opening timing IVOnow is ATDC, a crank angle from TDC to the present cam exhaust valve closing timing EVCnow is calculated as the present cam overlap amount OVLPnow. That is, the present cam overlap amount OVLPnow is calculated through a process described below.

OVLPnow←EVCnow

In step S430, calculations are performed to obtain the ratio of the present cam overlap amount OVLPnow to the optimal cam overlap amount OVLPbst (i.e., the overlap ratio OVLPratio). The overlap ratio OVLPratio is calculated through one of a process [1] and a process [2] described below, according to the relationship between the optimal cam overlap amount OVLPbst and the reference overlap amount OVLPX.

[1] When the optimal cam overlap amount OVLPbst is equal to or larger than the reference overlap amount OVLPX (OVLPbst>OVLPX), the overlap ratio OVLPratio is calculated based on the present cam overlap amount OVLPnow and the optimal cam overlap amount OVLPbst. That is, the overlap ratio OVLPratio is calculated through a process described below.

OVLPratio←OVLPnow/OVLPbst

[2] When the optimal cam overlap amount OVLPbst is smaller than the reference overlap amount OVLPX (OVLPbst<OVLPX), the overlap ratio OVLPratio is set to "0". That is, the overlap ratio OVLPratio is calculated through a process described below.

OVLPratio←0

When the optimal cam overlap amount OVLPbst is equal to or larger than the reference overlap amount OVLPX, the electronic control unit 9 determines that it is possible to obtain sufficiently high accuracy of correcting the optimal cam MBT ignition timing MBTbst based on the optimal cam overlap amount OVLPbst. Therefore, the electronic control unit 9 calculates the overlap ratio OVLPratio. That is, it is determined that each of the optimal cam MBTbst and the optimal cam knock limit ignition timing TKbst includes an ignition timing correction amount corresponding to the valve overlap amount.

Meanwhile, when the optimal cam overlap amount OVLPbst is smaller than the reference overlap amount OVLPX, the electronic control unit 9 determines that it is not possible to obtain sufficiently high accuracy of correcting the optimal cam MBT ignition timing MBTbst based on the optimal cam overlap amount OVLPbst. Therefore, the electronic control unit 9 does not calculate the overlap ratio OVLPratio (i.e., the overlap ratio OVLPratio is set to "0"). That is, it is determined that neither the optimal cam MBTbst nor the optimal cam knock limit ignition timing TKbst includes an ignition timing correction amount corresponding to the valve overlap amount.

Hereinafter, the present cam MBT ignition timing setting routine will be described with reference to FIG. 24. This routine is performed as step S500 in "the base ignition timing setting routine".

Figure 41:
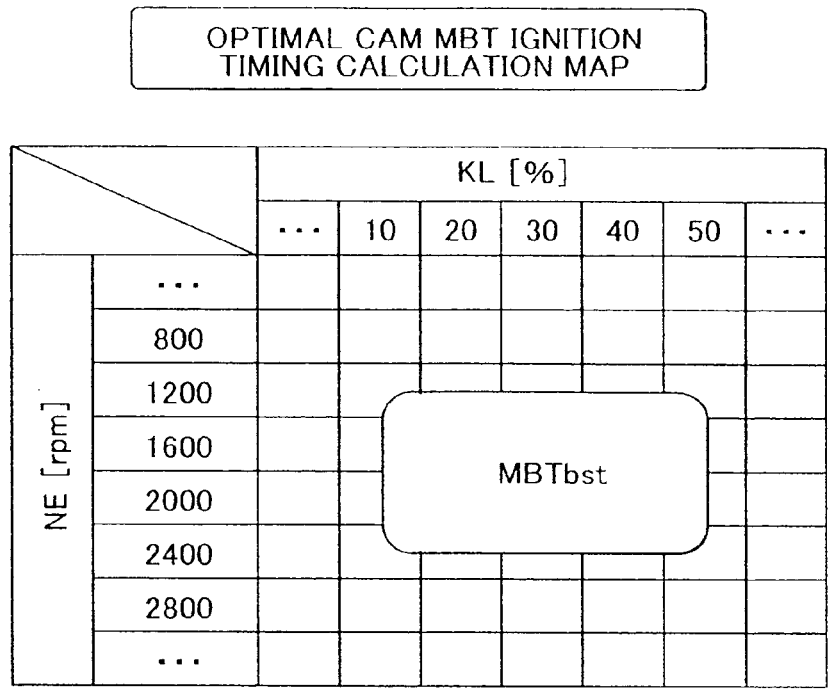
FIG. 41 is a diagram showing an example of an optimal cam MBT ignition timing calculation map in which a relationship between an intake air ratio and the engine rotational speed, and an optimal cam MBT ignition timing in the first embodiment.
Figure 42:
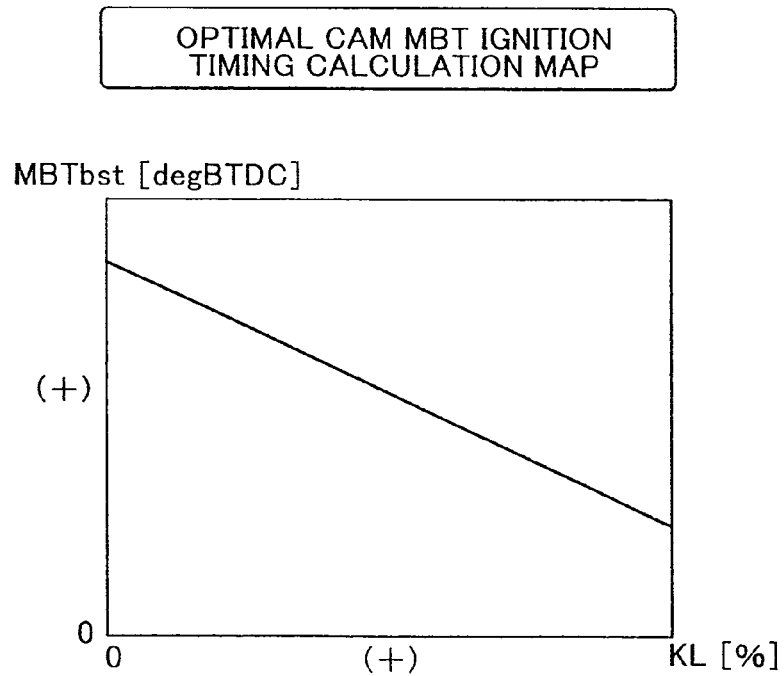
FIG. 42 is a graph showing a relationship between the intake air ratio and MBT ignition timing at a uniform engine rotational speed, based on the optimal cam MBT ignition timing calculation map in the first embodiment.

In step S510, a calculation is performed to obtain the optimal cam MBT ignition timing MBTbst corresponding to the present engine rotational speed NE and the intake air ratio KL using the optimal cam MBT ignition timing calculation map shown in FIG. 41. FIG. 42 shows a relationship between the intake air ratio KL and the optimal cam MBT ignition timing MBTbst at a uniform engine rotational speed NE. In this embodiment, the optimal cam MBT ignition timings MBTbst set in the optimal cam MBT ignition timing calculation map are equivalent to the plural basic MBT ignition timings.

In step S520, "the first MBT correction amount calculation routine" shown in FIG. 25 is performed. In this routine, calculations are performed to obtain the first MBT correction amount MBTcompnb which is a correction term for the optimal cam MBT ignition timing MBTbst.

In step S530, "the second MBT correction amount calculation routine" shown in FIG. 26 is performed. In this routine, calculations are performed to obtain the second MBT correction amount MBTOVLPnb which is a correction term for the optimal cam MBT ignition timing MBTbst.

In step S540, on the basis of the first MBT correction amount MBTcompnb and the second MBT correction amount MBTOVLPnb, an MBT ignition timing correction amount MBTnb is calculated. That is, the MBT ignition timing correction amount MBTnb is calculated through a process described below.

MBTnb←MBTcompnb+MBTOVLPnb

In step S550, on the basis of the optimal cam MBT ignition timing MBTbst and the MBT ignition timing correction amount MBTnb, the present cam MBT ignition timing MBTnow is calculated. That is, the present cam MBT ignition timing MBTnow is calculated through a process described below.

$$MBTnow \leftarrow MBTbst + MBTnb$$

Hereinafter, the first MBT correction amount calculation routine will be described with reference to FIG. 25. This routine is performed as step S520 in "the MBT ignition timing setting routine".

Figure 40:
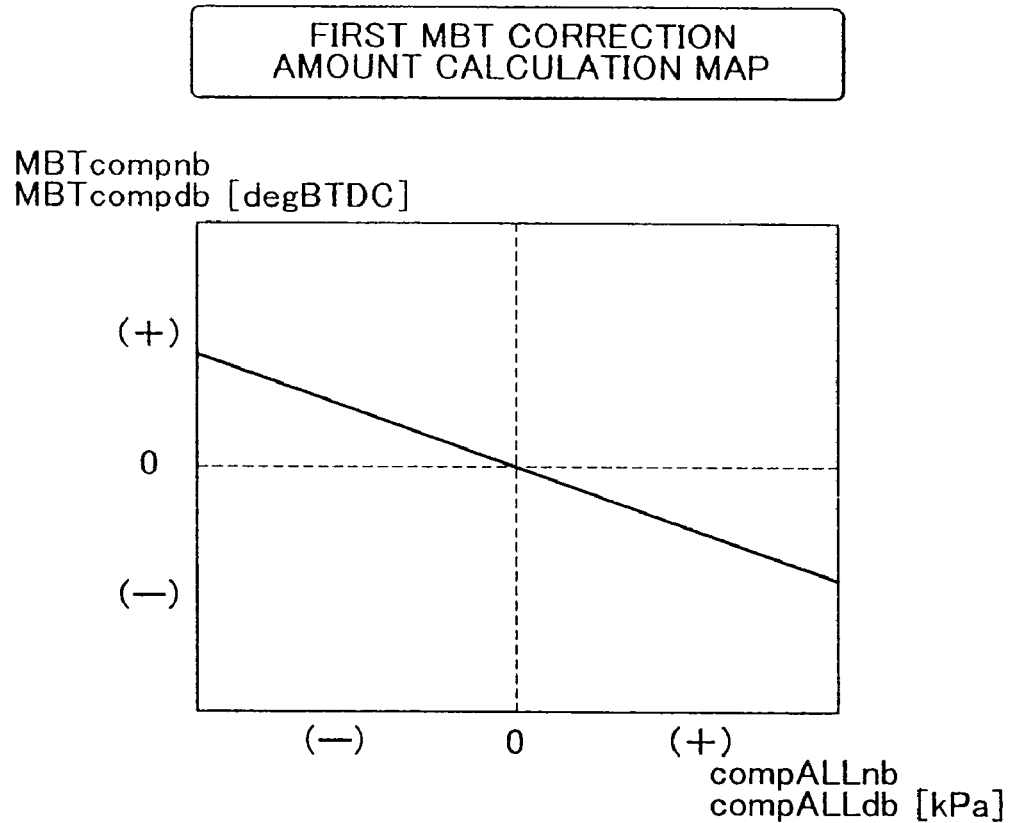
FIG. 40 is a diagram showing an example of a first MBT correction amount calculation map in which a relationship between a compression end pressure change amount and a first MBT correction amount is set in the first embodiment.

In step S522, a calculation is performed to obtain the first MBT correction amount MBTcompnb corresponding to the present cam total pressure change amount compALLnb, using a first MBT correction amount calculation map shown in FIG. 40.

In the first MBT correction amount calculation map, the MBT correction amounts (the first MBT correction amount MBTcompnb and the initial cam MBT correction amount MBTcompdb) are set according to the change amount of the compression end pressure (i.e., the present cam total pressure change amount compALLnb and the initial cam total pressure change amount compALLdb) as follows.

(A) In a region in which the change amount of the compression end pressure is a positive value, that is, in a region in which the present cam combustion chamber pressure Pnow is higher than the optimal cam combustion chamber pressure Pbst, the MBT correction amount is set to a negative value. Also, as the change amount of the compression end pressure is increased, the MBT correction amount is decreased, that is, an absolute value of the MBT correction amount is increased.

(B) In a region in which the change amount of the compression end pressure is a negative value, that is, in a region in which the present cam combustion chamber pressure Pnow is lower than the optimal cam combustion chamber pressure Pbst, the MBT correction amount is set to a positive value. Also, as the change amount of the compression end pressure is decreased, that is, an absolute value of the change amount of the compression end pressure is increased, the MBT correction amount is increased.

(C) When the change amount of the compression end pressure is "0", that is, when the present cam combustion chamber pressure Pnow is equal to the optimal cam combustion chamber pressure Pbst, the MBT correction amount is set to "0".

The optimal cam MBT ignition timing MBTbst (the MBT ignition timing correction amount MBTnb) is corrected according to the present cam total pressure change amount compALLnb as follows (step S540 and step S550).

(A) When the present cam total pressure change amount compALLnb is a positive value, since the first MBT correction amount MBTcompnb is a negative value, the optimal cam MBT ignition timing MBTbst (the MBT ignition timing correction amount MBTnb) is retarded by an amount corresponding to the absolute value of the first MBT correction amount MBTcompnb.

(B) When the present cam total pressure change amount compALLnb is a negative value, since the first MBT correction amount MBTcompnb is a positive value, the optimal cam MBT ignition timing MBTbst (the MBT ignition timing correction amount MBTnb) is advanced by an amount corresponding to the absolute value of the first MBT correction amount MBTcompnb.

(C) When the present cam total pressure change amount compALLnb is "0", since the first MBT correction amount MBTcompnb is "0", the optimal cam MBT ignition timing MBTbst (the MBT ignition timing correction amount MBTnb) is neither advanced nor retarded.

Hereinafter, the second MBT correction amount calculation routine will be described with reference to FIG. 26. This routine is performed as step S530 in "the MBT ignition timing setting routine".

Figure 43:
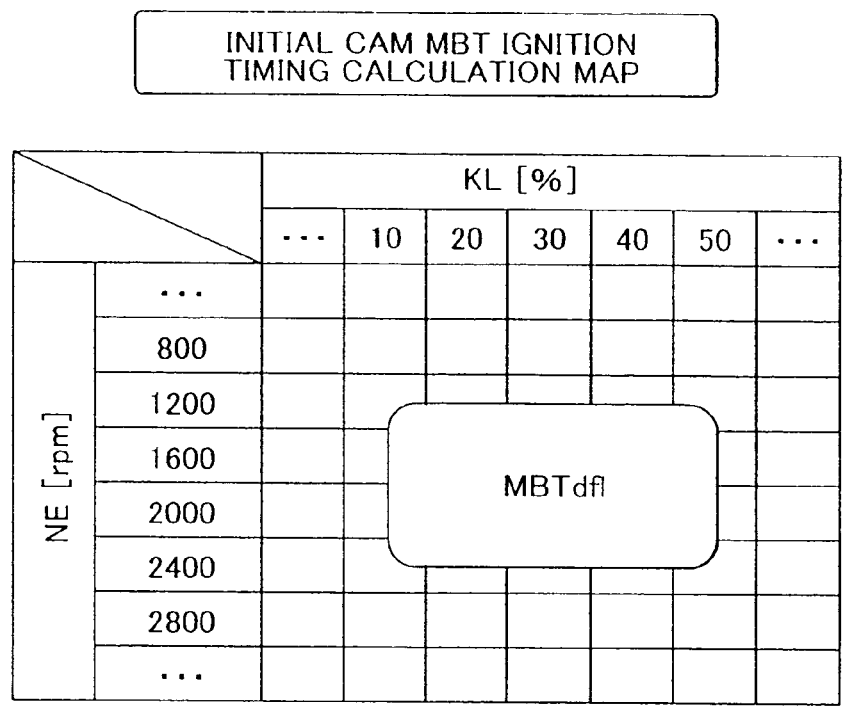
FIG. 43 is a diagram showing an example of an initial cam MBT ignition timing calculation map in which a relationship between the intake air ratio and the engine rotational speed, and an initial cam MBT ignition timing is set in the first embodiment.
Figure 44:
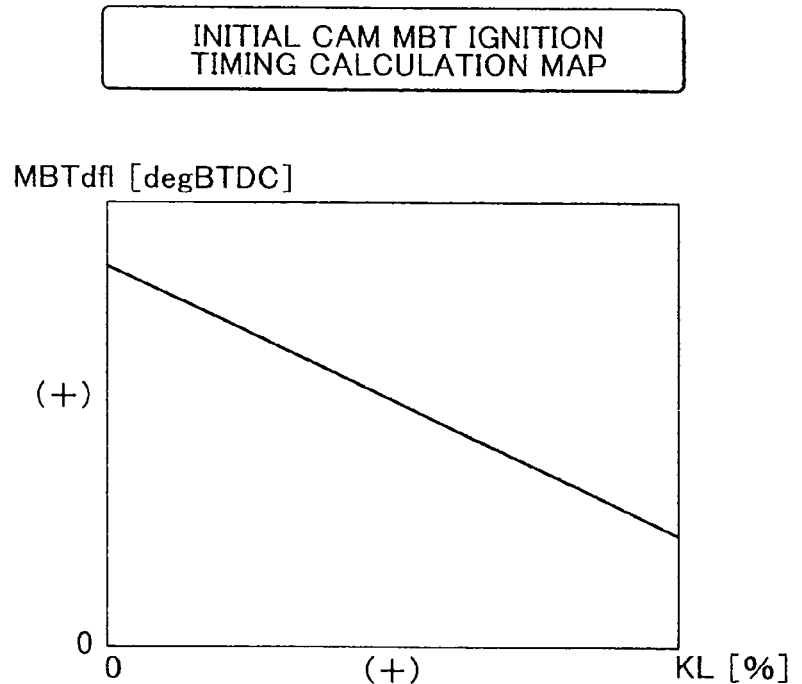
FIG. 44 is a graph showing a relationship between the intake air ratio and the MBT ignition timing at a uniform engine rotational speed, based on the initial cam MBT ignition timing calculation map in the first embodiment.

In step S532, a calculation is performed to obtain the initial cam MBT ignition timing MBTdfl corresponding to the present engine rotational speed NE and the intake air ratio KL, using an initial cam MBT ignition timing calculation map shown in FIG. 43. FIG. 44 shows a relationship between the intake air ratio KL and the initial cam MBT ignition timing MBTdfl at a uniform engine rotational speed NE.

In step S534, a calculation is performed to obtain the initial cam MBT correction amount MBTcompdb corresponding to the initial cam total pressure change amount compALLdb, using the first MBT correction amount calculation map shown in FIG. 40.

In step S536, the MBT ignition timing correction amount corresponding to the optimal cam overlap amount OVLPbst (i.e., the overlap MBT correction amount MBTOVLPbst) is derived from the optimal cam MBT ignition timing MBTbst. That is, the overlap MBT correction amount MBTOVLPbst is calculated through a process described below.

$$MBTOVLPbst \leftarrow MBTbst + MBTcompdb - MBTdfl$$

Hereinafter, description will be made of a mode in which the overlap MBT correction amount MBTOVLPbst is derived. There are the following differences between the optimal cam MBT ignition timing MBTbst and the initial cam MTB ignition timing MBTdfl.

(A) The optimal cam MBT ignition timing MBTbst is set so as to include the ignition timing correction amount corresponding to the valve overlap amount in the optimal cam. Meanwhile, the initial cam MTB ignition timing MBTdfl is set so as to be appropriate for the valve overlap amount in the initial cam Cdfl, that is, the initial cam MTB ignition timing MBTdfl is set so as to be appropriate for a state in which the valve overlap amount is "0". Therefore, the optimal cam MBT ignition timing MBTbst is different from the initial cam MBT ignition timing MBTdfl by an amount corresponding to the valve overlap amount in the optimal cam Cbst.

(B) The optimal cam MBT ignition timing MBTbst is set so as to include the ignition timing correction amount corresponding to the optimal cam combustion chamber pressure Pbst. Meanwhile, the initial cam MBT ignition timing MBTdfl is set so as to include the ignition timing correction amount corresponding to the initial cam combustion chamber pressure Pdfl. Therefore, the optimal cam MBT ignition timing MBTbst is different from the initial cam MBT ignition timing MBTdfl by an amount corresponding to the difference between the optimal cam combustion chamber pressure Pbst and the initial cam combustion chamber pressure Pdfl.

When the optimal cam MBT ignition timing MBTbst is used as a reference, the optimal cam MBT ignition timing MBTbst does not include the ignition timing correction amount corresponding to the change in the pressure in the combustion chamber 23. Meanwhile, the initial cam MBT ignition timing MBTdfl includes the ignition timing correction amount corresponding to the amount of the change in the pressure from the optimal cam combustion chamber pressure Pbst to the initial cam combustion chamber pressure Pdfl (i.e., the initial cam MBT correction amount MBTcompdb).

Therefore, an ignition timing obtained by adding the overlap MBT correction amount MBTOVLPbst to the initial cam MBT ignition timing MBTdfl is the same as an ignition timing obtained by adding the initial cam MBT correction amount MBTcompdb to the optimal cam MBT ignition timing MBTbst.

Accordingly, by subtracting the initial cam MBT ignition timing MBTdfl from the ignition timing obtained by adding the initial cam MBT correction amount MBTcompdb to the optimal cam MBT ignition timing MBTbst, only the correction amount corresponding to the valve overlap amount can be derived from the optimal cam MBT ignition timing MBTbst.

Figure 45:
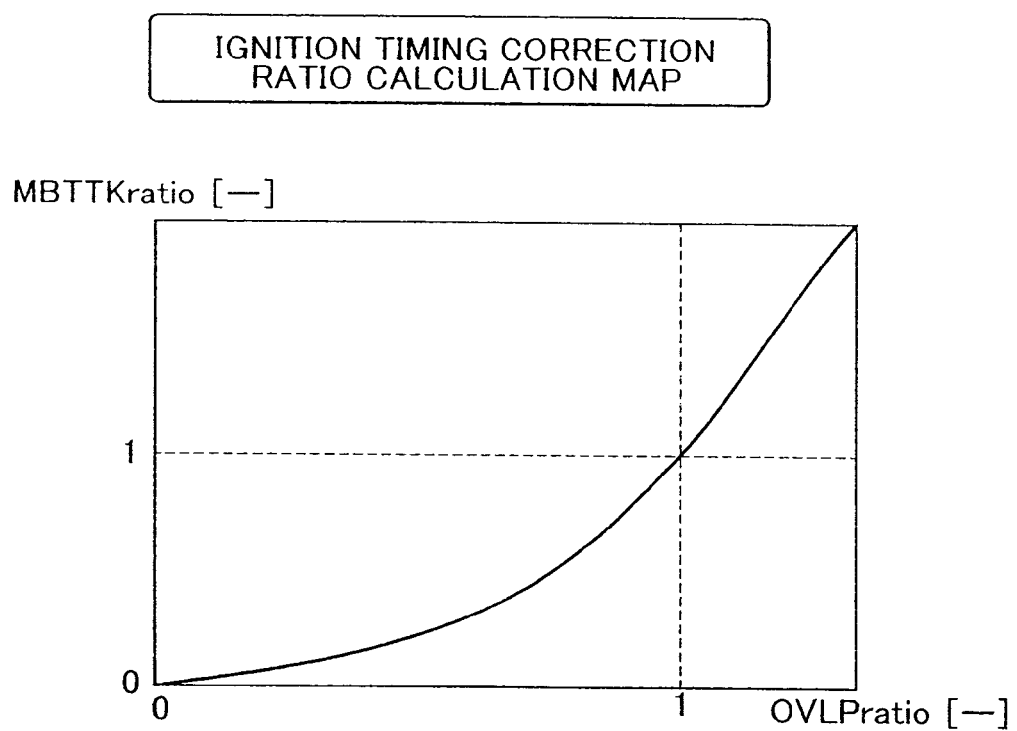
FIG. 45 is a diagram showing an example of an ignition timing correction ratio calculation map in which a relationship between an overlap ratio and an ignition timing correction ratio is set in the first embodiment.

In step S538, a calculation is performed to obtain the ignition timing correction ratio MBTTKratio corresponding to the overlap ratio OVLPratio, using an ignition timing correction ratio calculation map shown in FIG. 45.

In the ignition timing correction ratio calculation map, values of the ignition timing correction ratio MBTTKratio are set as follows.

(A) In a region in which the overlap ratio OVLPratio is larger than "1", that is, in a region in which the present cam overlap amount OVLPnow is larger than the optimal cam overlap amount OVLPbst, the ignition timing correction ratio MBTTKratio is set to a value larger than "1". Also, as the overlap ratio OVLPratio is increased, the ignition timing correction ratio MBTTKratio is increased.

(B) In a region in which the overlap ratio OVLPratio is smaller than "1", that is, in a region in which the present cam overlap amount OVLPnow is smaller than the optimal cam overlap amount OVLPbst, the ignition timing correction ratio MBTTKratio is set to a value smaller than "1". Also, as the overlap ratio OVLPratio is decreased, the ignition timing correction ratio MBTTKratio is decreased.

(C) When the overlap ratio OVLPratio is "0", that is, the optimal cam overlap amount OVLPbst is smaller than the reference overlap amount OVLPX, the ignition timing correction ratio MBTTKratio is set to "0".

(D) When the overlap ratio OVLPratio is "1", that is, when the present cam overlap amount OVLPnow is equal to the optimal cam overlap amount OVLPbst, the ignition timing correction ratio MBTTKratio is set to "1".

In step S53A, on the basis of the overlap MBT correction amount MBTOVLPbst and the MBT ignition timing correction amount MBTTKratio, the second MBT correction amount MBTOVLPnb is calculated. That is, the second MBT correction amount MBTOVLPnb is calculated through a process described below.

MBTOVLPnb←MBTOVLPbst×(MBTTKratio−1)

The optimal cam MBT ignition timing MBTbst (the MBT ignition timing correction amoung MBTnb) is corrected according to the overlap ratio OVLPratio, as follows (step S540 and step S550).

(A) When the overlap ratio OVLPratio is larger than "1", since the second MBT correction amount MBTOVLPnb is a positive value, the optimal cam MBT ignition timing MBTbst is advanced by an amount corresponding to an absolute value of the second MBT correction amount MBTOVLPnb.

(B) When the overlap ratio OVLPratio is smaller than "1", since the second MBT correction amount MBTOVLPnb is a negative value, the optimal cam MBT ignition timing MBTbst is retarded by an amount corresponding to the absolute value of the second MBT correction amount MBTOVLPnb.

(C) When the overlap ratio OVLPratio is "0", since the second MBT correction amount MBTOVLPnb is a negative value, and an absolute value of the second MBT correction amount MBTOVLPnb is equal to an absolute value of the overlap MBT correction amount MBTOVLPbst, the optimal cam MBT ignition timing MBTbst is retarded by an amount corresponding to the absolute value of the overlap MBT correction amount MBTOVLPbst (i.e., the second MBT correction amount MBTOVLPnb).

(D) When the overlap ratio OVLPratio is "1", since the second MBT correction amount MBTOVLPnb is "0", the optimal cam MBT ignition timing MBTbst is neither advanced nor retarded.

Hereinafter, the compression end temperature change amount calculation routine [1] will be described with reference to FIG. 27. This routine is performed as step S600 in "the base ignition timing setting routine".

In step S610, the IVO compression end temperature change amount calculation routine [1] shown in FIG. 28 is performed. In this routine, calculations are performed to obtain the estimated change amount of the compression end temperature at a time when the intake valve opening timing IVO is changed form the optimal cam intake valve opening timing IVObst to the present cam intake valve opening timing IVOnow (i.e., the present cam IVO temperature change amount tempIVOnb).

In step S620, "the IVC compression temperature change amount calculation routine [1]" shown in FIG. 29 is performed. In this routine, calculations are performed to obtain the estimated change amount of the compression end temperature at a time when the intake valve closing timing IVC is changed from the optimal cam intake valve closing timing IVCbst to the present cam intake valve closing timing IVCnow (i.e., the present cam IVC temperature change amount tempIVOnb).

In step S630, on the basis of the present cam IVO temperature change amount tempIVOnb and the present cam IVC temperature change amount tempIVCnb, the present cam total temperature change amount tempALLnb is calculated. That is, the present cam total temperature change amount tempALLnb is calculated through a process described below.

tempALLnb←tempIVOnb+tempIVCnb

Hereinafter, the IVO compression end temperature change amount calculation routine [1] will be described with reference to FIG. 28. This routine is performed as step S610 in "the compression end temperature change amount calculation routine [1]".

In step S612, calculations are performed to obtain the estimated change amount of the compression end temperature at a time when the intake valve opening timing IVO is changed from the reference cam intake valve opening timing IVOtdc to the optimal cam intake valve opening timing IVObst (i.e., the first reference IVO temperature change amount tempIVObt). That is, the first reference IVO temperature change amount tempIVObt is calculated through processes [1] to [4] described below.

Figures 46, 47:
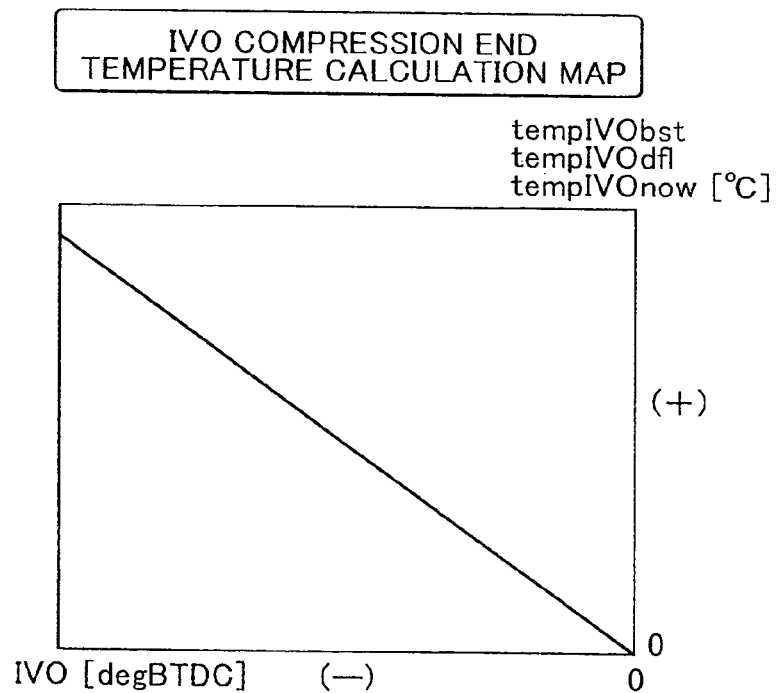
FIG. 46 is a diagram showing an example of an IVO compression end temperature calculation map in which a relationship between the intake valve opening timing and the engine rotational speed, and the compression end temperature is set in the first embodiment.
FIG. 47 is a graph showing a relationship between the intake valve opening timing and the compression end temperature at a uniform engine rotational speed, based on the IVO compression end temperature calculation map in the first embodiment.

[1] By applying the reference cam intake valve opening timing IVOtdc and the present engine rotational speed NE to an IVO compression end temperature calculation map shown in FIG. 46, a calculation is performed to obtain the estimated compression end temperature at a time when the intake valve opening timing IVO is set to the reference cam intake valve opening timing IVOtdc (i.e., the reference cam IVO compression end temperature tempIVOtdc).

FIG. 47 shows a relationship between the intake valve opening timing IVO and the compression end temperature tempIVO at a uniform engine rotational speed NE. The IVO compression end temperature calculation map shown in FIG. 46 is set based on the relationship between the intake valve opening timing IVO and the compression end temperature tempIVO at each engine rotational speed NE, as well as the IVO compression end pressure calculation map. Also, in the IVO compression end temperature calculation map, a value of the compression end temperature tempIVO at each intake valve opening timing IVO is set with respect to a value of the compression end temperature tempIVO (0° C. in this map) at the reference cam intake valve opening timing IVOtdc.

[2] By applying the optimal cam intake valve opening timing IVObst and the present engine rotational speed NE to the IVO compression end temperature calculation map shown in FIG. 46, a calculation is performed to obtain the estimated compression end temperature at a time when the intake valve opening timing IVO is set to the optimal cam intake valve opening timing IVObst (i.e., the optimal cam IVO compression end temperature tempIVObst).

[3] A calculation is performed to obtain a difference between the optimal cam IVO compression end temperature tempIVObst and the reference cam IVO compression end temperature tempIVOtdc (i.e., an optimal-reference IVO temperature change amount ΔtempIVObt). That is, the optimal-reference IVO temperature change amount ΔtempIVObt is calculated through a process described below.

$$\Delta tempIVObt \leftarrow tempIVObst - tempIVOtdc$$

[4] On the basis of the optimal-reference IVO temperature change amount ΔtempIVObt and the intake air ratio KL, the first reference IVO temperature change amount tempIVObt is calculated. That is, the first reference IVO temperature change amount tempIVObt is calculated through a process described below.

$$tempIVObt \leftarrow \Delta tempIVObt \times (KL/100)$$

The IVO compression end temperature calculation map shows the relationship between the intake valve opening timing IVO and the compression end temperature when the intake air ratio KL is 100%. Therefore, by multiplying the optimal-reference IVO temperature change amount ΔtempIVObt by the intake air ratio KL (which is a dimensionless value), it is possible to calculate the change amount of the compression end temperature, which corresponds to the present intake air ratio KL.

In step S614, calculations are performed to obtain the estimated change amount of the compression end temperature at a time when the intake valve opening timing IVO is changed from the reference cam intake valve opening timing IVOtdc to the present cam intake valve opening timing IVOnow (i.e., the second reference IVO temperature change amount tempIVOnt). That is, the second reference IVO temperature change amount tempIVOnt is calculated through processes [1] to [3] described below.

By applying the present cam intake valve opening timing IVOnow and the present engine rotational speed NE to the IVO compression end temperature calculation map shown in FIG. 46, a calculation is performed to obtain an estimated compression end temperature at a time when the intake valve opening timing IVO is set to the present cam intake valve opening timing IVOnow (i.e., the present cam IVO compression end temperature tempIVOnow).

[2] A calculation is performed to obtain a difference between the present cam IVO compression end temperature tempIVOnow and the reference cam IVO compression end temperature tempIVOtdc (i.e., a present-reference IVO temperature change amount ΔtempIVOnt). That is, the present-reference IVO temperature change amount ΔtempIVOnt is calculated through a process described below.

$$\Delta tempIVOnt \leftarrow tempIVOnow - tempIVOtdc$$

[3] On the basis of the present-reference IVO temperature change amount ΔtempIVOnt and the intake air ratio KL, the second reference IVO temperature change amount tempIVOnt is calculated. That is, the second reference IVO temperature change amount tempIVOnt is calculated through a process described below.

$$tempIVOnt \leftarrow \Delta tempIVOnt \times (KL/100)$$

In step S616, a calculation is performed to obtain the difference between the second reference IVO temperature change amount tempIVOnt and the first reference IVO temperature change amount tempIVObt (i.e., the present cam IVO temperature change amount tempIVOnb). That is, the present cam IVO temperature change amount tempIVOnb is calculated through a process described below.

$$tempIVOnb \leftarrow tempIVOnt - tempIVObt$$

Hereinafter, the IVC compression end temperature change amount calculation routine [1] will be described with reference to FIG. 29. This routine is performed as step S620 in "the compression end temperature change amount calculation routine [1]".

In step S622, calculations are performed to obtain the estimated change amount of the compression end temperature at a time when the intake valve closing timing IVC is changed from the reference cam intake valve closing timing IVCtdc to the optimal cam intake valve closing timing IVCbst (i.e., the first reference IVC temperature change amount tempIVCbt). That is, the first reference IVC temperature change amount tempIVCbt is calculated through processes [1] to [4] described below.

Figures 48, 49:
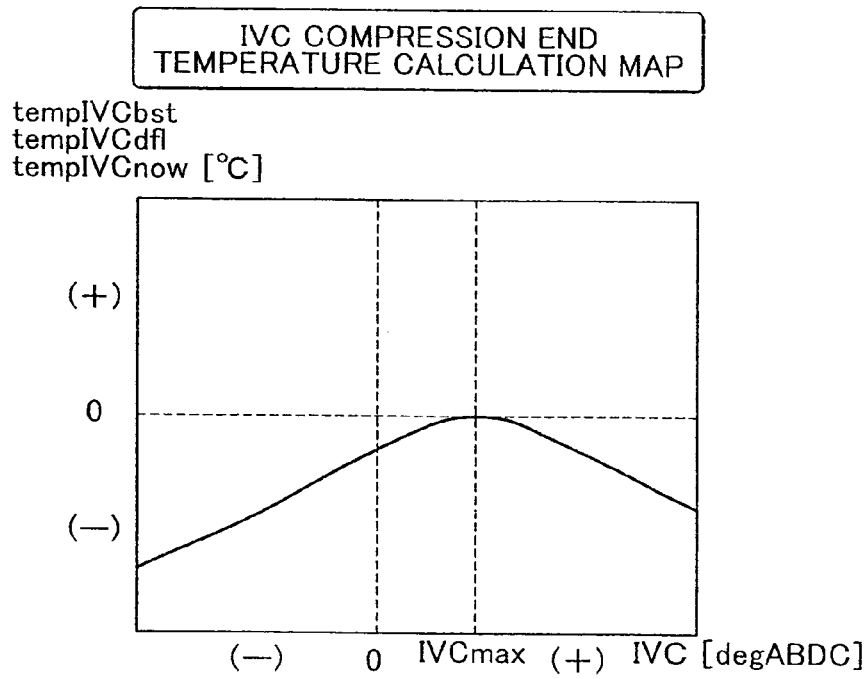
FIG. 48 is a diagram showing an example of an IVC compression end temperature calculation map in which a relationship between the intake valve closing timing and the engine rotational speed, and the compression end temperature is set in the first embodiment.
FIG. 49 is a graph showing a relationship between the intake valve closing timing and the compression end temperature at a uniform engine rotational speed, based on the IVC compression end temperature calculation map in the first embodiment.

[1] By applying the reference cam intake valve closing timing IVCtdc and the present engine rotational speed NE to an IVC compression end temperature calculation map shown in FIG. 48, a calculation is performed to obtain the estimated compression end temperature at a time when the intake valve closing timing IVC is set to the reference cam intake valve closing timing IVCtdc (i.e., the reference cam IVC compression end temperature tempIVCtdc).

FIG. 49 shows a relationship between the intake valve closing timing IVC and the compression end temperature tempIVC at a uniform engine rotational speed NE. The IVC compression end temperature calculation map shown in FIG. 48 is set based on the relationship between the intake valve closing timing IVC and the compression end temperature tempIVC at each engine rotational speed NE, as well as the IVC compression end pressure calculation map. Also, in the IVC compression end temperature calculation map, a value of the compression end temperature tempIVC at each intake valve closing timing IVC is set with respect to a value of the compression end temperature tempIVC (0° C. in this map) at the highest filling efficiency closing timing IVCmax.

[2] By applying the optimal cam intake valve closing timing IVCbst and the present engine rotational speed NE to the IVC compression end temperature calculation map shown in FIG. 48, a calculation is performed to obtain the estimated compression end temperature at a time when the intake valve closing timing IVC is set to the optimal cam intake valve closing timing IVCbst (i.e., the optimal cam IVC compression end temperature tempIVCbst).

[3] A calculation is performed to obtain a difference between the optimal cam IVC compression end temperature tempIVCbst and the reference cam IVC compression end temperature tempIVCtdc (i.e., an optimal-reference IVC temperature change amount ΔtempIVCbt). That is, the optimal-reference IVC temperature change amount ΔtempIVCbt is calculated through a process described below.

ΔtempIVCbt←tempIVCbst−tempIVCtdc

[4] On the basis of the optimal-reference IVC temperature change amount ΔtempIVCbt and the intake air ratio KL, the first reference IVC temperature change amount tempIVCbt is calculated. That is, the first reference IVC temperature change amount tempIVCbt is calculated through a process described below.

tempIVCbt←ΔtempIVCbt×(KL/100)

The IVC compression end temperature calculation map shows the relationship between the intake valve closing timing IVC and the compression end temperature when the intake air ratio KL is 100%. Therefore, by multiplying the optimal-reference IVC temperature change amount ΔtempIVCbt by the intake air ratio KL (which is a dimensionless value), it is possible to calculate the change amount of the compression end temperature, which corresponds to the present intake air ratio KL.

In step S624, calculations are performed to obtain the estimated change amount of the compression end temperature at a time when the intake valve closing timing IVC is changed from the reference cam intake valve closing timing IVCtdc to the present cam intake valve closing timing IVCnow (i.e., the second reference IVC temperature change amount tempIVCnt). That is, the second reference IVC temperature change amount tempIVCnt is calculated through processes [1] to [3] described below.

By applying the present cam intake valve closing timing IVCnow and the present engine rotational speed NE to the IVC compression end temperature calculation map shown in FIG. 48, a calculation is performed to obtain an estimated compression end temperature at a time when the intake valve closing timing IVC is set to the present cam intake valve closing timing IVCnow (i.e., the present cam IVC compression end temperature tempIVCnow).

[2] A calculation is performed to obtain a difference between the present cam IVC compression end temperature tempIVCnow and the reference cam IVC compression end temperature tempIVCtdc (i.e., a present-reference IVC temperature change amount ΔtempIVCnt). That is, the present-reference IVC temperature change amount ΔtempIVCnt is calculated through a process described below.

ΔtempIVCnt←tempIVCnow−tempIVCtdc

[3] On the basis of the present-reference IVC temperature change amount ΔtempIVCnt and the intake air ratio KL, the second reference IVC temperature change amount tempIVCnt is calculated. That is, the second reference IVC temperature change amount tempIVCnt is calculated through a process described below.

tempIVCnt←ΔtempIVCnt×(KL/100)

In step S626, a calculation is performed to obtain the difference between the second reference IVC temperature change amount tempIVCnt and the first reference IVC temperature change amount tempIVCbt (i.e., the present cam IVC temperature change amount tempIVCnb). That is, the present cam IVC temperature change amount tempIVCnb is calculated through a process described below.

tempIVCnb←tempIVCnt−tempIVCbt

Hereinafter, the compression end temperature change amount calculation routine [2] will be described with reference to FIG. 30. This routine is performed as step S700 in "the base ignition timing setting routine".

In step S710, "the IVO compression end temperature change amount calculation routine [2]" shown in FIG. 31 is performed. In this routine, calculations are performed to obtain the estimated change amount of the compression end temperature at a time when the intake valve opening timing IVO is changed from the optimal cam intake valve opening timing IVObst to the initial cam intake valve opening timing IVOdfl (i.e., the initial cam IVO temperature change amount tempIVOdb).

In step S720, "the IVC compression end temperature change amount calculation routine [2]" shown in FIG. 32 is performed. In this routine, calculations are performed to obtain the estimated change amount of the compression end temperature at a time when the intake valve closing timing IVC is changed from the optimal cam intake valve closing timing IVCbst to the initial cam intake valve closing timing IVCdfl (i.e., the initial cam IVC temperature change amount tempIVCdb).

In step S730, on the basis of the initial cam IVO temperature change amount tempIVOdb and the initial cam IVC temperature change amount tempIVCdb, the initial cam total temperature change amount tempALLdb is calculated. That is, the initial cam total temperature change amount tempALLdb is calculated through a process described below.

tempALLdb tempIVOdb+tempIVCdb

Hereinafter, the IVO compression end temperature change amount calculation routine [2] will be described with reference to FIG. 31. This routine is performed as step S710 in "the compression end temperature change amount calculation routine [2]".

In step S712, calculations are performed to obtain the estimated change amount of the compression end temperature at a time when the intake vale opening timing IVO is changed from the reference cam intake valve opening timing IVOtdc to the initial cam intake valve opening timing IVOdfl (i.e., the third reference IVO temperature change amount tempIVOdt). That is, the third reference IVO temperature change amount tempIVOdt is calculated through processes [1] to [3] described below.

[1] By applying the initial cam intake valve opening timing IVOdfl and the present engine rotational speed NE to the IVO compression end temperature calculation map shown in FIG. 46, a calculation is performed to obtain the estimated compression end temperature at a time when the intake valve opening timing IVO is set to the initial cam intake valve opening timing IVOdfl (i.e., the initial cam IVO compression end temperature tempIVOdfl).

[2] A calculation is performed to obtain a difference between the initial cam IVO compression end temperature tempIVOdfl and the reference cam IVO compression end temperature tempIVOtdc (an initial-reference IVO temperature change amount ΔtempIVOdt). That is, the initial-reference IVO temperature change amount ΔtempIVOdt is calculated through a process described below.

ΔtempIVOdt←tempIVOdfl−tempIVOtdc

[3] On the basis of the initial-reference IVO temperature change amount ΔtempIVOdt and the intake air ratio KL, the third reference IVO temperature change amount tempIVOdt is calculated. That is, the third reference IVO temperature change amount tempIVOdt is calculated through a process described below.

tempIVOdt←ΔtempIVOdt×(KL/100)

In step S714, a calculation is performed to obtain the difference between the third reference IVO temperature change amount tempIVOdt and the first reference IVO temperature change amount tempIVObt (i.e., the initial cam IVO temperature change amount tempIVOdb). That is, the initial cam IVO temperature change amount tempIVOdb is calculated through a process described below.

tempIVOdb←tempIVOdt−tempIVObt

Hereinafter, the IVC compression end temperature change amount calculation routine [2] will be described with reference to FIG. 32. This routine is performed as step S720 in "the compression end temperature change amount calculation routine [2]".

In step S722, calculations are performed to obtain the estimated change amount of the compression end temperature at a time when the intake valve closing timing IVC is changed from the reference cam intake valve closing timing IVCtdc to the initial cam intake valve closing timing IVCdfl (i.e., the third reference IVC temperature change amount tempIVCdt). That is, the third reference IVC temperature change amount tempIVCdt is calculated through processes [1] to [3] described below.

[1] By applying the initial cam intake valve closing timing IVCdfl and the present engine rotational speed NE to the IVC compression end temperature calculation map shown in FIG. 48, a calculation is performed to obtain the estimated compression end temperature at a time when the intake valve closing timing IVC is set to the initial cam intake valve closing timing IVCdfl (i.e., the initial cam IVC compression end temperature tempIVCdfl).

[2] A calculation is performed to obtain a difference between the initial cam IVC compression end temperature tempIVCdfl and the reference cam IVC compression end temperature tempIVCtdc (an initial-reference IVC temperature change amount ΔtempIVCdt). That is, the initial-reference IVC temperature change amount ΔtempIVCdt is calculated through a process described below.

ΔtempIVCdt←tempIVCdfl−tempIVCtdc

[3] On the basis of the initial-reference IVC temperature change amount ΔtempIVCdt and the intake air ratio KL, the third reference IVC temperature change amount tempIVCdt is calculated. That is, the third reference IVC temperature change amount tempIVCdt is calculated through a process described below.

tempIVCdt←ΔtempIVCdtx(KL/100)

In step S724, a calculation is performed to obtain the difference between the third reference IVC temperature change amount tempIVCdt and the first reference IVC temperature change amount tempIVCbt (i.e., the initial cam IVC temperature change amount tempIVCdb). That is, the initial cam IVC temperature change amount tempIVCdb is calculated through a process described below.

tempIVCdb←tempIVCdt−tempIVCbt

Hereinafter, the present cam knock limit ignition timing setting routine will be described with reference to FIG. 33. This routine is performed as step S800 in "the base ignition timing setting routine".

Figures 51, 52:
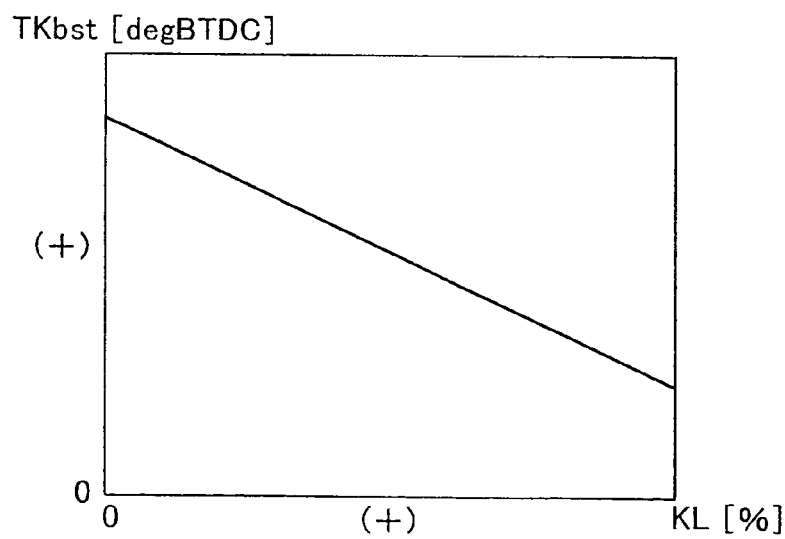
FIG. 51 is a diagram showing an example of an optimal cam knock limit ignition timing calculation map in which a relationship between the intake air ratio and the engine rotational speed, and an optimal cam knock limit ignition timing is set in the first embodiment.
FIG. 52 is a graph showing a relationship between the intake air ratio and the knock limit ignition timing at a uniform engine rotational speed, based on the optimal cam knock limit ignition timing calculation map in the first embodiment.

In step S810, a calculation is performed to obtain the optimal cam knock limit ignition timing TKbst corresponding to the present engine rotational speed NE and the intake air ratio KL, using an optimal cam knock limit ignition timing calculation map shown in FIG. 51. FIG. 52 shows a relationship between the intake air ratio KL and the optimal cam knock limit ignition timing TKbst at a uniform engine rotational speed NE. In this embodiment, the optimal cam knock limit ignition timings TKbst set in the optimal cam knock limit ignition timing calculation map are equivalent to the plural basic knock limit ignition timings.

In step S820, "the first knock limit correction amount calculation routine" shown in FIG. 34 is performed. In this routine, the first knock limit correction amount TKtempnb which is a correction term for the optimal cam knock limit ignition timing TKbst is calculated.

In step S830, "the second knock limit correction amount calculation routine" shown in FIG. 35 is performed. In this routine, the second knock limit correction amount TKOVLPnb which is a correction term for the optimal cam knock limit ignition timing TKbst is calculated.

In step S840, on the basis of the first knock limit correction amount TKtempnb and the second knock limit correction amount TKOVLPnb, the knock limit ignition timing correction amount TKnb is calculated. That is, the knock limit ignition timing correction amount TKnb is calculated through a process described below.

TKnb←TKtempnb+TKOVLPnb

In step S850, on the basis of the optimal cam knock limit ignition timing TKbst and the knock limit ignition timing correction amount TKnb, the present cam knock limit ignition timing TKnow is calculated. That is, the present cam knock limit ignition timing TKnow is calculated through a process described below.

TKnow←TKbst+TKnb

Hereinafter, the first knock limit correction amount calculation routine will be described with reference to FIG. 34. This routine is performed as step S820 in "the knock limit ignition timing setting routine".

Figure 50:
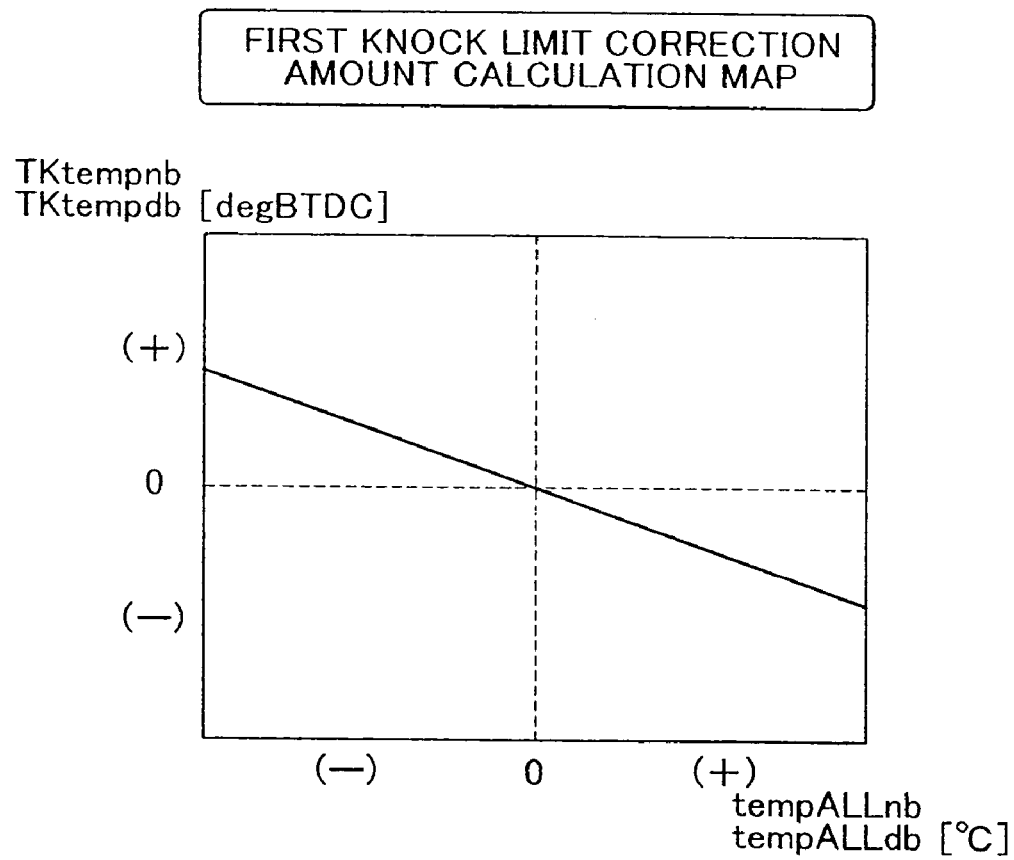
FIG. 50 is a diagram showing an example of a first knock limit correction amount calculation map in which a relationship between the compression end temperature change amount, and a first knock limit correction amount is set in the first embodiment.

In step S822, the first knock limit correction amount TKtempnb corresponding to the present cam total temperature change amount tempALLnb is calculated using a first knock limit correction amount calculation map shown in FIG. 50.

In the first knock limit correction amount calculation map, the knock limit correction amounts (the first knock limit correction amount TKtempnb and the initial cam knock limit correction amount TKtempdb) are set in accordance with the change amount of the compression end temperature (the present cam total temperature change amount tempALLnb and the initial cam total temperature change amount tempALLdb) as follows.

(A) In a region in which the change amount of the compression end temperature is a positive value, that is, in a region in which the present cam combustion chamber temperature Tnow is higher than the optimal cam combustion chamber temperature Tbst, the knock limit correction amount is set to a negative value. Also, as the change amount of the compression end temperature is increased, the knock limit correction amount is decreased, that is, an absolute value of the knock limit correction amount is increased.

(B) In a region in which the change amount of the compression end temperature is a negative value, that is, in a region in which the present cam combustion chamber temperature Tnow is lower than the optimal cam combustion chamber temperature Tbst, the knock limit correction amount is set to a positive value. Also, as the change amount of the compression end temperature is decreased, that is, an absolute value of the change amount of the compression end temperature is increased, the knock limit correction amount is increased.

(C) When the change amount of the compression end temperature is "0", that is, when the present cam combustion chamber temperature Tnow is equal to the optimal cam combustion chamber temperature Tbst, the knock limit correction amount is set to "0".

The optimal cam knock limit ignition timing TKbst (the knock limit ignition timing correction amount TKnb) is corrected according to the present cam total temperature change amount tempALLnb as follows (step S840 and step S850).

(A) When the present cam total temperature change amount tempALLnb is a positive value, since the first knock limit correction amount TKtempnb is a negative value, the optimal cam knock limit ignition timing TKbst (the knock limit ignition timing correction amount TKnb) is retarded by an amount corresponding to the absolute value of the first knock limit correction amount TKtempnb.

(B) When the present cam total temperature change amount tempALLnb is a negative value, since the first knock limit correction amount TKtempnb is a positive value, the optimal cam knock limit ignition timing TKbst (the knock limit ignition timing correction amount TKnb) is advanced by an amount corresponding to the absolute value of the first knock limit correction amount TKtempnb.

(C) When the present cam total temperature change amount tempALLnb is "0", since the first knock limit correction amount TKtempnb is "0", the optimal cam knock limit ignition timing TKbst (the knock limit ignition timing correction amount TKnb) is neither advanced nor retarded.

Hereinafter, the second knock limit correction amount calculation routine will be described with reference to FIG. 35. This routine is performed as step S830 in "the knock limit ignition timing setting routine".

Figures 53, 54:
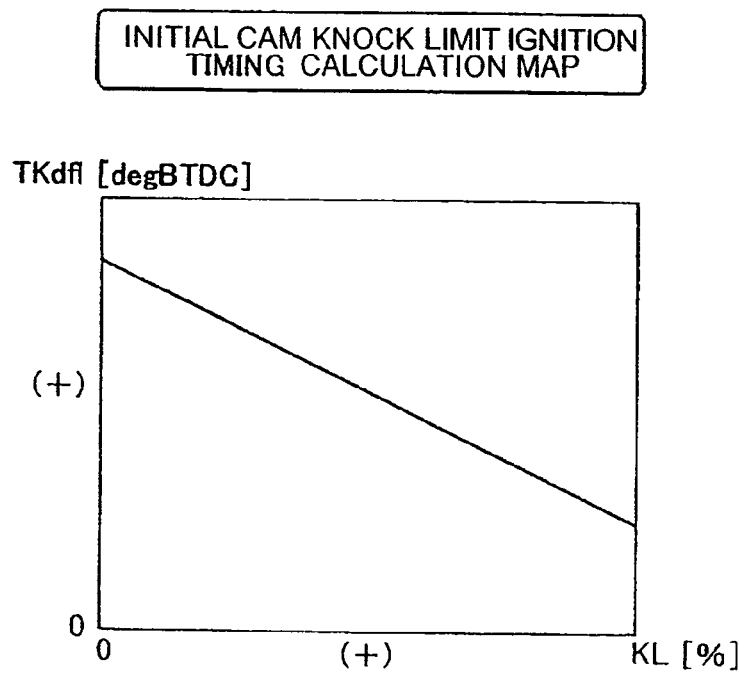
FIG. 53 is a diagram showing an example of an initial cam knock limit ignition timing calculation map in which a relationship between the intake air ratio and the engine rotational speed, and an initial cam knock limit ignition timing is set.
FIG. 54 is a graph showing a relationship between the intake air ratio and the knock limit ignition timing at a uniform engine rotational speed, based on the initial cam knock limit ignition timing calculation map in the first embodiment.

In step S832, the initial cam knock limit ignition timing TKdfl corresponding to the present engine rotational speed NE and the intake air ratio KL is calculated using an initial cam knock limit ignition timing calculation map shown in FIG. 53. FIG. 54 shows a relationship between the intake air ratio KL and the initial cam knock limit ignition timing TKdfl at a uniform engine rotational speed NE.

In step S834, the initial cam knock limit correction amount TKtempdb corresponding to the initial cam total temperature change amount tempALLdb is calculated using the first knock limit correction amount calculation map shown in FIG. 50.

In step S836, the knock limit ignition timing correction amount corresponding to the valve overlap amount in the optimal cam Cbst (i.e., the overlap knock limit correction amount TKOVLPbst) is derived from the optimal cam knock limit ignition timing TKbst. That is, the overlap knock limit correction amount TKOVLPbst is calculated through a process described below.

TKOVLPbst←TKbst+TKtempdb−TKdfl

Hereinafter, description will be made of a mode in which the overlap knock limit correction amount TKOVLPbst is derived. There are the following differences between the optimal cam knock limit ignition timing TKbst and the initial cam knock limit ignition timing TKdfl.

(A) The optimal cam knock limit ignition timing TKbst is set so as to include the ignition timing correction amount corresponding to the valve overlap amount (the residual gas ratio) in the optimal cam Cbst. Meanwhile, the initial cam knock limit ignition timing TKdfl is set so as to appropriate for the valve overlap amount in the initial cam Cdfl, that is, the initial cam knock limit ignition timing TKdfl is set so as to appropriate for the state in which the valve overlap amount is "0". Therefore, the optimal cam knock limit ignition timing TKbst is different from the initial cam knock limit ignition timing TKdfl by an amount corresponding to the valve overlap amount in the optimal cam Cbst.

(B) The optimal cam knock limit ignition timing TKbst is set so as to include the ignition timing correction amount corresponding to the temperature in the combustion chamber 23 at a time when the valve characteristic is the optimal cam Cbst. Meanwhile, the initial cam knock limit ignition timing TKdfl is set so as to include the ignition timing correction amount corresponding to the temperature in the combustion chamber 23 at a time when the valve characteristic is the initial cam Cdfl. Therefore, the optimal cam knock limit ignition timing TKbst is different from the initial cam knock limit ignition timing TKdfl by an amount corresponding to the difference between the temperature in the combustion chamber 23 at a time when the valve characteristic is the optimal cam Cbst and the temperature in the combustion chamber 23 at a time when the valve characteristic is the initial cam Cdfl.

When the optimal cam knock limit ignition timing TKbst is used as a reference, the optimal cam knock limit ignition timing TKbst does not include the ignition timing correction amount corresponding to the change in the temperature in the combustion chamber 23. Meanwhile, the initial cam knock limit ignition timing TKdfl includes the ignition timing correction amount corresponding to the amount of the change in the temperature from the temperature in the combustion chamber 23 at a time when the valve characteristic is the optimal cam Cbst to the temperature in the combustion chamber 23 at a time when the valve characteristic is the initial cam Cdfl (i.e., the initial cam knock limit correction amount TKtempdb).

Therefore, an ignition timing obtained by adding the overlap knock limit correction amount TKOVLPbst to the initial cam knock limit ignition timing TKdfl is equal to an ignition timing obtained by adding the initial cam knock limit correction amount TKtempdb to the optimal cam knock limit ignition timing TKbst.

Accordingly, by subtracting the initial cam MBT ignition timing MBTdfl from the ignition timing obtained by adding the initial cam knock limit correction amount TKtempdb to the optimal cam knock limit ignition timing TKbst, only the correction amount corresponding to the valve overlap amount can be derived from the optimal cam knock limit ignition timing TKbst.

In step S838, on the basis of the overlap knock limit correction amount TKOVLPbst and the ignition timing correction ratio MBTTKratio, the second knock limit correction amount TKOVLPnb is calculated. That is, the second knock limit correction amount TKOVLPnb is calculated through a process described below.

TKOVLPnb←TKOVLPdb×(MBTTKratio−1)

The optimal cam knock limit ignition timing TKbst (the knock limit ignition timing correction amount TKnb) is corrected according to the overlap ratio OVLPratio (step S840 and step S850) as follows.

(A) When the overlap ratio OVLPratio is larger than "1", since the second knock limit correction amount TKOVLPnb is a positive value, the optimal cam knock limit ignition timing TKbst is advanced by an amount corresponding to an absolute value of the second knock limit correction amount TKOVLPnb.

(B) When the overlap ratio OVLPratio is smaller than "1", since the second knock limit correction amount TKOVLPnb is a negative value, the optimal cam knock limit ignition timing TKbst is retarded by an amount corresponding to the absolute value of the second knock limit correction amount TKOVLPnb.

(C) When the overlap ratio OVLPratio is "0", since the second knock limit correction amount TKOVLPnb is a negative value, and an absolute value of the second knock limit correction amount TKOVLPnb is equal to an absolute value of the overlap knock limit correction amount TKOVLPbst, the optimal cam knock limit ignition timing TKbst is retarded by an amount corresponding to the absolute value of the overlap knock limit correction amount TKOVLPbst (i.e., the second knock limit correction amount TKOVLPnb).

(D) When the overlap ratio OVLPratio is "1", since the second knock limit correction amount TKOVLPnb is "0", the optimal cam knock limit ignition timing TKbst is neither advanced nor retarded.

As described above in detail, with the ignition timing control apparatus for an engine according to the first embodiment of the invention, it is possible to obtain effects described below.

(1) In this embodiment, the present cam MBT ignition timing MBTnow and the present cam knock limit ignition timing TKnow are calculated considering the change in the temperature in the combustion chamber 23 and the change in the pressure in the combustion chamber 23 at a time when the intake valve opening timing IVO is changed. Thus, it is possible to set the appropriate base ignition timing BseF, irrespective of the change in the intake valve opening timing IVO.

(2) In this embodiment, the present cam MBT ignition timing MBTnow and the present cam knock limit ignition timing TKnow are calculated considering the change in the temperature in the combustion chamber 23 and the change in the pressure in the combustion chamber 23 at a time when the intake valve closing timing IVC is changed. Thus, it is possible to set the appropriate base ignition timing BseF, irrespective of the change in the intake valve closing timing IVC.

(3) In this embodiment, the present cam MBT ignition timing MBTnow and the present cam knock limit ignition timing TKnow are calculated considering the change in the residual gas ratio in the combustion chamber 23 at a time when the valve overlap amount OVLP is changed. Thus, it is possible to set the appropriate base ignition timing BseF, irrespective of the change in the valve overlap amount OVLP.

(4) In this embodiment, as the values indicating the temperature and the pressure in the combustion chamber 23, the compression end temperature and the compression end pressure are employed. The MBT ignition timing and the knock limit ignition timing for the optimal cam Cbst are corrected based on the change amount of the compression end temperature and the compression end pressure at a time when the intake valve opening timing IVO and the intake valve closing timing IVC are changed. It has been confirmed that each of the compression end temperature and the compression end pressure is highly sensitive to the change in the intake valve opening timing IVO and the intake valve closing timing IVC, as compared to temperatures and pressures in the combustion chamber 23 at other crank angles. Accordingly, by employing the aforementioned configuration, it is possible to accurately obtain the change amount of the temperature and the pressure in the combustion chamber 23 with respect to the change in the intake valve opening timing IVO and the intake valve closing timing IVC. Therefore, it is possible to improve the accuracy of correcting the ignition timing.

(5) In this embodiment, the MBT ignition timing correction amount corresponding to the optimal cam overlap amount OVLPbst is derived from the optimal cam MBT ignition timing MBTbst. Using this correction amount, the MBT ignition timing correction amount corresponding to the present cam overlap amount OVLPnow is calculated. Thus, it is possible to appropriately correct the MBT ignition timing according to the change in the valve overlap amount OVLP, without setting in advance an MBT ignition timing correction amount corresponding to each valve overlap amount OVLP.

(6) In this embodiment, the knock limit ignition timing correction amount corresponding to the optimal cam overlap amount OVLPbst is derived from the optimal cam knock limit ignition timing TKbst. Using this correction amount, the knock limit ignition timing correction amount corresponding to the present cam overlap amount OVLPnow is calculated. Thus, it is possible to appropriately correct the knock limit ignition timing according to the change in the valve overlap amount OVLP, without setting in advance a knock limit ignition timing correction amount corresponding to each valve overlap amount OVLP.

(7) In this embodiment, when deriving the correction amount corresponding to the optimal cam overlap amount OVLPbst, the initial cam MBT ignition timing MBTdfl and the initial cam knock limit ignition timing TKdfl which are set in advance so as to appropriate for the initial cam Cdfl are used. When calculating the correction amount corresponding to the valve overlap amount OVLP, the ignition timing for the valve characteristic in which a valve overlap is set in advance and the ignition timing for the valve characteristic in which a valve overlap is not set in advance are necessary. In the aforementioned configuration, the ignition timing for the initial cam Cdfl, which is set in advance for a time when the engine 1 is cold, is used. Therefore, it is not necessary to separately set the MBT ignition timing and the knock limit ignition timing for the valve characteristic in which the valve overlap is not set.

(8) In this embodiment, the optimal cam MBT ignition timing MBTbst and the optimal cam knock limit ignition timing TKbst are corrected based on a difference between the state in the combustion chamber 23 (the temperature, the pressure, and the residual gas ratio in the combustion chamber 23) at a time when the valve characteristic is the optimal cam Cbst and that at a time when the valve characteristic is the present cam Cnow. Thus, the MBT ignition timing and the knock limit ignition timing which are appropriate for the present cam Cnow are calculated. Accordingly, when the MBT ignition timings and the knock limit ignition timings for the optimal cam Cbst and the initial cam Cdfl are set in advance, it is possible to calculate the MBT ignition timings and the knock limit ignition timings which are appropriate for other valve characteristics. Therefore, "the base ignition timing setting routine" can be configured efficiently.

(9) Also, even in the case where the MBT ignition timing and the knock limit ignition timing which are appropriate for the present cam Cnow cannot be selected from the ignition timings set in the map, the appropriate MBT ignition timing and the appropriate knock limit ignition timing can be set by correcting the optimal cam MBT ignition timing MBTbst and the optimal cam knock limit ignition timing TKbst. Thus, even in the case where the present cam Cnow is deviated from the optimal cam Cbst due to the difference between the response of the intake valve timing variable mechanism 51 and the response of the maximum intake valve lift amount variable mechanism 53, it is possible to set the base ignition timing appropriate for the present cam Cnow.

(10) In this embodiment, the relationship between the intake valve opening timing IVO, and the compression end temperature and the compression end pressure at each engine rotational speed NE is obtained. Then, on the basis of this relationship, the change amounts of the compression end temperature and the compression end pressure are estimated. Since the temperature and the pressure in the combustion chamber 23 are changed by influence of the pulsation of the intake air, it is possible to appropriately estimate the compression end temperature and the compression end pressure by using the intake valve opening timing IVO and the engine rotational speed NE as the parameters.

(11) In this embodiment, the compression end temperature and the compression end pressure are corrected according to the intake air ratio KL. Since the amplitude of the pulsation of the intake air is changed according to the intake air ratio KL (intake air amount), the compression end temperature and the compression end pressure are also changed due to the change in the amplitude of the pulsation of the intake air. Accordingly, by employing the aforementioned configuration, it is possible to improve the accuracy of estimating the compression end temperature and the compression end pressure.

(12) In this embodiment, when the intake valve opening timing IVO and the exhaust valve closing timing EVC are ATDC, the crank angle from TDC to the exhaust valve closing timing EVC is calculated as the valve overlap amount. In the case where the exhaust valve closing timing EVC is ATDC, the residual gas ratio tends to be increased due to an increase in the vacuum pressure in the combustion chamber 23 which is caused by downward movement of the piston 22, even if the intake valve 35 is not opened. Accordingly, it is possible to accurately obtain the change in the residual gas ratio by calculating the valve overlap amount OVLP in the aforementioned mode.

(13) In this embodiment, when the optimal cam overlap amount OVLPbst is smaller than the reference overlap amount OVLPX, the overlap ratio OVLPratio is set to "0". Thus, it is possible to suppress a decrease in the accuracy of correcting the ignition timing according to the valve overlap amount. Therefore, it is possible to set the appropriate MBT ignition timing and the appropriate knock limit ignition timing.

The aforementioned first embodiment may be appropriately modified. For example, the invention may be realized in modified examples described below.

"The IVO compression end pressure calculation map", "the IVC compression end pressure calculation map", "the IVO compression end temperature calculation map", and "the IVC compression end temperature calculation map" may be provided for each effective length of the intake pipe 33. When the effective length of the intake pipe 33 is changed, a cycle of the pulsation of the intake air is changed. Therefore, the temperature and the pressure in the combustion chamber 23 are also influenced by the change in the effective length of the intake pipe 33. Accordingly, by employing the aforementioned configuration, it is possible to improve the accuracy of estimating the compression end temperature and the compression end pressure.

In "the IVO compression end pressure change amount calculation routine [1]", "the IVO compression end pressure change amount calculation routine [2]", "the IVO compression end temperature change amount calculation routine [1]", and "the IVO compression end temperature change amount calculation routine [2]", the change amounts of the compression end pressure and the compression end temperature may be calculated using an intake valve opening timing IVO other than the reference cam intake valve opening timing IVOtdc, as a reference.

In "the IVC compression end pressure change amount calculation routine [1]", "the IVC compression end pressure change amount calculation routine [2]", "the IVC compression end temperature change amount calculation routine [1]", and "the IVC compression end temperature change amount calculation routine [2]", the change amounts of the compression end pressure and the compression end temperature may be calculated using an intake valve closing timing IVC other than the reference cam intake valve closing timing IVCtdc, as a reference.

A second embodiment of the invention will be described with reference to FIG. 55 to FIG. 58. In the aforementioned first embodiment, the change amounts of the compression end pressure (the first reference IVC pressure change amount bt, the second reference IVC pressure change amount nt, and the third reference IVC pressure change amount dt) are calculated using the reference cam intake valve closing timing IVCtdc as a reference.

Meanwhile, in the second embodiment of the invention, the change amount of the compression end pressure is calculated using the highest filling efficiency closing timing IVCmax as a reference.

The highest filling efficiency closing timing IVCmax corresponds to an inflexion point of the curve showing the tendency of the change in the compression end temperature (refer to FIG. 7). Therefore, since the highest filling efficiency closing timing IVCmax is used as the reference, calculations are performed to obtain the change amount of the compression end pressure in each of a region in which the change amount of the compression end pressure is increased and a region in which the change amount of the compression end pressure is decreased. Thus, the accuracy of estimating the change amount of the compression end pressure is improved. Therefore, it is possible to improve the accuracy of correcting the MBT ignition timing and the knock limit ignition timing.

Hereinafter, description will be made of a compression end pressure change amount calculation routine, and a compression end temperature change amount calculation routine. The configuration in the second embodiment is the same as that in the first embodiment except portions which will be described below.

In the compression end pressure change amount calculation routine [1] shown in FIG. 17, in step S220, "an IVC compression end pressure change amount calculation routine [3]" which will be described below is performed, instead of "the IVC compression end pressure change amount calculation routine [1]".

Figure 55:
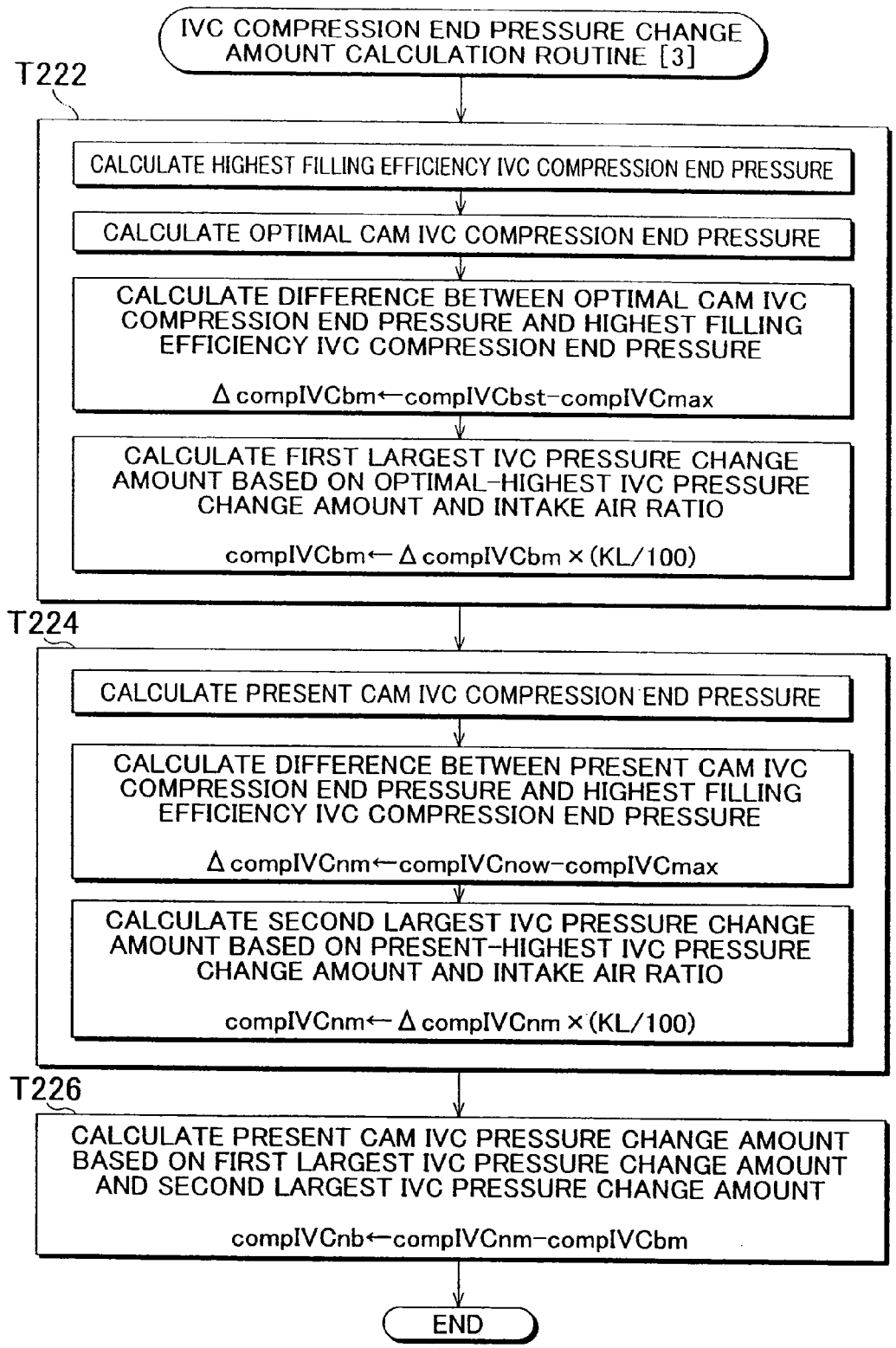
FIG. 55 is flowchart showing steps of "an IVC compression end pressure change amount calculation routine [3]" which is performed in order to calculate a present cam IVC pressure change amount in an ignition timing control apparatus for an engine according to a second embodiment of the invention.

Hereinafter, the IVC compression end pressure change amount calculation routine [3] will be described with reference to FIG. 55. This routine is performed as step S220 in "the compression end pressure change amount calculation routine [1]".

In step T222, calculations are performed to obtain an estimated change amount of the compression end pressure at a time when the intake valve closing timing IVC is changed from the highest filling efficiency closing timing IVCmax to the optimal cam intake valve closing timing IVCbst (i.e., a first largest IVC pressure change amount compIVCbm).

That is, the first largest IVC pressure change amount compIVCbm is calculated through processes [1] to [4] described below.

[1] By applying the highest filling efficiency closing timing IVCmax and the present engine rotational speed NE to the IVC compression end pressure calculation map shown in FIG. 39, a calculation is performed to obtain an estimated compression end pressure at a time when the intake valve closing timing IVC is set to the highest filling efficiency closing timing IVCmax (i.e., a highest filling efficiency IVC compression end pressure compIVCmax).

[2] By applying the optimal cam intake valve closing timing IVCbst and the present engine rotational speed NE to the IVC compression end pressure calculation map, a calculation is performed to obtain the estimated compression end pressure at a time when the intake valve closing timing IVC is set to the optimal cam intake valve closing timing IVCbst (i.e., the optimal cam IVC compression end pressure compIVCbst).

[3] A calculation is performed to obtain a difference between the optimal cam IVC compression end pressure compIVCbst and the highest filling efficiency IVC compression end pressure compIVCmax (i.e., an optimal-highest IVC pressure change amount ΔcompIVCbm). That is, the optimal-highest IVC pressure change amount ΔcompIVCbm is calculated through a process described below.

$$\Delta compIVCbm \leftarrow compIVCbst - compIVCmax$$

[4] On the basis of the optimal-highest IVC pressure change amount ΔcompIVCbm and the intake air ratio KL, the first largest IVC pressure change amount compIVCbm is calculated. That is, the first largest IVC pressure change amount compIVCbm is calculated through a process describe below.

$$compIVCbm \leftarrow \Delta compIVCbm \times (KL/100)$$

The first largest IVC compression change amount compIVCbm is equivalent to the third valve closing state change amount.

In step T224, calculations are performed to obtain an estimated change amount of the compression end pressure at a time when the intake valve closing timing IVC is changed from the highest filling efficiency closing timing IVCmax to the present cam intake valve closing timing IVCnow (i.e., a second largest IVC pressure change amount compIVCnm). That is, the second largest IVC pressure change amount compIVCnm is calculated through processes [1] to [3] described below.

[1] By applying the present cam intake valve closing timing IVCnow and the present engine rotational speed NE to the IVC compression end pressure calculation map shown in FIG. 39, a calculation is performed to obtain the estimated compression end pressure at a time when the intake valve closing timing IVC is set to the present cam intake valve closing timing IVCnow (i.e., the present cam IVC compression end pressure compIVCnow).

[2] A calculation is performed to obtain a difference between the present cam IVC compression end pressure compIVCnow and the highest filling efficiency IVC compression end pressure compIVCmax (i.e., a present-highest IVC pressure change amount ΔcompIVCnm). That is, the present-highest IVC pressure change amount ΔcompIVCnm is calculated through a process described below.

$$\Delta compIVCnm \leftarrow compIVCnow - compIVCmax$$

[3] On the basis of the present-highest IVC pressure change amount ΔcompIVCnm and the intake air ratio KL, the second largest IVC pressure change amount compIVCnm is calculated. That is, the second largest IVC pressure change amount compIVCnm is calculated through a process described below.

$$compIVCnm \leftarrow \Delta compIVCnm \times (KL/100)$$

The second largest IVC pressure change amount compIVCnm is equivalent to the fourth valve closing state change amount.

In step T226, a calculation is performed to obtain the difference between the second largest IVC pressure change amount compIVCnm and the first largest IVC pressure change amount compIVCbm (i.e., the present cam IVC pressure change amount compIVCnb). That is, the present cam IVC pressure change amount compIVCnb is calculated through a process described below.

$$compIVCnb \leftarrow compIVCnm - compIVCbm$$

In this embodiment, in the compression end pressure change amount calculation routine [2] shown in FIG. 20, in step S320, "an IVC compression end pressure change amount calculation routine [4]" is performed, instead of "the IVC compression end pressure change amount calculation routine [2]".

Figure 56:
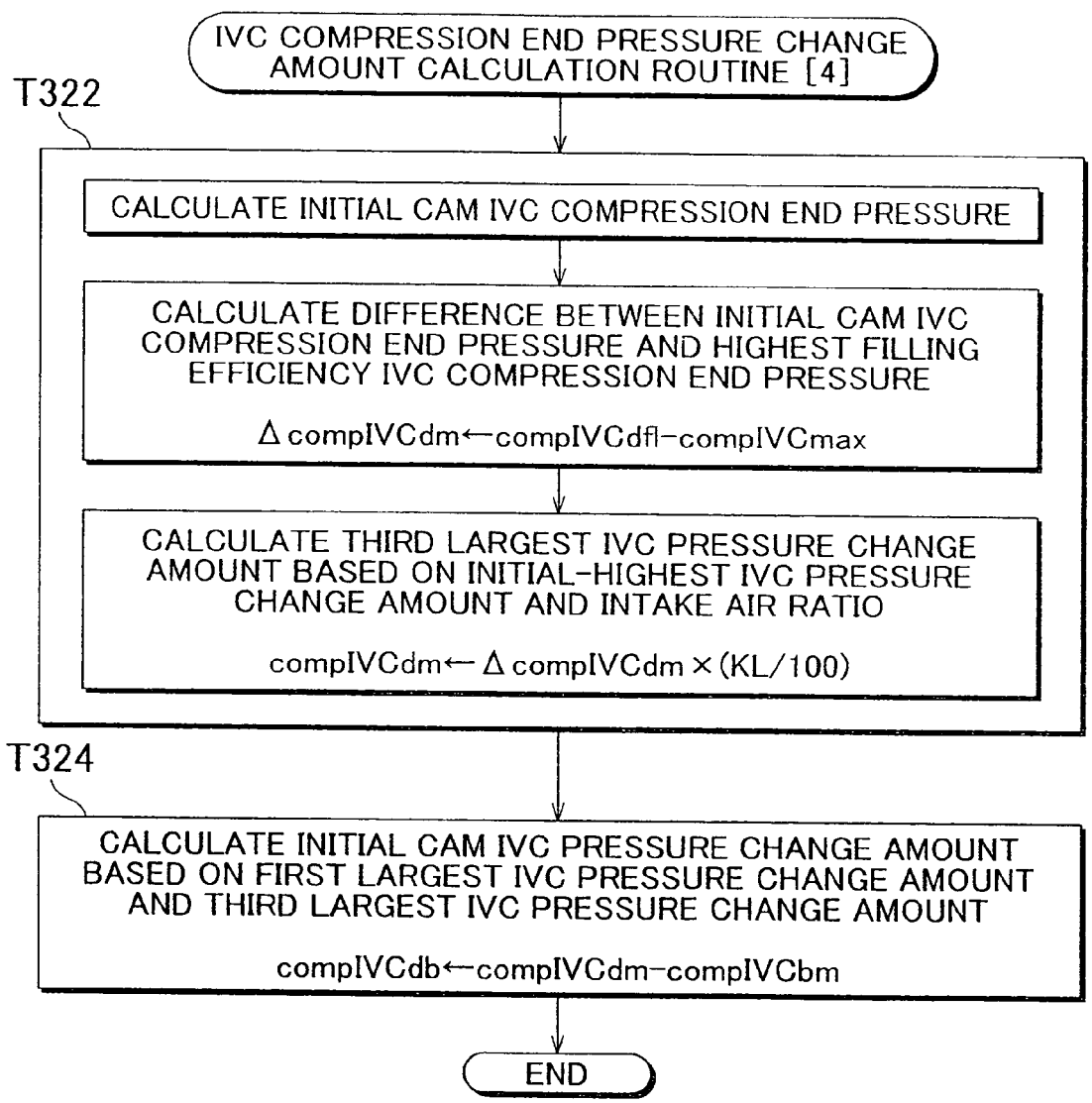
FIG. 56 is a flowchart showing steps of "an IVC compression end pressure change amount calculation routine [4]" which is performed in order to calculate an initial cam IVC pressure change amount in the second embodiment.

Hereinafter, the IVC compression end pressure change amount calculation routine [4] will be described with reference to FIG. 56. This routine is performed as step S320 in "the compression end pressure change amount calculation routine [2]".

In step T322, a calculation is performed to obtain an estimated change amount of the compression end pressure at a time when the intake valve closing timing IVC is changed from the highest filling efficiency closing timing IVCmax to the initial cam intake valve closing timing IVCdfl (i.e., a third largest IVC pressure change amount compIVCdm). That is, the third largest IVC pressure change amount compIVCdm is calculated through processes [1] to [3] described below.

[1] By applying the initial cam intake valve closing timing IVCdfl and the present engine rotational speed NE to the IVC compression end pressure calculation map, a calculation is performed to obtain the estimated compression end pressure at a time when the intake valve closing timing IVC is set to the initial cam intake valve closing timing IVCdfl (i.e., the initial cam IVC compression end pressure compIVCdfl).

[2] A calculation is performed to obtain a difference between the initial cam IVC compression end pressure compIVCdfl and the highest filling efficiency IVC compression end pressure compIVCmax (i.e., an initial-highest IVC pressure change amount ΔcompIVCdm). That is, the initial-highest IVC pressure change amount ΔcompIVCdm is calculated through a process described below.

$$\Delta compIVCdm \leftarrow compIVCdfl - compIVCmax$$

[3] On the basis of the initial-highest IVC pressure change amount ΔcompIVCdm and the intake air ratio KL, the third largest IVC pressure change amount compIVCdm is calculated. That is, the third largest IVC pressure change amount compIVCdm is calculated through a process described below.

$$compIVCdm \leftarrow \Delta compIVCdm \times (KL/100)$$

In step T324, a calculation is performed to obtain the difference between the third largest IVC pressure change amount compIVCdm and the first largest IVC pressure change amount compIVCbm (i.e., the initial cam IVC pressure change amount compIVCdb). That is, the initial cam IVC pressure change amount compIVCdb is calculated through a process described below.

compIVCdb←compIVCdm−compIVCbm

In the compression end temperature change amount calculation routine [1] shown in FIG. 27, in step S620, "an IVC compression end temperature change amount calculation routine [3]" which will be described below is performed, instead of "the IVC compression end temperature change amount calculation routine [1]".

Figure 57:
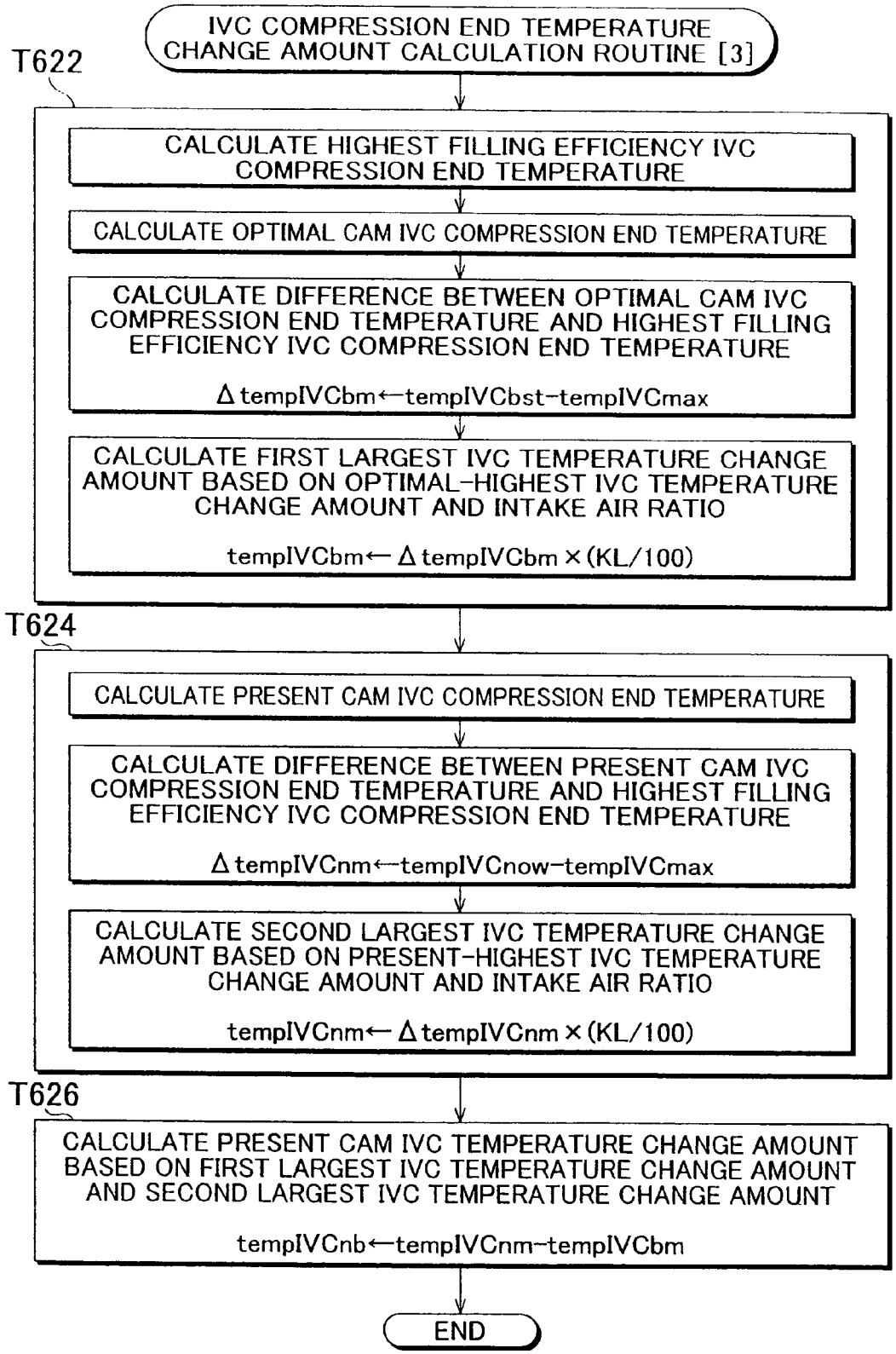
FIG. 57 is a flowchart showing steps of "an IVC compression end temperature change amount calculation routine [3]" which is performed in order to calculate a present cam IVC temperature change amount in the second embodiment.

Hereinafter, the IVC compression end temperature change amount calculation routine [3] will be described with reference to FIG. 57. This routine is performed as step S620 in "the compression end temperature change amount calculation routine [1]".

In step T622, calculations are performed to obtain an estimated change amount of the compression end temperature at a time when the intake valve closing timing IVC is changed from the highest filling efficiency closing timing IVCmax to the optimal cam intake valve closing timing IVCbst (i.e., a first largest IVC temperature change amount tempIVCbm). That is, the first largest IVC temperature change amount tempIVCbm is calculated through processes [1] to [4] described below.

[1] By applying the highest filling efficiency closing timing IVCmax and the present engine rotational speed NE to the IVC compression end temperature calculation map shown in FIG. 49, a calculation is performed to obtain an estimated compression end temperature at a time when the intake valve closing timing IVC is set to the highest filling efficiency closing timing IVCmax (i.e., a highest filling efficiency IVC compression end temperature tempIVCmax).

[2] By applying the optimal cam intake valve closing timing IVCbst and the present engine rotational speed NE to the IVC compression end temperature calculation map, a calculation is performed to obtain the estimated compression end temperature at a time when the intake valve closing timing IVC is set to the optimal cam intake valve closing timing IVCbst (i.e., the optimal cam IVC compression end temperature tempIVCbst).

[3] A calculation is performed to obtain a difference between the optimal cam IVC compression end temperature tempIVCbst and the highest filling efficiency IVC compression end temperature tempIVCmax (i.e., an optimal-highest IVC temperature change amount ΔtempIVCbm). That is, the optimal-highest IVC temperature change amount ΔtempIVCbm is calculated through a process described below.

ΔtempIVCbm←tempIVCbst−tempIVCmax

[4] On the basis of the optimal-highest IVC temperature change amount ΔtempIVCbm and the intake air ratio KL, the first largest IVC temperature change amount tempIVCbm is calculated. That is, the first largest IVC temperature change amount tempIVCbm is calculated through a process described below.

tempIVCbm←ΔtempIVCbm×(KL/100)

In step T624, calculations are performed to obtain an estimated change amount of the compression end temperature at a time when the intake valve closing timing IVC is changed from the highest filling efficiency closing timing IVCmax to the present cam intake valve closing timing IVCnow (i.e., a second largest IVC temperature change amount tempIVCnm). That is, the second largest IVC temperature change amount tempIVCnm is calculated through processes [1] to [3] described below.

[1] By applying the present cam intake valve closing timing IVCnow and the present engine rotational speed NE to the IVC compression end temperature calculation map shown in FIG. 49, a calculation is performed to obtain the estimated compression end temperature at a time when the intake valve closing timing IVC is set to the present cam intake valve closing timing IVCnow (i.e., the present cam IVC compression end temperature tempIVCnow).

[2] A calculation is performed to obtain a difference between the present cam IVC compression end temperature tempIVCnow and the highest filling efficiency IVC compression end temperature tempIVCmax (a present-highest IVC temperature change amount ΔtempIVCnm). That is, the present-highest IVC temperature change amount ΔtempIVCnm is calculated through a process described below.

ΔtempIVCnm←tempIVCnow−tempIVCmax

[3] On the basis of the present-highest IVC temperature change amount ΔtempIVCnm and the intake air ratio KL, the second largest IVC temperature change amount tempIVCnm is calculated. That is, the second largest IVC temperature change amount tempIVCnm is calculated through a process described below.

tempIVCnm←ΔtempIVCnm×(KL/100)

In step T626, a calculation is performed to obtain the difference between the second largest IVC temperature change amount tempIVCnm and the first largest IVC temperature change amount tempIVCbm (i.e., the present cam IVC temperature change amount tempIVCnb). That is, the present cam IVC temperature change amount tempIVCnb is calculated through a process described below.

tempIVCnb←tempIVCnm−tempIVCbm

In the compression end temperature change amount calculation routine [2] shown in FIG. 30, in step S720, "an IVC compression end temperature change amount calculation routine [4]" that will be described later is performed, instead of "the IVC compression end temperature change amount calculation routine [2]".

Figure 58:
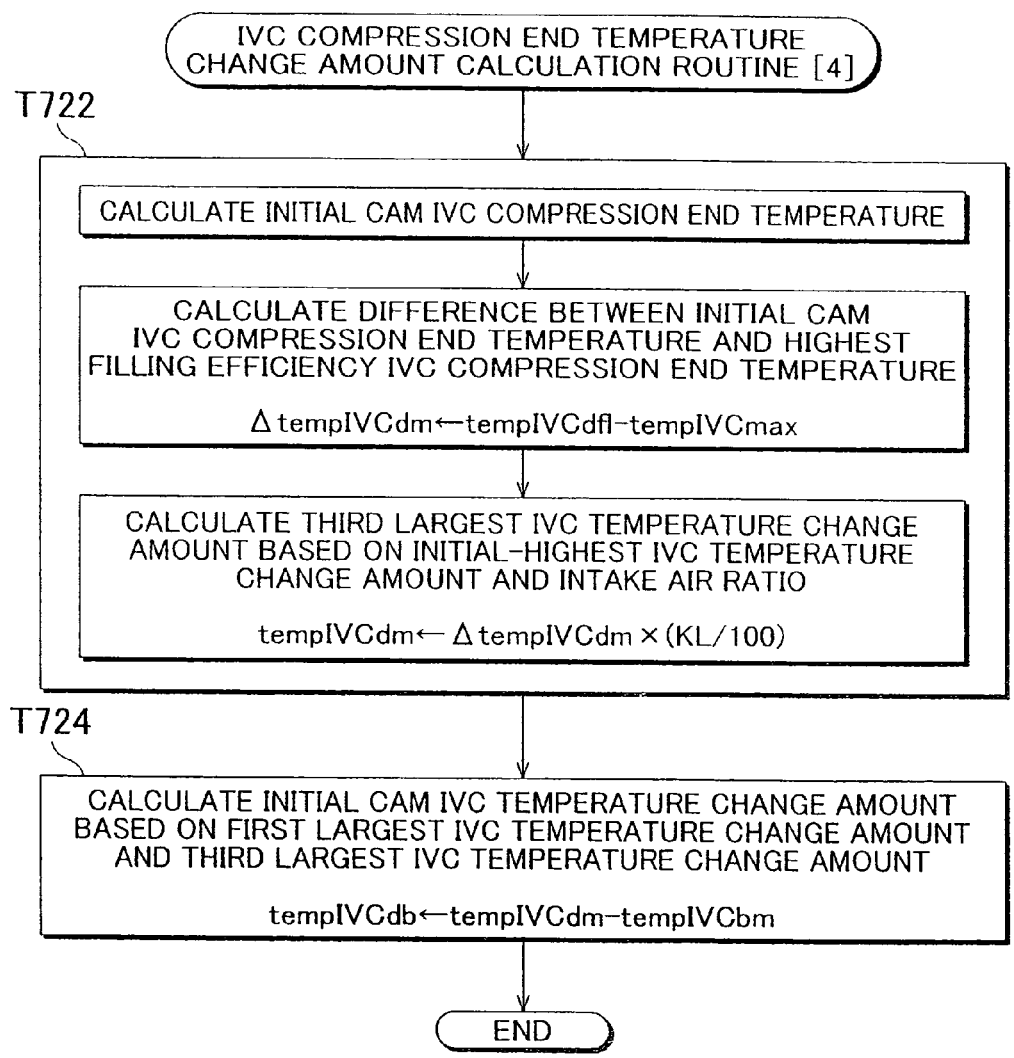
FIG. 58 is a flowchart showing steps of "an IVC compression end temperature change amount calculation routine [4]" which is performed in order to calculate an initial cam IVC temperature change amount in the second embodiment.

Hereinafter, "the IVC compression end temperature change amount calculation routine [4]" will be described with reference to FIG. 58. This routine is performed as step S720 in "the compression end temperature change amount calculation routine [2]".

In step T722, calculations are performed to obtain an estimated change amount of the compression end temperature at a time when the intake valve closing timing IVC is changed from the highest filling efficiency closing timing IVCmax to the initial cam intake valve closing timing IVCdfl (i.e., a third largest IVC temperature change amount tempIVCdm). That is, the third largest IVC temperature change amount tempIVCdm is calculated through processes [1] to [3] described below.

[1] By applying the initial cam intake valve closing timing IVCdfl and the present engine rotational speed NE to the IVC compression end temperature calculation map shown in FIG. 49, a calculation is performed to obtain the estimated compression end temperature at a time when the intake valve closing timing IVC is set to the initial cam intake valve closing timing IVCdfl (i.e., the initial cam IVC compression end temperature tempIVCdfl).

[2] A calculation is performed to obtain a difference between the initial cam IVC compression end temperature tempIVCdfl and the highest filling efficiency IVC compression end temperature tempIVCmax (i.e., an initial-highest IVC temperature change amount ΔtempIVCdm). That is, the initial-highest IVC temperature change amount ΔtempIVCdm is calculated through a process described below.

ΔtempIVCdm←tempIVCdfl−tempIVCmax

[3] On the basis of the initial-highest IVC temperature change amount ΔtempIVCdm and the intake air ratio KL, the third largest IVC temperature change amount tempIVCdm is calculated. That is, the third largest IVC temperature change amount tempIVCdm is calculated through a process described below.

tempIVCdm←ΔtempIVCdm×(KL/100)

In step T724, a calculation is performed to obtain the difference between the third largest IVC temperature change amount tempIVCdm and the first largest IVC temperature change amount tempIVCbm (i.e., the initial cam IVC temperature change amount tempIVCdb). That is, the initial cam IVC temperature change amount tempIVCdb is calculated through a process described below.

tempIVCdb←tempIVCdm−tempIVCbm

As described above in detail, with the ignition timing control apparatus according to the second embodiment of the invention, it is possible to obtain the following effects, in addition to the aforementioned effects (1) to (13) that can be obtained in the first embodiment of the invention.

(14) According to the second embodiment, the change amounts of the compression end temperature and the compression end pressure are calculated using the highest filling efficiency closing timing IVCmax as the reference. Thus, it is possible to improve the accuracy of estimating the compression end temperature and the compression end pressure. Therefore, it is possible to improve the accuracy of correcting the MBT ignition timing and the knock limit ignition timing.

A third embodiment of the invention will be described with reference to FIG. 59. In the aforementioned first embodiment, the electronic control unit 9 stores in advance the first knock limit correction amount calculation map shown in FIG. 50, in which the first knock limit correction amount TKtempnb and the initial cam knock limit correction amount TKtempdb are set with respect to the present cam total temperature change amount tempALLnb and the initial cam total temperature change amount tempALLdb.

Figure 59:
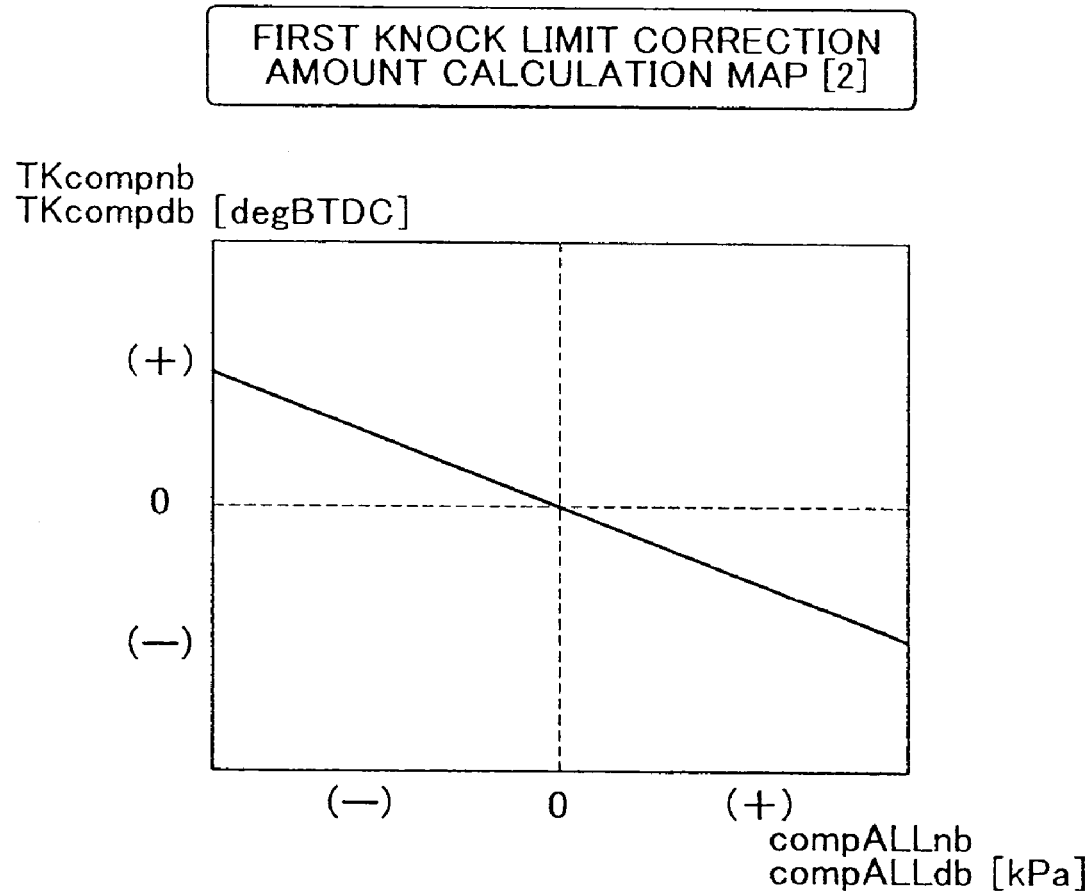
FIG. 59 is a diagram showing an example of a first knock limit correction amount calculation map [2] in which a relationship between a compression end pressure change amount and a first knock limit correction amount is set, and which is used by an ignition timing control apparatus for an engine according to a third embodiment of the invention.

Meanwhile, in the third embodiment, the electronic control unit 9 stores in advance a first knock limit correction amount calculation map [2] shown in FIG. 59, in which a first knock limit correction amount TKcompnb and an initial cam knock limit correction amount TKcompdb are set with respect to the present cam total pressure change amount compALLnb and the initial cam total pressure change amount compALLdb.

When employing this configuration, "the compression end temperature change amount [1]" shown in FIG. 27, "the compression end temperature change amount calculation routine [2]" shown in FIG. 30, the IVO compression end temperature calculation map shown in FIG. 46, and the IVC compression end temperature calculation map shown in FIG. 48 can be omitted.

As described above in detail, with the ignition timing control apparatus for an engine according to the third embodiment of the invention, it is possible to obtain the following effect, in addition to the aforementioned effects (1) to (13) which can be obtained in the first embodiment.

(15) According to the third embodiment of the invention, the structure of "the base ignition timing setting routine" can be simplified.

The aforementioned third embodiment may be appropriately modified. For example, the invention may be realized in a modified example described below.

The aforementioned third embodiment can be applied to the second embodiment.

A fourth embodiment of the invention will be described with reference to FIG. 60.

In the aforementioned first embodiment, the electronic control unit 9 stores in advance the first MBT correction amount calculation map shown in FIG. 40, in which the first MBT correction amount MBTcompnb and the initial cam MBT correction amount MBTcompdb are set with respect to the present cam total pressure change amount compALLnb and the initial cam total pressure change amount compALLdb.

Figure 60:
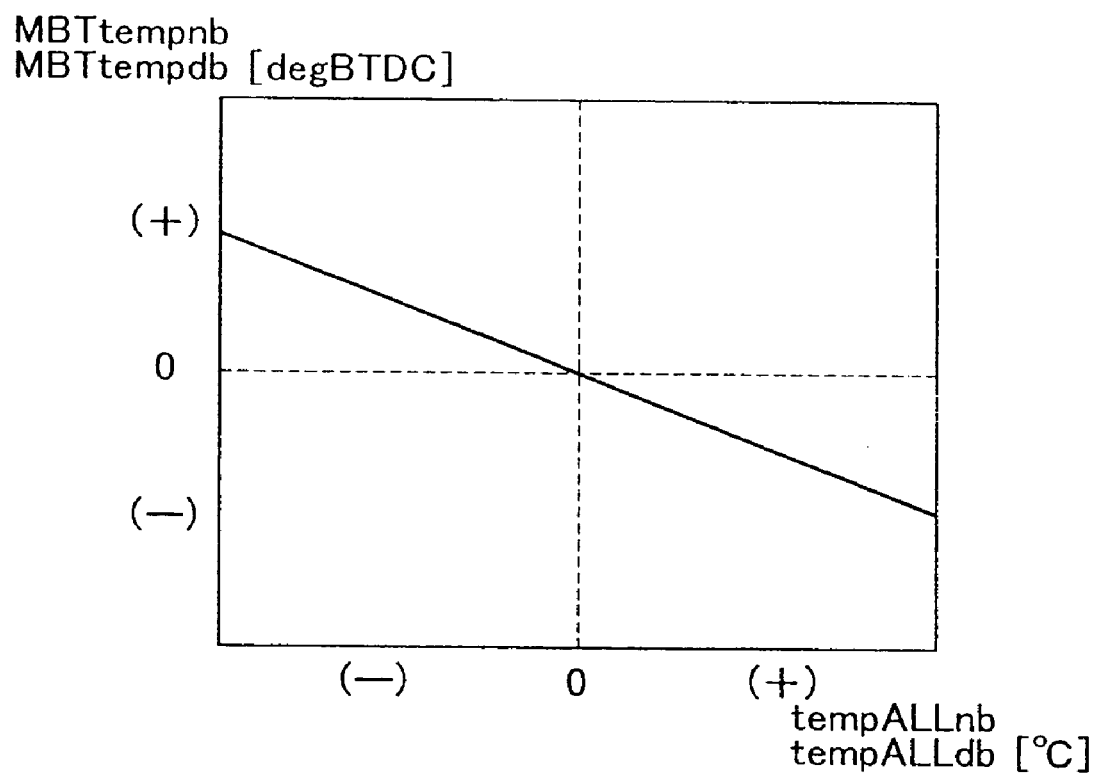
FIG. 60 is a diagram showing an example of a first MBT correction amount calculation map (2) in which a relationship between a compression end temperature change amount and a first MBT correction amount is set, and which is used by an ignition timing control apparatus for an engine according to a fourth embodiment of the invention.

Meanwhile, in the fourth embodiment, the electronic control unit 9 stores in advance "a first MBT correction amount calculation map [2]" shown in FIG. 60, in which the first MBT correction amount MBTtempnb and the initial cam MBT correction amount MBTtempdb are set with respect to the present cam total temperature change amount tempALLnb and the initial cam total temperature change amount tempALLdb.

When employing this configuration, "the compression end pressure change amount calculation routine [1]" shown in FIG. 17, "the compression end pressure change amount calculation routine [2]" shown in FIG. 20, the IVO compression end pressure calculation map shown in FIG. 36, and the IVC compression end pressure calculation map shown in FIG. 38 can be omitted.

As described above in detail, with the ignition timing control apparatus for an engine according to the fourth embodiment of the invention, it is possible to obtain the following effect, in addition to the aforementioned effects (1) to (13) that can be obtained in the first embodiment.

(16) According to the fourth embodiment of the invention, the structure of "the base ignition timing setting routine" can be simplified.

The aforementioned fourth embodiment may be appropriately modified. For example, the invention may be realized in a modified example described below.

The aforementioned fourth embodiment can be applied to the second embodiment and the third embodiment.

In addition, description will be made of elements which can be changed in each of the aforementioned embodiments.

The configuration of each calculation map used in "the base ignition timing setting routine" is not limited to the configuration in each of the aforementioned embodiments, and can be appropriately changed.

The mode in which the target cam Ctrg is set is not limited to the mode in each of the aforementioned embodiments, and can be appropriately changed.

A base ignition timing appropriate for each optimal cam Cbst may be set in a map, this map may be stored in the electronic control unit 9 in advance, and the base ignition timing may be calculated using this map. In this case as well, the base ignition timing appropriate for the present cam Cnow can be calculated by correcting the base ignition timing for the optimal cam Cbst in the mode in each of the aforementioned embodiments. In the aforementioned configuration, the base ignition timings set in the map are equivalent to the plural basic base ignition timings according to the invention. Also, the base ignition timing appropriate for the optimal cam Cbst is equivalent to the first base ignition timing, and the base ignition timing appropriate for the initial cam Cdfl is equivalent to the second base ignition timing according to the invention.

In each of the aforementioned embodiments, an amount of change in the temperature in the combustion chamber 23 due to residual gas may be estimated based on the residual gas ratio and a temperature of the exhaust port 32, and the knock limit ignition timing may be corrected considering the change amount of the temperature in the combustion chamber 23. Thus, it is possible to improve the accuracy of correcting the knock limit ignition timing.

The configuration of the engine 1 may be appropriately changed as long as the engine 1 includes the variable valve mechanism 5.

The configuration of the variable valve mechanism 5 may be changed such that the variable valve mechanism 5 includes at least one of the intake valve timing variable mechanism, the exhaust valve timing variable mechanism, the maximum intake valve lift amount variable mechanism, and a maximum exhaust valve lift amount variable mechanism. The maximum exhaust valve lift amount variable mechanism changes the maximum valve lift amount of the exhaust valve and the working angle of the exhaust valve.

Each of the aforementioned embodiments of the invention can be applied to any engine, as long as the engine includes a variable valve mechanism which changes at least one of an intake valve opening timing and an intake valve closing timing.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An ignition timing control apparatus for an engine, comprising:
   a controller which sets an ignition timing considering a change in a temperature or a pressure in a combustion chamber at a time when an opening/closing characteristic of an intake valve is changed, the opening/closing characteristic including a valve opening timing and a valve closing timing at least one of which is changed by a variable valve mechanism for the engine.

2. The ignition timing control apparatus for an engine according to claim 1, wherein the controller estimates the change in the temperature or the pressure in the combustion chamber based on at least one of the valve opening timing and the valve closing timing of the intake valve.

3. An ignition timing control apparatus for an engine, comprising:
   a controller which calculates an MBT ignition timing at which output torque and a fuel consumption rate become optimal, and a knock limit ignition timing which is most advanced in an ignition timing range where occurrence of knocking can be suppressed; which sets a base ignition timing to one of the MBT ignition timing and the knock limit ignition timing, which is more retarded than the other, the base ignition timing being used for combustion of air-fuel mixture; and which calculates the MBT ignition timing and the knock limit ignition timing considering a change in a temperature or a pressure in a combustion chamber at a time when an opening/closing characteristic of an intake valve is changed, the opening/closing characteristic including a valve opening timing and a valve closing timing at least one of which is changed by a variable valve mechanism for the engine.

4. The ignition timing control apparatus for an engine according to claim 3, wherein the controller estimates the change in the temperature or the pressure in the combustion chamber based on at least one of the valve opening timing and the valve closing timing of the intake valve.

5. An ignition timing control apparatus for an engine, comprising:
   a controller which uses an ignition timing used for combustion of air-fuel mixture as a base ignition timing, and sets the base ignition timing based on an operating state of the engine; and which sets the base ignition timing considering a change in a temperature or a pressure in a combustion chamber at a time when an opening/closing characteristic of an intake valve is changed, the opening/closing characteristic including a valve opening timing and a valve closing timing at least one of which is changed by a variable valve mechanism for the engine, wherein
   the controller uses, as a basic operating state, an operating state of the engine for which an appropriate base ignition timing has already been obtained; the controller estimates a state change amount that is a difference between a basic temperature or a basic pressure in the combustion chamber in the basic operating state and a present temperature or a present pressure in the combustion chamber in a present operating state, based on a basic opening/closing characteristic that is an opening/closing characteristic of the intake valve in the basic operating state and a present opening/closing characteristic that is an opening/closing characteristic of the intake valve in the present operating state; the controller corrects the base ignition timing appropriate for the basic operating state based on the state change amount; and the controller sets a base ignition timing appropriate for the present operating state to the corrected base ignition timing.

6. The ignition timing control apparatus for an engine according to claim 5, wherein the controller sets the base ignition timing considering a change in an amount of residual gas in the combustion chamber at a time when a valve overlap amount is changed; the controller calculates an ignition timing correction amount corresponding to a valve overlap amount in a first operating state, based on a first base ignition timing which is set in advance so as to be appropriate for the first operating state in which the valve overlap amount is set to a predetermined value, and a second base ignition timing which is set in advance so as to be appropriate for a second operating state in which the valve overlap amount is set to zero; the controller converts the ignition timing correction amount to an ignition timing correction amount corresponding to a valve overlap amount in the present operating state; and the controller calculates the base ignition timing appropriate for the present operating state, based on the converted ignition timing correction amount and the first base ignition timing.

7. The ignition timing control apparatus for an engine according to claim 6, wherein the controller uses, as an opening/closing state change amount, a change amount of the temperature or the pressure in the combustion chamber at a time when the opening/closing characteristic of the intake valve is changed from an opening/closing characteristic in the first operating state to an opening/closing characteristic in the second operating state; the controller calculates an ignition timing correction amount corresponding to the opening/closing state change amount; and the controller derives the ignition timing correction amount corresponding to the valve overlap amount in the first operating state from the first base ignition timing, by retarding the first base ignition timing by an amount equivalent to the second base ignition timing, and adding the ignition timing correction amount corresponding to the opening/closing state change amount.

8. The ignition timing control apparatus for an engine according to claim 7, wherein the controller estimates a valve opening side state change amount that is a change amount of the temperature or the pressure in the combustion chamber at a time when the valve opening timing of the intake valve is changed from a valve opening timing in the first operating state to a valve opening timing in the second operating state, based on the valve opening timing in the first operating state and the valve opening timing in the second operating state; the controller estimates a valve closing side state change amount that is a change amount of the temperature or the pressure in the combustion chamber at a time when the valve closing timing of the intake valve is changed from a valve closing timing in the first operating state to a valve closing timing in the second operating state, based on the valve closing timing in the first operating state and the valve closing timing in the second operating state; and estimates the opening/closing state change amount based on the valve opening side state change amount and the valve closing side state change amount.

9. The ignition timing control apparatus for an engine according to claim 5, wherein the controller estimates the state change amount based on a basic valve opening timing that is a valve opening timing in the basic opening/closing characteristic, and a present valve opening timing that is a valve opening timing in the present opening/closing characteristic.

10. The ignition timing control apparatus for an engine according to claim 9, wherein the controller uses, as a reference valve opening timing, a valve opening timing of the intake valve which is at a top dead center; the controller estimates a first valve opening state change amount that is a change amount of the temperature or the pressure in the combustion chamber at a time when the valve opening timing of the intake valve is changed from the reference valve opening timing to the basic valve opening timing, based on the reference valve opening timing and the basic valve opening timing; the controller estimates a second valve opening state change amount that is a change amount of the temperature or the pressure in the combustion chamber at a time when the valve opening timing of the intake valve is changed from the reference valve opening timing to the present valve opening timing, based on the reference valve opening timing and the present valve opening timing; and the controller estimates the state change amount based on the first valve opening state change amount and the second valve opening state change amount.

11. The ignition timing control apparatus for an engine according to claim 5, wherein the controller estimates the state change amount based on a basic valve closing timing that is a valve closing timing in the basic opening/closing characteristic, and a present valve closing timing that is a valve closing timing in the present opening/closing characteristic.

12. The ignition timing control apparatus for an engine according to claim 11, wherein the controller uses, as a reference valve closing timing, a valve closing timing of the intake valve which is at a bottom dead center; the controller estimates a first valve closing state change amount that is a change amount of the temperature or the pressure in the combustion chamber at a time when the valve closing timing of the intake valve is changed from the reference valve closing timing to the basic valve closing timing, based on the reference valve closing timing and the basic valve closing timing; the controller estimates a second valve closing state change amount that is a change amount of the temperature or the pressure in the combustion chamber at a time when the valve closing timing of the intake valve is changed from the reference valve closing timing to the present valve closing timing, based on the reference valve closing timing and the present valve closing timing; and the controller estimates the state change amount based on the first valve closing state change amount and the second valve closing state change amount.

13. The ignition timing control apparatus for an engine according to claim 11, wherein the controller uses, as a highest filling efficiency valve closing timing, a valve closing timing of the intake valve at which filling efficiency of the engine becomes highest; the controller estimates a third valve closing state change amount that is a change amount of the temperature or the pressure in the combustion chamber at a time when the valve closing timing of the intake valve is changed from the highest filling efficiency valve closing timing to the basic valve closing timing, based on the highest filling efficiency valve closing timing and the basic valve closing timing; the controller estimates a fourth valve closing state change amount that is a change amount of the temperature or the pressure in the combustion chamber at a time when the valve closing timing of the intake valve is changed from the highest filling efficiency valve closing timing to the present valve closing timing, based on the highest filling efficiency valve closing timing and the present valve closing timing; and the controller estimates the state change amount based on the third valve closing state change amount and the fourth valve closing state change amount.

14. The ignition timing control apparatus for an engine according to claim 5, wherein the controller estimates the state change amount considering a rotational speed of the engine.

15. The ignition timing control apparatus for an engine according to claim 5, wherein the controller estimates the state change amount considering an amount of air taken into the engine.

16. The ignition timing control apparatus for an engine according to claim 5, wherein the controller estimates the state change amount considering an effective length of an intake pipe of the engine.

17. The ignition timing control apparatus for an engine according to claim 5, wherein the controller uses an estimated temperature or an estimated pressure in the combustion chamber at a compression top dead center, as a value indicating the temperature or the pressure in the combustion chamber.

18. An ignition timing control apparatus for an engine, comprising:
a controller which uses, as a base ignition timing, an ignition timing at which occurrence of knocking can be suppressed, and output torque and a fuel consumption rate become optimal; and which selects a base ignition timing appropriate for a present operating state from among plural basic base ignition timings that are stored in advance, wherein
the controller uses, as a basic operating state, an operating state corresponding to one of the plural basic base ignition timings; the controller estimates a state change amount that is a difference between a basic temperature or a basic pressure in a combustion chamber in the basic operating state and a present temperature or a present pressure in the combustion chamber in a present operating state, based on a basic opening/closing characteristic that is an opening/closing characteristic of the intake valve in the basic operating state and a present opening/closing characteristic that is an opening/closing characteristic of an intake valve in the present operating state, the opening/closing characteristic including a valve opening timing and a valve closing timing at least one of which is changed by a variable valve mechanism for the engine; the controller corrects the base ignition timing appropriate for the basic operating state based on the state change amount; and the controller sets a base ignition timing appropriate for the present operating state to the corrected base ignition timing, in a case where the base ignition timing appropriate for the present operating state cannot be selected from among the plural basic base ignition timings.

19. The ignition timing control apparatus for an engine according to claim 18, wherein the controller sets the base ignition timing considering a change in an amount of residual gas in the combustion chamber at a time when a valve overlap amount is changed; the controller calculates an ignition timing correction amount corresponding to a valve overlap amount in a first operating state, based on a first base ignition timing which is set in advance so as to be appropriate for the first operating state in which the valve overlap amount is set to a predetermined value, and a second base ignition timing which is set in advance so as to be appropriate for a second operating state in which the valve overlap amount is set to zero; the controller converts the ignition timing correction amount to an ignition timing correction amount corresponding to a valve overlap amount in the present operating state; and the controller calculates the base ignition timing appropriate for the present operating state, based on the converted ignition timing correction amount and the first base ignition timing.

20. The ignition timing control apparatus for an engine according to claim 19, wherein the controller uses, as an opening/closing state change amount, a change amount of the temperature or the pressure in the combustion chamber at a time when the opening/closing characteristic of the intake valve is changed from an opening/closing characteristic in the first operating state to an opening/closing characteristic in the second operating state; the controller calculates an ignition timing correction amount corresponding to the opening/closing state change amount; and the controller derives the ignition timing correction amount corresponding to the valve overlap amount in the first operating state from the first base ignition timing, by retarding the first base ignition timing by an amount equivalent to the second base ignition timing, and adding the ignition timing correction amount corresponding to the opening/closing state change amount.

21. The ignition timing control apparatus for an engine according to claim 20, wherein the controller estimates a valve opening side state change amount that is a change amount of the temperature or the pressure in the combustion chamber at a time when the valve opening timing of the intake valve is changed from a valve opening timing in the first operating state to a valve opening timing in the second operating state, based on the valve opening timing in the first operating state and the valve opening timing in the second operating state; the controller estimates a valve closing side state change amount that is a change amount of the temperature or the pressure in the combustion chamber at a time when the valve closing timing of the intake valve is changed from a valve closing timing in the first operating state to a valve closing timing in the second operating state, based on the valve closing timing in the first operating state and the valve closing timing in the second operating state; and estimates the opening/closing state change amount based on the valve opening side state change amount and the valve closing side state change amount.

22. The ignition timing control apparatus for an engine according to claim 18, wherein the controller estimates the state change amount based on a basic valve opening timing that is a valve opening timing in the basic opening/closing characteristic, and a present valve opening timing that is a valve opening timing in the present opening/closing characteristic.

23. The ignition timing control apparatus for an engine according to claim 22, wherein the controller uses, as a reference valve opening timing, a valve opening timing of the intake valve which is at a top dead center; the controller estimates a first valve opening state change amount that is a change amount of the temperature or the pressure in the combustion chamber at a time when the valve opening timing of the intake valve is changed from the reference valve opening timing to the basic valve opening timing, based on the reference valve opening timing and the basic valve opening timing; the controller estimates a second valve opening state change amount that is a change amount of the temperature or the pressure in the combustion chamber at a time when the valve opening timing of the intake valve is changed from the reference valve opening timing to the present valve opening timing, based on the reference valve opening timing and the present valve opening timing; and the controller estimates the state change amount based on the first valve opening state change amount and the second valve opening state change amount.

24. The ignition timing control apparatus for an engine according to claim 18, wherein the controller estimates the state change amount based on a basic valve closing timing that is a valve closing timing in the basic opening/closing characteristic, and a present valve closing timing that is a valve closing timing in the present opening/closing characteristic.

25. The ignition timing control apparatus for an engine according to claim 24, wherein the controller uses, as a reference valve closing timing, a valve closing timing of the intake valve which is at a bottom dead center; the controller estimates a first valve closing state change amount that is a change amount of the temperature or the pressure in the combustion chamber at a time when the valve closing timing of the intake valve is changed from the reference valve closing timing to the basic valve closing timing, based on the reference valve closing timing and the basic valve closing timing; the controller estimates a second valve closing state change amount that is a change amount of the temperature or the pressure in the combustion chamber at a time when the valve closing timing of the intake valve is changed from the reference valve closing timing to the present valve closing timing, based on the reference valve closing timing and the present valve closing timing; and the controller estimates the state change amount based on the first valve closing state change amount and the second valve closing state change amount.

26. The ignition timing control apparatus for an engine according to claim 24, wherein the controller uses, as a highest filling efficiency valve closing timing, a valve closing timing of the intake valve at which filling efficiency of the engine becomes highest; the controller estimates a third valve closing state change amount that is a change amount of the temperature or the pressure in the combustion chamber at a time when the valve closing timing of the intake valve is changed from the highest filling efficiency valve closing timing to the basic valve closing timing, based on the highest filling efficiency valve closing timing and the basic valve closing timing; the controller estimates a fourth valve closing state change amount that is a change amount of the temperature or the pressure in the combustion chamber at a time when the valve closing timing of the intake valve is changed from the highest filling efficiency valve closing timing to the present valve closing timing, based on the highest filling efficiency valve closing timing and the present valve closing timing; and the controller estimates the state change amount based on the third valve closing state change amount and the fourth valve closing state change amount.

27. The ignition timing control apparatus for an engine according to claim 18, wherein the controller estimates the state change amount considering a rotational speed of the engine.

28. The ignition timing control apparatus for an engine according to claim 18, wherein the controller estimates the state change amount considering an amount of air taken into the engine.

29. The ignition timing control apparatus for an engine according to claim 18, wherein the controller estimates the state change amount considering an effective length of an intake pipe of the engine.

30. The ignition timing control apparatus for an engine according to claim 18, wherein the controller uses an estimated temperature or an estimated pressure in the combustion chamber at a compression top dead center, as a value indicating the temperature or the pressure in the combustion chamber.

31. An ignition timing control apparatus for an engine, comprising:
a controller which calculates an MBT ignition timing at which output torque and a fuel consumption rate become optimal, and a knock limit ignition timing that is most advanced in an ignition timing range where occurrence of knocking can be suppressed; which sets a base ignition timing to one of the MBT ignition timing and the knock limit ignition timing, which is more retarded than the other, the base ignition timing being used for combustion of air-fuel mixture; and which sets the base ignition timing considering a change in a temperature or a pressure in a combustion chamber at a time when an opening/closing characteristic of an intake valve is changed, the opening/closing characteristic including a valve opening timing and a valve closing timing at least one of which is changed by a variable valve mechanism for the engine, wherein
the controller uses, as a basic operating state, an operating state of the engine for which an appropriate MBT ignition timing and an appropriate knock limit ignition timing have already been obtained; the controller estimates a state change amount that is a difference between a basic temperature or a basic pressure in the combustion chamber in the basic operating state and a present temperature or a present pressure in the combustion chamber in a present operating state, based on a basic opening/closing characteristic that is an opening/closing characteristic of the intake valve in the basic operating state and a present opening/closing characteristic that is an opening/closing characteristic of an intake valve in the present operating state; the controller corrects the MBT ignition timing and the knock limit ignition timing that are appropriate for the basic operating state based on the state change amount; and the controller sets a base ignition timing appropriate for the present operating state to one of the corrected MBT ignition timing and the corrected knock limit ignition timing, which is more retarded than the other.

32. The ignition timing control apparatus for an engine according to claim 31, wherein the controller sets the base ignition timing considering a change in an amount of residual gas in the combustion chamber at a time when a valve overlap amount is changed; the controller calculates an ignition timing correction amount corresponding to a valve overlap amount in a first operating state, based on a first MBT ignition timing which is set in advance so as to be appropriate for the first operating state in which the valve overlap amount is set to a predetermined value, and a second MBT ignition timing which is set in advance so as to be appropriate for a second operating state in which the valve overlap amount is set to zero; the controller converts the ignition timing correction amount to an ignition timing correction amount corresponding to a valve overlap amount in the present operating state; and the controller calculates an MBT ignition timing appropriate for the present operating state, based on the converted ignition timing correction amount and the first MBT ignition timing.

33. The ignition timing control apparatus for an engine according to claim 32, wherein the controller uses, as an opening/closing state change amount, a change amount of the temperature or the pressure in the combustion chamber at a time when the opening/closing characteristic of the intake valve is changed from an opening/closing characteristic in the first operating state to an opening/closing characteristic in the second operating state; the controller calculates an ignition timing correction amount corresponding to the opening/closing state change amount; and the controller derives the ignition timing correction amount corresponding to the valve overlap amount in the first operating state from the first MBT ignition timing, by retarding the first MBT ignition timing by an amount equivalent to the second MBT ignition timing, and adding an ignition timing correction amount corresponding to the opening/closing state change amount.

34. The ignition timing control apparatus for an engine according to claim 33, wherein the controller estimates a valve opening side state change amount that is a change amount of the temperature or the pressure in the combustion chamber at a time when the valve opening timing of the intake valve is changed from a valve opening timing in the first operating state to a valve opening timing in the second operating state, based on the valve opening timing in the first operating state and the valve opening timing in the second operating state; the controller estimates a valve closing side state change amount that is a change amount of the temperature or the pressure in the combustion chamber at a time when the valve closing timing of the intake valve is changed from a valve closing timing in the first operating state to a valve closing timing in the second operating state, based on the valve closing timing in the first operating state and the valve closing timing in the second operating state; and estimates the opening/closing state change amount based on the valve opening side state change amount and the valve closing side state change amount.

35. The ignition timing control apparatus for an engine according to claim 31, wherein
the controller sets the base ignition timing considering a change in an amount of residual gas in the combustion chamber at a time when a valve overlap amount is changed; the controller calculates an ignition timing correction amount corresponding to a valve overlap amount in a first operating state, based on a first knock limit ignition timing which is set in advance so as to be appropriate for the first operating state in which the valve overlap amount is set to a predetermined value, and a second knock limit ignition timing which is set in advance so as to be appropriate for a second operating state in which the valve overlap amount is set to zero; the controller converts the ignition timing correction amount to an ignition timing correction amount corresponding to a valve overlap amount in the present operating state; and the controller calculates a knock limit ignition timing appropriate for the present operating state, based on the converted ignition timing correction amount and the first knock limit ignition timing.

36. The ignition timing control apparatus for an engine according to claim 35, wherein the controller uses, as an opening/closing state change amount, a change amount of the temperature or the pressure in the combustion chamber at a time when the opening/closing characteristic of the intake valve is changed from an opening/closing characteristic in the first operating state to an opening/closing characteristic in the second operating state; the controller calculates an ignition timing correction amount corresponding to the opening/closing state change amount; and the controller derives the ignition timing correction amount corresponding to the valve overlap amount in the first operating state from the first knock limit ignition timing, by retarding the first knock limit ignition timing by an amount equivalent to the second knock limit ignition timing, and adding the ignition timing correction amount corresponding to the opening/closing state change amount.

37. The ignition timing control apparatus for an engine according to claim 31, wherein the controller estimates the state change amount based on a basic valve opening timing that is a valve opening timing in the basic opening/closing characteristic, and a present valve opening timing that is a valve opening timing in the present opening/closing characteristic.

38. The ignition timing control apparatus for an engine according to claim 37, wherein the controller uses, as a reference valve opening timing, a valve opening timing of the intake valve which is at a top dead center; the controller estimates a first valve opening state change amount that is a change amount of the temperature or the pressure in the combustion chamber at a time when the valve opening timing of the intake valve is changed from the reference valve opening timing to the basic valve opening timing, based on the reference valve opening timing and the basic valve opening timing; the controller estimates a second valve opening state change amount that is a change amount of the temperature or the pressure in the combustion chamber at a time when the valve opening timing of the intake valve is changed from the reference valve opening timing to the present valve opening timing, based on the reference valve opening timing and the present valve opening timing; and the controller estimates the state change amount based on the first valve opening state change amount and the second valve opening state change amount.

39. The ignition timing control apparatus for an engine according to claim 31, wherein the controller estimates the state change amount based on a basic valve closing timing that is a valve closing timing in the basic opening/closing characteristic, and a present valve closing timing that is a valve closing timing in the present opening/closing characteristic.

40. The ignition timing control apparatus for an engine according to claim 39, wherein the controller uses, as a reference valve closing timing, a valve closing timing of the intake valve which is at a bottom dead center; the controller estimates a first valve closing state change amount that is a change amount of the temperature or the pressure in the combustion chamber at a time when the valve closing timing of the intake valve is changed from the reference valve closing timing to the basic valve closing timing, based on the reference valve closing timing and the basic valve closing timing; the controller estimates a second valve closing state change amount that is a change amount of the temperature or the pressure in the combustion chamber at a time when the valve closing timing of the intake valve is changed from the reference valve closing timing to the present valve closing timing, based on the reference valve closing timing and the present valve closing timing; and the controller estimates the state change amount based on the first valve closing state change amount and the second valve closing state change amount.

41. The ignition timing control apparatus for an engine according to claim 39, wherein the controller uses, as a highest filling efficiency valve closing timing, a valve closing timing of the intake valve at which filling efficiency of the engine becomes highest; the controller estimates a third valve closing state change amount that is a change amount of the temperature or the pressure in the combustion chamber at a time when the valve closing timing of the intake valve is changed from the highest filling efficiency valve closing timing to the basic valve closing timing, based on the highest filling efficiency valve closing timing and the basic valve closing timing; the controller estimates a fourth valve closing state change amount that is a change amount of the temperature or the pressure in the combustion chamber at a time when the valve closing timing of the intake valve is changed from the highest filling efficiency valve closing timing to the present valve closing timing, based on the highest filling efficiency valve closing timing and the present valve closing timing; and the controller estimates the state change amount based on the third valve closing state change amount and the fourth valve closing state change amount.

42. The ignition timing control apparatus for an engine according to claim 31, wherein the controller estimates the state change amount considering a rotational speed of the engine.

43. The ignition timing control apparatus for an engine according to claim 31 wherein the controller estimates the state change amount considering an amount of air taken into the engine.

44. The ignition timing control apparatus for an engine according to claim 31, wherein the controller estimates the state change amount considering an effective length of an intake pipe of the engine.

45. The ignition timing control apparatus for an engine according to claim 31, wherein the controller uses an estimated temperature or an estimated pressure in the combustion chamber at a compression top dead center, as a value indicating the temperature or the pressure in the combustion chamber.

46. An ignition timing control apparatus for an engine, comprising:
a controller which uses an ignition timing at which output torque and a fuel consumption rate become optimal as an MBT ignition timing; which uses an ignition timing that is most advanced in an ignition timing range where occurrence of knocking can be suppressed as a knock limit ignition timing; which selects an MBT ignition timing and a knock limit ignition timing that are appropriate for a present operating state from among plural basic MBT ignition timings that are stored in advance and plural basic knock limit timings that are stored in advance, respectively; and which sets a base ignition timing to one of the selected MBT ignition timing and the selected knock limit ignition timing, which is more retarded than the other, the base ignition timing being used for combustion of air-fuel mixture, wherein the controller uses, as a basic operating state, an operating state corresponding to one of the plural basic MBT ignition timings and one of the plural basic knock limit ignition timings; the controller estimates a state change amount that is a difference between a basic temperature or a basic pressure in a combustion chamber in the basic operating state and a present temperature or a present pressure in the combustion chamber in a present operating state, based on a basic opening/closing characteristic that is an opening/closing characteristic of the intake valve in the basic operating state and a present opening/closing characteristic that is an opening/closing characteristic of the intake valve in the present operating state, the opening/closing characteristic including a valve opening timing and a valve closing timing at least one of which is changed by a variable valve mechanism for the engine; the controller corrects the MBT ignition timing and the knock limit ignition timing that are appropriate for the basic operating state, based on the state change amount; and the controller sets a base ignition timing appropriate for the present operating state to one of the corrected MBT ignition timing and the corrected knock limit ignition timing, which is more retarded than the other, in a case where the MBT ignition timing and the knock limit ignition timing that are appropriate for the present operating state cannot be selected from among the plural basic MBT ignition timings and the plural basic knock limit ignition timings, respectively.

47. The ignition timing control apparatus for an engine according to claim 46, wherein the controller sets the base ignition timing considering a change in an amount of residual gas in the combustion chamber at a time when a valve overlap amount is changed; the controller calculates an ignition timing correction amount corresponding to a valve overlap amount in a first operating state, based on a first MBT ignition timing which is set in advance so as to be appropriate for the first operating state in which the valve overlap amount is set to a predetermined value, and a second MBT ignition timing which is set in advance so as to be appropriate for a second operating state in which the valve overlap amount is set to zero; the controller converts the ignition timing correction amount to an ignition timing correction amount corresponding to a valve overlap amount in the present operating state; and the controller calculates an MBT ignition timing appropriate for the present operating state, based on the converted ignition timing correction amount and the first MBT ignition timing.

48. The ignition timing control apparatus for an engine according to claim 47, wherein the controller uses, as an opening/closing state change amount, a change amount of the temperature or the pressure in the combustion chamber at a time when the opening/closing characteristic of the intake valve is changed from an opening/closing characteristic in the first operating state to an opening/closing characteristic in the second operating state, and calculates an ignition timing correction amount corresponding to the opening/closing state change amount; and the controller derives the ignition timing correction amount corresponding to the valve overlap amount in the first operating state from the first MBT ignition timing, by retarding the first MBT ignition timing by an amount equivalent to the second MBT ignition timing, and adding an ignition timing correction amount corresponding to the opening/closing state change amount.

49. The ignition timing control apparatus for an engine according to claim 48, wherein the controller estimates a valve opening side state change amount that is a change amount of the temperature or the pressure in the combustion chamber at a time when the valve opening timing of the intake valve is changed from a valve opening timing in the first operating state to a valve opening timing in the second operating state, based on the valve opening timing in the first operating state and the valve opening timing in the second operating state; the controller estimates a valve closing side state change amount that is a change amount of the temperature or the pressure in the combustion chamber at a time when the valve closing timing of the intake valve is changed from a valve closing timing in the first operating state to a valve closing timing in the second operating state, based on the valve closing timing in the first operating state and the valve closing timing in the second operating state; and estimates the opening/closing state change amount based on the valve opening side state change amount and the valve closing side state change amount.

50. The ignition timing control apparatus for an engine according to claim 46, wherein the controller sets the base ignition timing considering a change in an amount of residual gas in the combustion chamber at a time when a valve overlap amount is changed; the controller calculates an ignition timing correction amount corresponding to a valve overlap amount in a first operating state, based on a first knock limit ignition timing which is set in advance so as to be appropriate for the first operating state in which the valve overlap amount is set to a predetermined value, and a second knock limit ignition timing which is set in advance so as to be appropriate for a second operating state in which the valve overlap amount is set to zero; the controller converts the ignition timing correction amount to an ignition timing correction amount corresponding to a valve overlap amount in the present operating state; and the controller calculates a knock limit ignition timing appropriate for the present operating state, based on the converted ignition timing correction amount and the first knock limit ignition timing.

51. The ignition timing control apparatus for an engine according to claim 50, wherein the controller uses, as an opening/closing state change amount, a change amount of the temperature or the pressure in the combustion chamber at a time when the opening/closing characteristic of the intake valve is changed from an opening/closing characteristic in the first operating state to an opening/closing characteristic in the second operating state; the controller calculates an ignition timing correction amount corresponding to the opening/closing state change amount; and the controller derives the ignition timing correction amount corresponding to the valve overlap amount in the first operating state from the first knock limit ignition timing, by retarding the first knock limit ignition timing by an amount equivalent to the second knock limit ignition timing, and adding the ignition timing correction amount corresponding to the opening/closing state change amount.

52. The ignition timing control apparatus for an engine according to claim 46, wherein the controller estimates the state change amount based on a basic valve opening timing that is a valve opening timing in the basic opening/closing characteristic, and a present valve opening timing that is a valve opening timing in the present opening/closing characteristic.

53. The ignition timing control apparatus for an engine according to claim 52, wherein the controller uses, as a reference valve opening timing, a valve opening timing of the intake valve which is at a top dead center; the controller estimates a first valve opening state change amount that is a change amount of the temperature or the pressure in the combustion chamber at a time when the valve opening timing of the intake valve is changed from the reference valve opening timing to the basic valve opening timing, based on the reference valve opening timing and the basic valve opening timing; the controller estimates a second valve opening state change amount that is a change amount of the temperature or the pressure in the combustion chamber at a time when the valve opening timing of the intake valve is changed from the reference valve opening timing to the present valve opening timing, based on the reference valve opening timing and the present valve opening timing; and the controller estimates the state change amount based on the first valve opening state change amount and the second valve opening state change amount.

54. The ignition timing control apparatus for an engine according to claim 46 wherein the controller estimates the state change amount based on a basic valve closing timing that is a valve closing timing in the basic opening/closing characteristic, and a present valve closing timing that is a valve closing timing in the present opening/closing characteristic.

55. The ignition timing control apparatus for an engine according to claim 54, wherein the controller uses, as a reference valve closing timing, a valve closing timing of the intake valve which is at a bottom dead center; the controller estimates a first valve closing state change amount that is a change amount of the temperature or the pressure in the combustion chamber at a time when the valve closing timing of the intake valve is changed from the reference valve closing timing to the basic valve closing timing, based on the reference valve closing timing and the basic valve closing timing; the controller estimates a second valve closing state change amount that is a change amount of the temperature or the pressure in the combustion chamber at a time when the valve closing timing of the intake valve is changed from the reference valve closing timing to the present valve closing timing, based on the reference valve closing timing and the present valve closing timing; and the controller estimates the state change amount based on the first valve closing state change amount and the second valve closing state change amount.

56. The ignition timing control apparatus for an engine according to claim 54, wherein the controller uses, as a highest filling efficiency valve closing timing, a valve closing timing of the intake valve at which filling efficiency of the engine becomes highest; the controller estimates a third valve closing state change amount that is a change amount of the temperature or the pressure in the combustion chamber at a time when the valve closing timing of the intake valve is changed from the highest filling efficiency valve closing timing to the basic valve closing timing, based on the highest filling efficiency valve closing timing and the basic valve closing timing; the controller estimates a fourth valve closing state change amount that is a change amount of the temperature or the pressure in the combustion chamber at a time when the valve closing timing of the intake valve is changed from the highest filling efficiency valve closing timing to the present valve closing timing, based on the highest filling efficiency valve closing timing and the present valve closing timing; and the controller estimates the state change amount based on the third valve closing state change amount and the fourth valve closing state change amount.

57. The ignition timing control apparatus for an engine according to claim 46 wherein the controller estimates the state change amount considering a rotational speed of the engine.

58. The ignition timing control apparatus for an engine according to claim 46 wherein the controller estimates the state change amount considering an amount of air taken into the engine.

59. The ignition timing control apparatus for an engine according to claim 46, wherein the controller estimates the state change amount considering an effective length of an intake pipe of the engine.

60. The ignition timing control apparatus for an engine according to claim 46, wherein the controller uses an estimated temperature or an estimated pressure in the combustion chamber at a compression top dead center, as a value indicating the temperature or the pressure in the combustion chamber.

* * * * *

UNITED STATES PATENT AND TRADEMARK OFFICE
CERTIFICATE OF CORRECTION

PATENT NO. : 7,121,260 B2  
APPLICATION NO. : 11/229554  
DATED : October 17, 2007  
INVENTOR(S) : Yuji Miyanoo et al.

It is certified that error appears in the above-identified patent and that said Letters Patent is hereby corrected as shown below:

| Column | Line | |
|---|---|---|
| 17 | 31 | Change "based on C" to --based on a--. |
| 31 | 16 | Change "compIV6Obt" to --compIVObt--. |
| 37 | 62 | Change "(OVLPbst>OVLPX)," to --(OVLPbst≥OVLPX),--. |
| 46 | 28 | Change "tempALLdb tempIVOdb+tempIVCdb" to --tempALLdb←tempIVOdb+tempIVCdb--. |

Signed and Sealed this

Twenty-fourth Day of June, 2008

JON W. DUDAS  
*Director of the United States Patent and Trademark Office*

UNITED STATES PATENT AND TRADEMARK OFFICE
CERTIFICATE OF CORRECTION

PATENT NO. : 7,121,260 B2
APPLICATION NO. : 11/229554
DATED : October 17, 2006
INVENTOR(S) : Yuji Miyanoo et al.

It is certified that error appears in the above-identified patent and that said Letters Patent is hereby corrected as shown below:

| Column | Line | |
|---|---|---|
| 17 | 31 | Change "based on C" to --based on a--. |
| 31 | 16 | Change "compIV6Obt" to --compIVObt--. |
| 37 | 62 | Change "(OVLPbst>OVLPX)," to --(OVLPbst$\geq$OVLPX),--. |
| 46 | 28 | Change "tempALLdb tempIVOdb+tempIVCdb" to --tempALLdb$\leftarrow$tempIVOdb+tempIVCdb--. |

This certificate supersedes the Certificate of Correction issued June 24, 2008.

Signed and Sealed this

Twenty-second Day of July, 2008

JON W. DUDAS
*Director of the United States Patent and Trademark Office*